(12) United States Patent
Fischer et al.

(10) Patent No.: US 7,286,922 B1
(45) Date of Patent: Oct. 23, 2007

(54) METHOD OF AND APPARATUS FOR TRANSMITTING TORQUE IN VEHICULAR POWER TRAINS

(75) Inventors: Robert Fischer, Bühl (DE); Uwe Wagner, Bühl-Weitenung (DE); Jürgen Freitag, Ottersweier (DE); Johannes Braun, Bühl (DE); Anton Rink, Karlsruhe (DE)

(73) Assignee: LuK Getriebe-Systeme GmbH, Buhl (DE)

( * ) Notice: Subject to any disclaimer, the term of this patent is extended or adjusted under 35 U.S.C. 154(b) by 0 days.

(21) Appl. No.: 08/392,127

(22) Filed: Feb. 22, 1995

Related U.S. Application Data

(63) Continuation-in-part of application No. 08/375,913, filed on Jan. 20, 1995, now Pat. No. 5,738,198, and a continuation-in-part of application No. 08/306,671, filed on Sep. 15, 1994, now Pat. No. 5,752,894, and a continuation-in-part of application No. 08/285,546, filed on Aug. 3, 1994, now abandoned, and a continuation-in-part of application No. 08/281,409, filed on Jul. 27, 1994, now Pat. No. 5,501,309, and a continuation-in-part of application No. 08/272,920, filed on Jul. 8, 1994, now abandoned.

(30) Foreign Application Priority Data

| Feb. 23, 1994 | (DE) | 44 05 719 |
| May 26, 1994 | (DE) | 44 18 273 |
| Jul. 21, 1994 | (DE) | 44 25 932 |
| Oct. 24, 1994 | (DE) | 44 37 943 |

(51) Int. Cl.
- *F16H 61/14* (2006.01)
- *F16D 33/00* (2006.01)
- *G06F 19/00* (2006.01)

(52) U.S. Cl. .......... 701/51; 701/67; 701/82; 701/87; 477/62; 477/176; 192/54.1

(58) Field of Classification Search .......... 701/51, 701/56, 61, 67, 82, 84, 87, 90; 477/110, 477/62, 169, 170, 176; 475/200, 257, 269, 475/32, 53; 192/3.3, 3.51, 54.1, 70.22
See application file for complete search history.

(56) References Cited

U.S. PATENT DOCUMENTS 4,577,737 A  3/1986  Niikura .......... 192/0.032

(Continued)

FOREIGN PATENT DOCUMENTS

DE  31 30 871  3/1982

(Continued)

*Primary Examiner*—Tan Q. Nguyen
(74) *Attorney, Agent, or Firm*—Darby & Darby P.C.

(57) ABSTRACT

The magnitude of torque which can be transmitted by a bypass clutch between the housing and the turbine of a torque converter between a prime mover, such as an engine, and an automatic transmission in the power train of a motor vehicle is selectively regulatable by a computerized regulating unit. The regulation involves the transmission of torque by the clutch in dependency upon the magnitude of the torque being transmitted by the output element of the engine and ascertaining as well as adaptively applying to the clutch a variable force so that the clutch can transmit a predetermined torque. This entails automatic selection of a minimum slip between a torque receiving and a torque transmitting part of the power train. Compensation, particularly long-range compensation, is carried out for the existence of possible differences between the predetermined and actual torques being transmitted by the clutch.

39 Claims, 24 Drawing Sheets

U.S. PATENT DOCUMENTS

| | | | |
|---|---|---|---|
| 4,756,210 A | * | 7/1988 | Franklin et al. ............... 475/32 |
| 4,757,728 A | * | 7/1988 | Pitsch ......................... 475/53 |
| 4,949,822 A | * | 8/1990 | Martin ....................... 192/3.3 |
| 5,029,087 A | * | 7/1991 | Cowan et al. ............ 364/424.1 |
| 5,058,716 A | * | 10/1991 | Lippe et al. ................ 192/3.33 |
| 5,169,365 A | | 12/1992 | Friedmann ................... 474/18 |
| 5,272,630 A | * | 12/1993 | Brown et al. ............. 364/424.1 |
| 5,303,616 A | * | 4/1994 | Palansky et al. ............... 477/63 |
| 5,305,663 A | * | 4/1994 | Leonard et al. .............. 475/123 |
| 5,385,222 A | | 1/1995 | Otto .......................... 192/3.29 |
| 5,501,309 A | * | 3/1996 | Walth et al. ................ 192/3.29 |
| 5,553,694 A | * | 9/1996 | Schulz et al. ................. 192/3.3 |
| 5,637,053 A | * | 6/1997 | Droste et al. .................. 477/62 |

FOREIGN PATENT DOCUMENTS

DE         37 12 223         11/1987

* cited by examiner

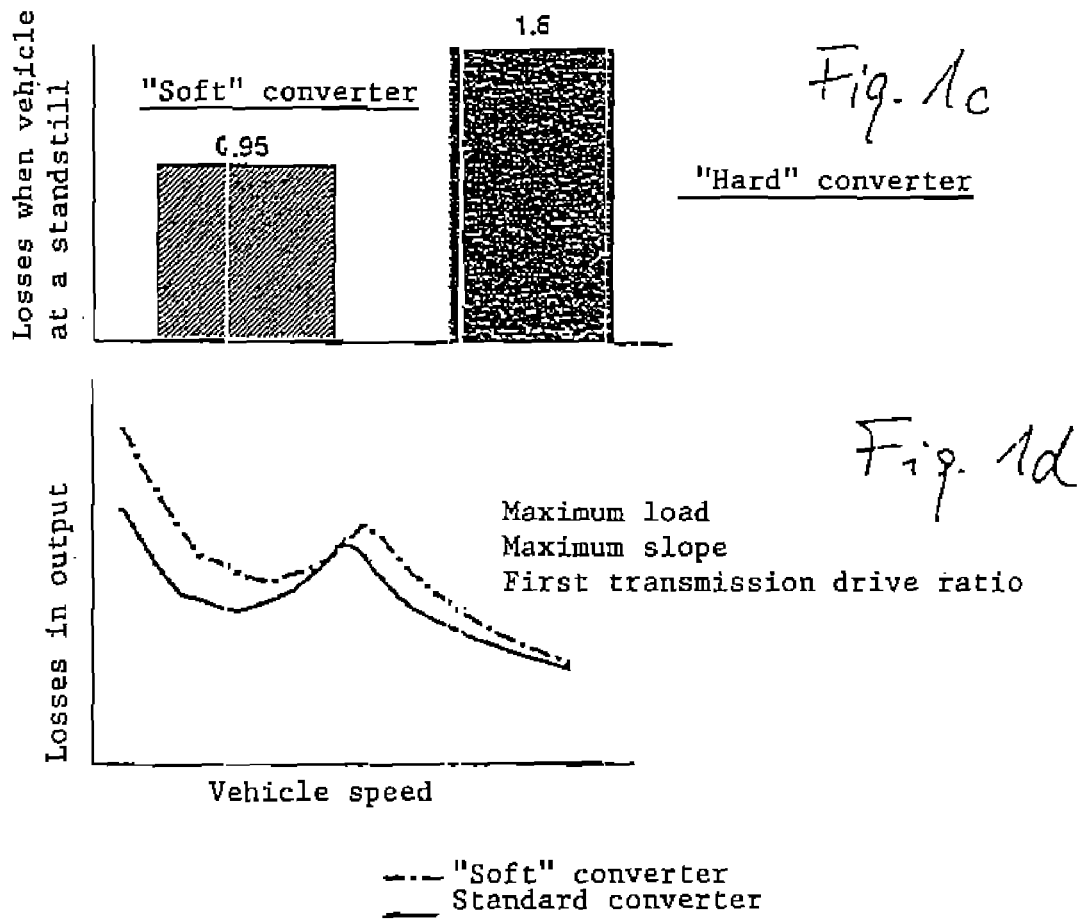
Fig. 1c
Fig. 1d
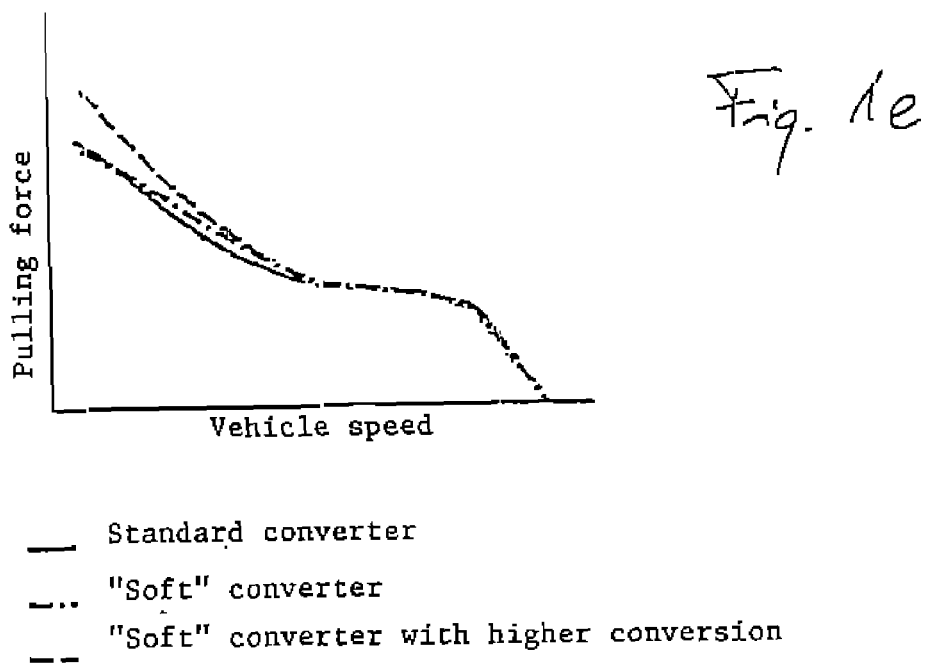
Fig. 1e

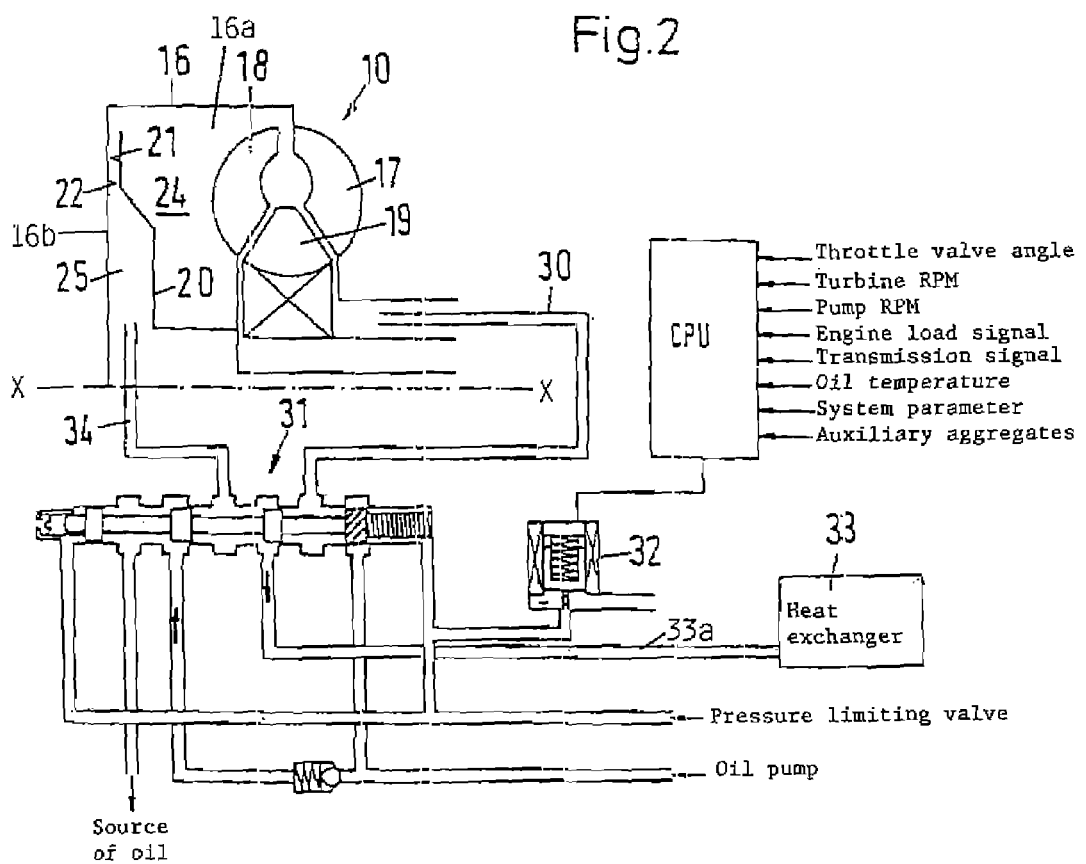

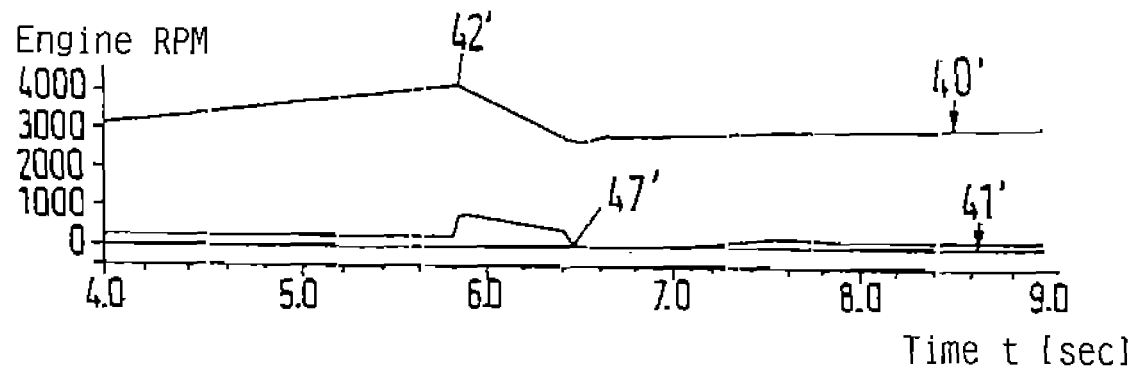

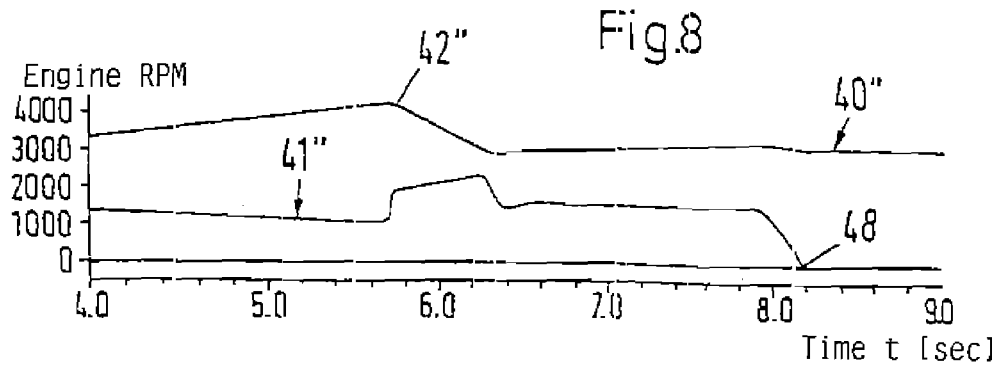
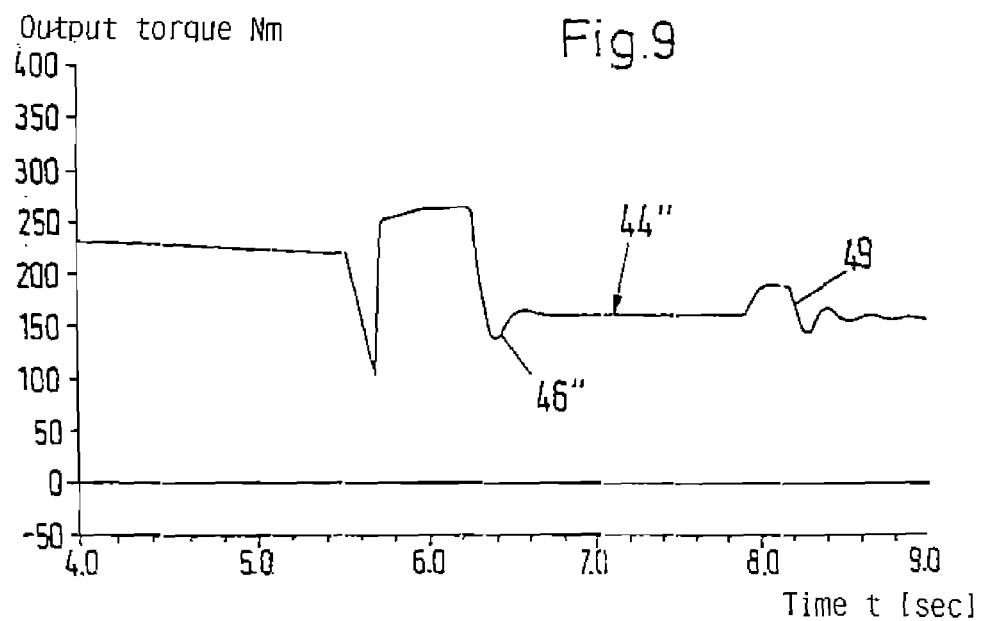
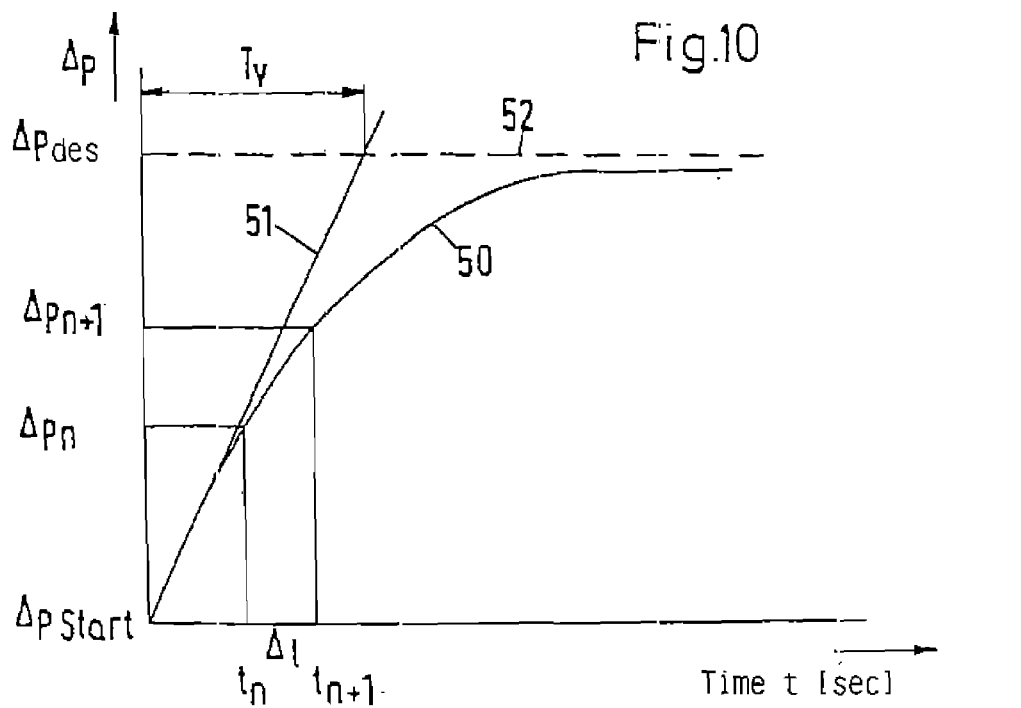

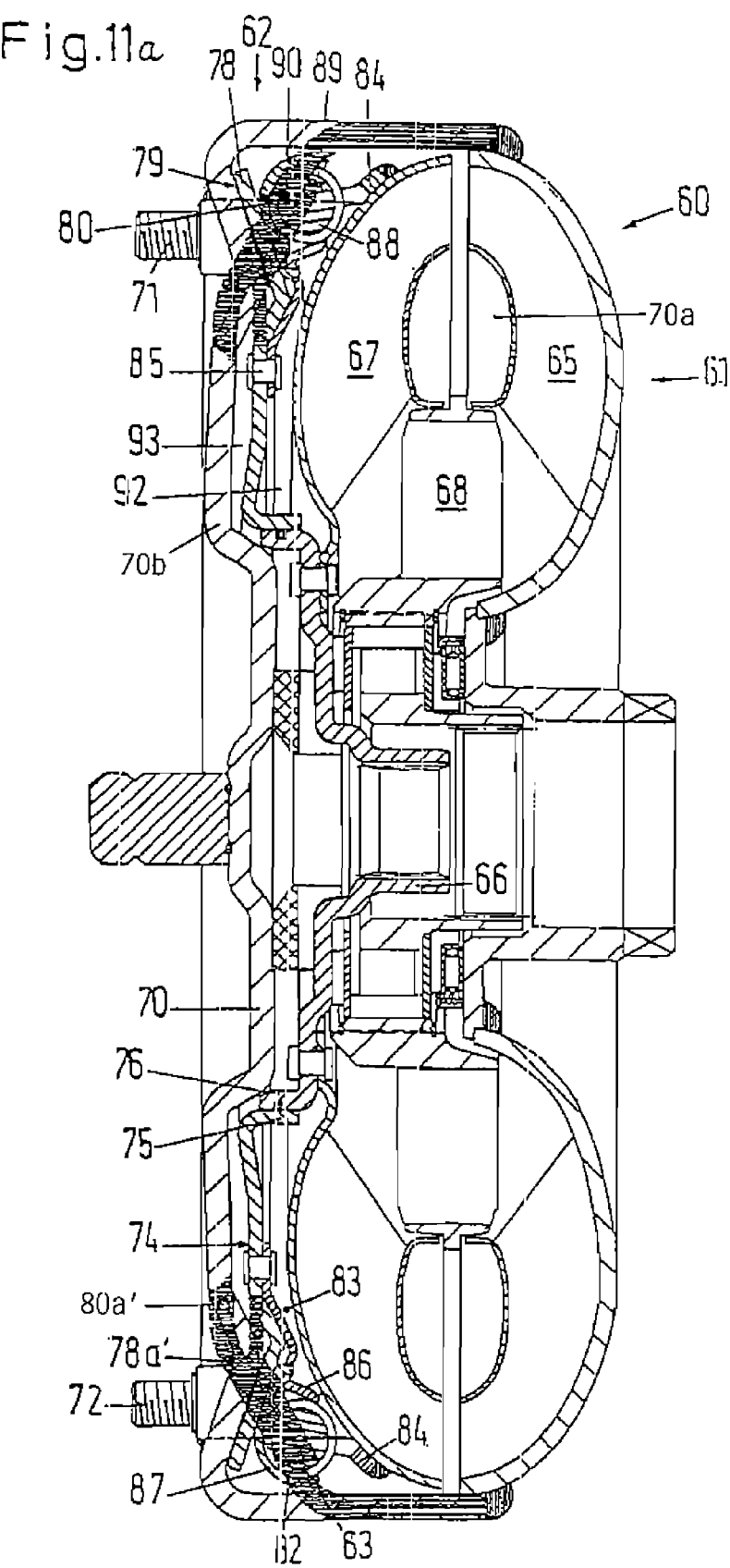

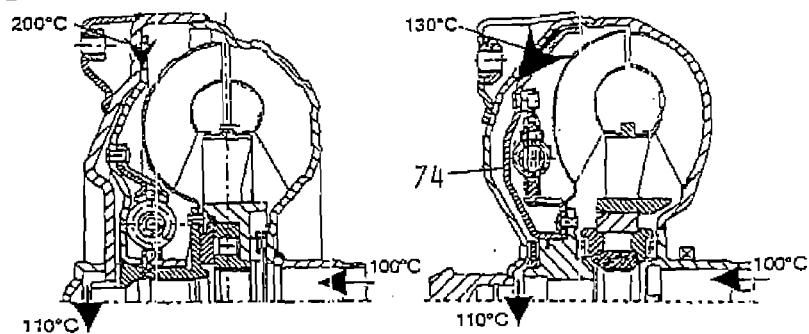
Fig. 11b PRIOR ART
Fig. 11c
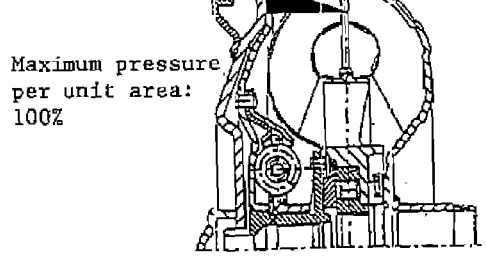
Fig. 11d PRIOR ART
Maximum pressure per unit area: 100%
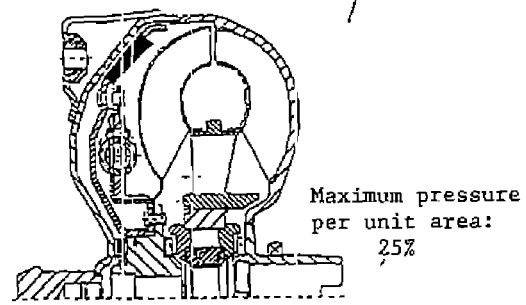
Fig. 11e
Maximum pressure per unit area: 25%

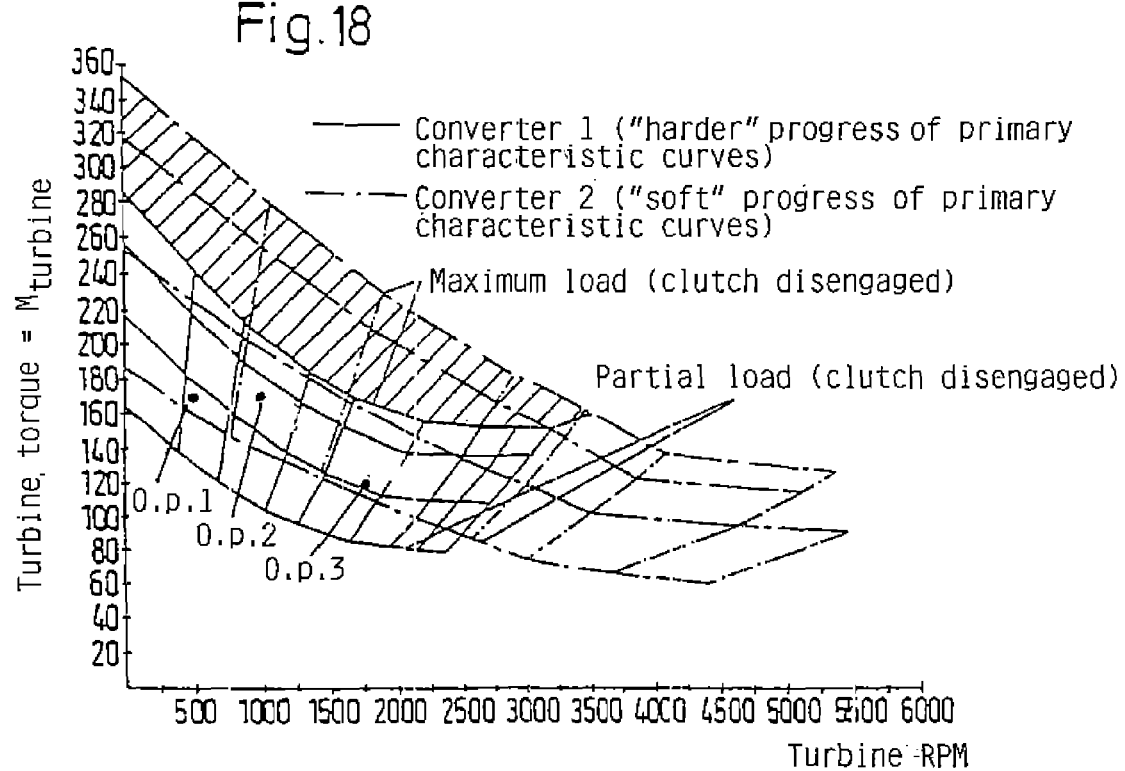
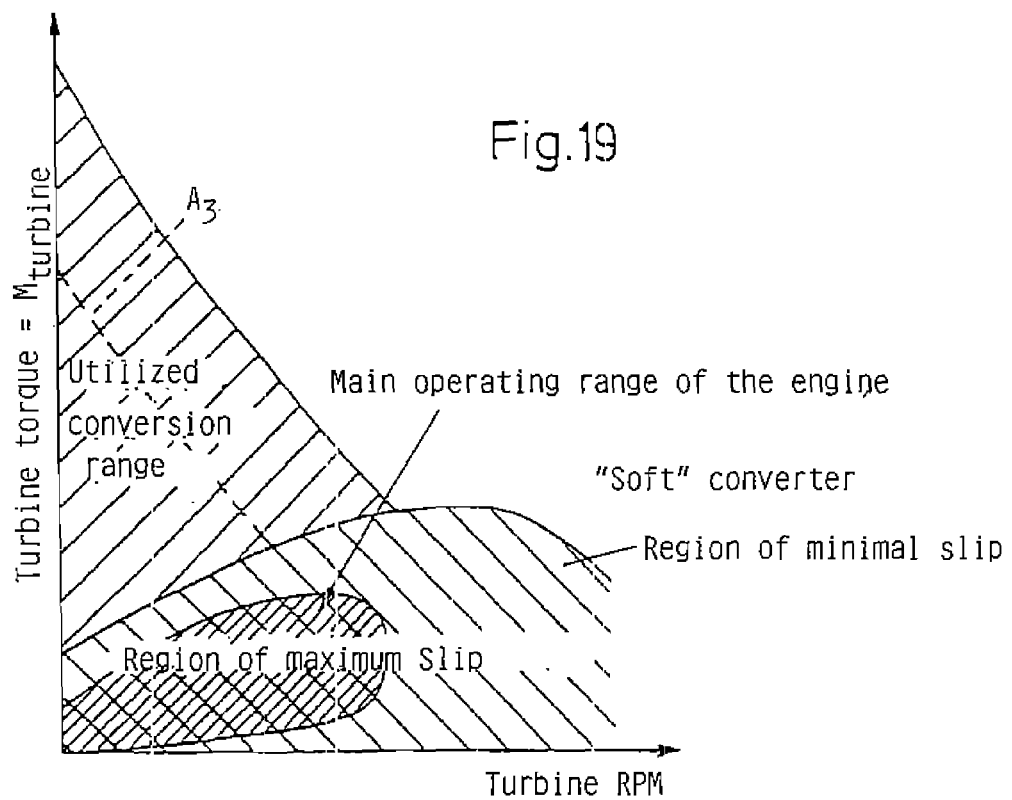

(A) Disengagement of the clutch (B) Engagement of the clutch

- ···· Δn1: Minimal slip needed to avoid booming
- — Δn2: Slip needed to avoid drop of slip below a minimal value during unstable operation
- —·— Δn3: Slip likely to develop during unstable operation
- — Δn4: Slip necessary to avoid excessive choking of the engine Fig. 27
1. Acoustics 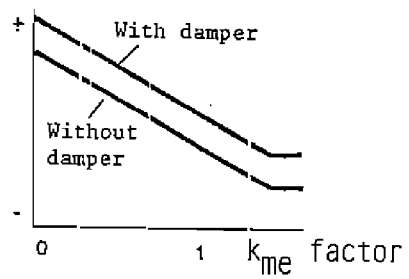
2. Thermal stressing 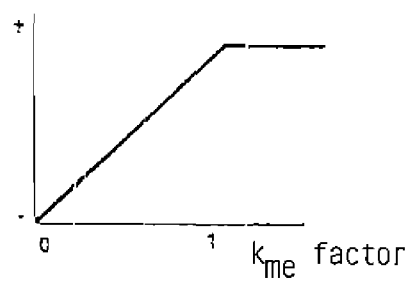
3. Pulling force 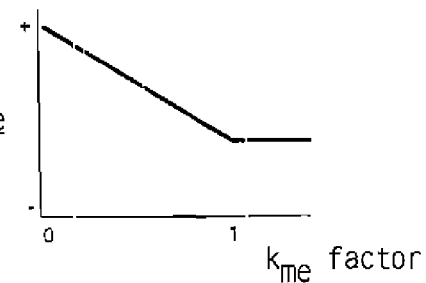
4. Consumption 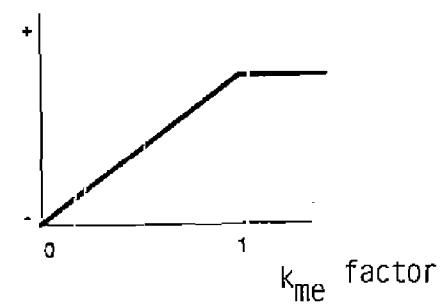
5. Reaction to changes of load 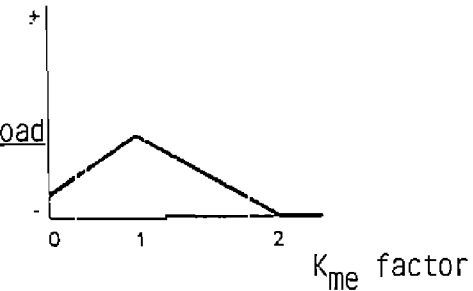

Fig. 29
Example 1:
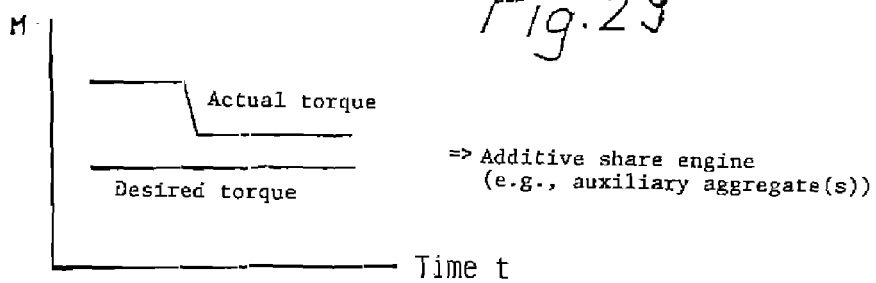
=> Additive share engine (e.g., auxiliary aggregate(s))
Example 2:
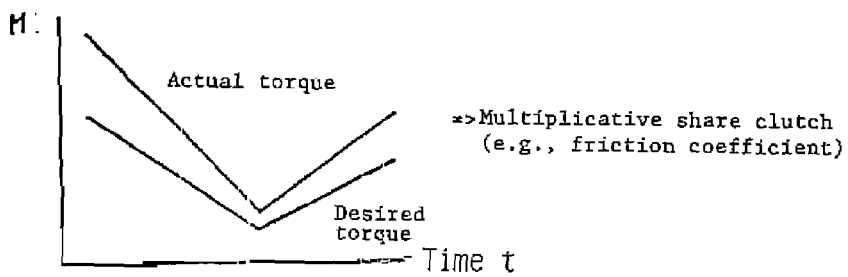
=> Multiplicative share clutch (e.g., friction coefficient)
Example 3:
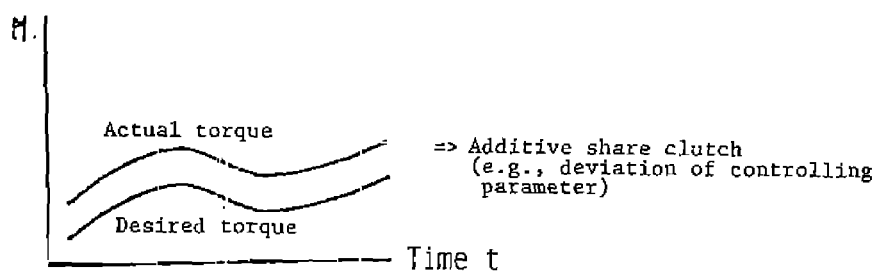
=> Additive share clutch (e.g., deviation of controlling parameter)

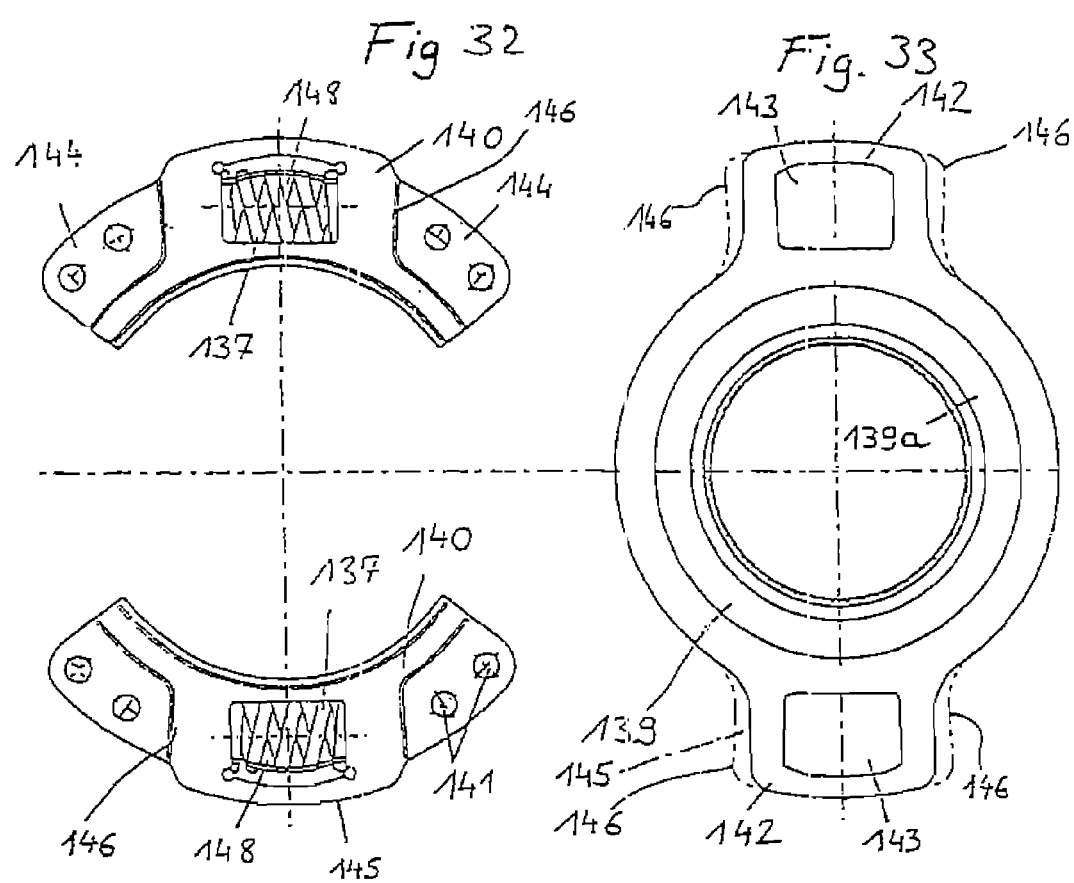

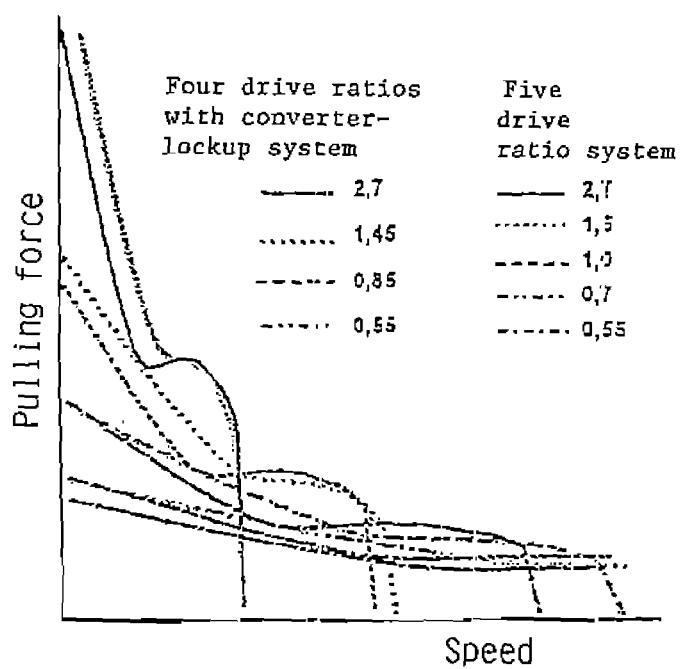

METHOD OF AND APPARATUS FOR TRANSMITTING TORQUE IN VEHICULAR POWER TRAINS

CROSS-REFERENCE TO RELATED CASES

The disclosure of commonly owned U.S. Pat. No. 5,385,222 granted Jan. 31, 1995 to Otto et al, for "Coupling for a hydraulic flow converter" is incorporated herein by reference.

This is a continuation-in-part of the commonly owned patent application Ser. No. 08/306,671 filed Sep. 15, 1994 (now U.S. Pat. No. 5,752,894) by Fischer for "Method of and apparatus for utilizing and operating a hydrokinetic torque converter with lockup clutch"; of the commonly owned patent application Ser. No. 08/281,409 filed Jul. 27, 1994 (now U.S. Pat. No. 5,501,309) by Walth et al. for "Hydrokinetic torque converter and lockup clutch therefor"; of commonly owned patent application Ser. No. 08/272,920 filed Jul. 8, 1994 (now abandoned) by Otto et al. for "Hydrokinetic torque converter and lockup clutch therefor"; of commonly owned patent application Ser. No. 08/375,913 filed Jan. 20, 1995 (now U.S. Pat. No. 5,738,198) by Walth et al. for "Friction element for use in clutches"; and of commonly owned patent application Ser. No. 08/285,546 filed Aug. 3, 1994 (now abandoned) by Kremmling et al. for Motor vehicle with electronic clutch management system".

BACKGROUND OF THE INVENTION

The invention relates to improvements in power trains which can be utilized with advantage in vehicles, especially in engine-driven motor vehicles. More particularly, the invention relates to improvements in methods of and in apparatus for transmitting torque in vehicular power trains. Still more particularly, the invention relates to improvements in methods of and in apparatus for transmitting torque from the rotary output element of a prime mover, such as a combustion engine in a motor vehicle, to a transmission (especially automatic transmission) having an input element which receives torque from the output element of the prime mover by way of a hydrokinetic torque converter and a slip clutch (known as lockup clutch or bypass clutch).

It is known to regulate the magnitude of torque which is being transmitted by a slip clutch, i.e., to vary the slip of the clutch which latter is normally connected in parallel with the hydrokinetic torque converter, by resorting to a monitoring system which serves to transmit signals denoting one or more variable parameters to a computerized central regulating or slip selecting unit.

In many power trains of the above outlined character, the hydrokinetic torque converter comprises a housing which receives torque from the output element of the prime mover and defines a fluid-containing chamber for a turbine and (if necessary or desired) a stator. The turbine is designed to transmit torque to the input element of the transmission. The slip clutch is confined in the housing and includes an axially movable piston (pressure plate) which divides the chamber into two fluid-containing compartments. The pressure differential between the bodies of hydraulic fluid in the two compartments of the chamber in the housing determines the extent of slip of the piston relative to an adjacent portion of the housing and hence the magnitude of torque which the piston of the engaged or partly engaged slip clutch can transmit from the housing (i.e., from the output element of the prime mover) to the turbine (i.e., to the input element of the transmission). The pump of the torque converter constitutes (or can constitute) a component part is of the housing. When the slip clutch is at least partially engaged, a friction face of the piston (or of a friction lining which is carried by the piston) is in more or less pronounced frictional engagement with a friction face of the adjacent portion of the housing of the torque converter (or with a friction face of a friction lining on the adjacent portion of the housing). Certain presently preferred configurations of the piston of the slip clutch and the adjacent portion of the housing of the torque converter, as well as certain presently preferred modes of preventing overheating of and excessive wear upon the friction faces and/or linings of the slip clutch are disclosed in the aforementioned and other commonly owned copending United States and other patent applications of the assignee of the present application.

German patent application No. 31 30 871 A1 (filed in the name of Takeo Hiramatsu and published Mar. 18, 1982) discloses a torque transmitting system wherein the torque regulating assembly comprises means for ascertaining the differences between the RPM of the output element of the prime mover and the RPM of the input element of the transmission receiving torque from torque converter. The thus ascertained differences are compared with desired values and the torque regulating assembly is designed to undertake the necessary steps if the ascertained actual differences depart from the desired or preselected values. The adjustment involves the establishment of a different pressure relationship between the bodies of hydraulic fluid in the compartments at opposite sides of the piston of the slip clutch, i.e., a change of the slip between the piston of the clutch and the adjacent portion of the torque converter housing. Such post-mortem regulation exhibits a number of serious drawbacks because a correction of the departure of actually ascertained unsatisfactory pressure differential from the desired or optimal pressure differential invariably takes place with a certain delay.

U.S. Pat. No. 5,029,087 (granted Jul. 2, 1991 to Ronald T. Cowan et al. for "Electronic control system for controlling torque converter bypass clutches") discloses a system which also relies on the determination of differences between the actual slip of the lockup clutch and the desired slip to thereupon undertake the necessary corrective measures for the elimination or reduction of the ascertained differences. The adjustment of slip of the lockup clutch involves the establishment of a modified pressure differential between the bodies of hydraulic fluid at opposite sides of the axially movable piston or pressure plate of the lockup clutch. The drawbacks of such proposal are the same as those of the proposal in the published German patent application No. 31 30-871 A1 of Hiramatsu.

U.S. Pat. No. 4,577,737 (granted Mar. 25, 1986 to Yasuhiro Niikura et al. for "Lock-up torque converter and method for controlling clutch slip in lock-up torque converter") discloses a further modification of the aforediscussed prior proposals. The patentees Niikura et al. employ a torque sensor for direct determination of the torque being transmitted by the hydrokinetic torque converter. The transmission of torque is selected in dependency upon the operating condition of the prime mover. This involves such selection of the slip of the lockup clutch that the magnitude of the actually transmitted torque matches the value dictated by the operating condition of the prime mover.

The proposal of Niikura et al. also involves a postmortem regulation of torque transmission from a prime mover to a transmission or another driven unit. Thus, it is again necessary to ascertain whether or not the magnitude of actually transmitted torque is satisfactory and to thereupon carry out necessary corrective undertakings if the monitored magnitude of torque departs from the desired or optimum magnitude. The only difference between the proposal of Niikura et al. and other previously mentioned conventional proposals is that Niikura et al. directly monitor the transmission of torque through the hydrodynamic drive.

The aforediscussed drawbacks of the proposals by Hiramatsu, Cowan et al. and Niikura et al. are believed to be the reason that such proposals failed to gain widespread acceptance in the relevant industries. Delayed adjustments to correct already existing unsatisfactory transmission of torque from a prime mover to a driven unit in the power train of a motor vehicle are particularly undesirable and deleterious in dynamic processes because the adjustments are not compatible with one or more aspects of a dynamic process.

A reduction of torque which is being transmitted by the rotary output element of a prime mover (such as a combustion engine in a motor vehicle) results in a reduction of slip of the lockup clutch which operates in parallel with a hydrokinetic torque converter in the power train between the prime mover and the transmission or another driven unit. In order to prevent blocking of the lockup clutch under the just outlined circumstances (i.e., in order to ensure that the lockup clutch can continue to prevent the transmission of fluctuations of torque from the prime mover to the driven unit), it is necessary to reduce the magnitude of torque which is being transmitted by the lockup clutch. In actual practice, the dynamics of variation of the magnitude of torque being transmitted by a lockup clutch are affected by delays and dead or idle times which are characteristic of the heretofore known torque regulating systems so that the lockup clutch is not likely to or cannot slip at all if the RPM of the output element of the prime mover which transmits torque to the slip clutch is less than 50 RPM.

Another reason that the aforedescribed conventional proposals to regulate the transmission of torque failed to gain acceptance in the automobile and related industries is that a vehicle is often put to use under circumstances when a time-dependent or time-optimized operation of the torque transmission regulating system is not desirable. The distribution of rotary masses in a motor vehicle is often such that the RPM of the input element of a gear shift transmission or an infinitely variable change-speed gearing (i.e., at the output element of the transmission) decreases when the transmission is shifted into a higher drive ratio or when the transmission ratio is changed but the RPM at the output of the transmission remains relatively constant. The slip of the lockup clutch increases in response to a reduction of the RPM of the output of the torque transmitting system which, however, in turn necessitates (due to the characteristics of the hydrokinetic torque converter) an increase of the slip of the lockup clutch. Such increase of slip necessitates an increase of the torque which is being applied to the input of the torque transmitting system, again due to the characteristics of the hydrokinetic torque converter. However, the driving unit is not in a condition to supply a higher torque under the just outlined circumstances of use of the torque transmitting apparatus in a motor vehicle. Therefore, the prime mover is braked to thus automatically establish a renewed slip at a lower level if the application of force to the lockup clutch remains unchanged during a change of the transmission ratio, such as shifting into a higher gear ratio. However, a torque regulator which is designed to carry out an adjustment at proper times will automatically attempt to counteract an increase of the slip of the lockup clutch by increasing the magnitude of the force acting upon the axially movable piston or pressure plate of the lockup clutch in a direction to enhance the frictional engagement between the friction face of the piston of the lockup clutch and the adjacent friction face of the cover or housing of the hydrokinetic torque converter. Therefore, the lockup clutch is likely to block when the torque regulating step is completed, i.e., the apparatus is then compelled to transmit fluctuations of torque from the output element of the prime mover (i.e., from the housing of the torque converter) to the turbine of the torque converter, i.e., to the input element of the transmission which receives torque from the torque converter and/or from the slip clutch.

German patent application No. 37 12 223 A1 of Noboru Sekine et al. (published Nov. 11, 1987) discloses a system which can regulate the transmission of torque in the power train of a motor vehicle, within certain speed ranges, in dependency on the position of the throttle valve and for the purpose of establishing a desired slip of the lockup clutch. The position of the throttle valve within the specific speed range influences the force which acts upon the piston of the lockup clutch in a sense to engage the clutch, i.e., to reduce the slip.

A drawback of the proposal of Sekine et al. is that the magnitude of torque which is being transmitted by the lockup clutch is a function of the position or setting of the throttle valve as well as a function of several other variable parameters including the friction coefficient of the friction lining(s) on the piston of the lockup clutch and/or on the adjacent portion of the housing of the hydrokinetic torque converter. The friction coefficient of a lining in a lockup clutch is dependent upon the variations of temperature, the extent of slip between the piston and the housing, the characteristics of the fluid (such as oil) which fills the housing of the torque converter and others. In other words, the friction coefficient is apt to, and often does, fluctuate within a very wide range. Therefore, the torque transmitting apparatus which is proposed by Sekine et al. also operates properly or acceptably only when the RPM of the housing of the torque converter and/or of the piston of the lockup clutch exceeds a certain minimum value. As a rule, the apparatus of Sakine et al. will fail, the same as at least some of the other aforediscussed apparatus, if the RPM of the output element of the prime mover is less than 50 and normally much more than 50. Such apparatus fail to ensure any savings or any appreciable savings in fuel consumption, i.e., the savings in fuel consumption are not more satisfactory than when the combustion engine of a motor vehicle drives a torque transmitting apparatus which does not embody a lockup clutch or bypass clutch.

Other known attempts to regulate the slip of a lockup clutch, even at 50 RPM and less, have also failed to meet the exacting standards in the automobile making and related industries. For example, it was proposed to provide a lockup clutch with a flat washer-like piston or pressure plate whose rigidity is low so that the magnitude of force which is required to urge the piston against the adjacent portion of the housing of the hydrokinetic torque converter cannot be selected and maintained with a requisite degree of precision and reproducibility. In other words, when the rigidity or stability of the piston is relatively low, the application of a force in a direction to engage such lockup clutch cannot ensure uniform distribution of pressures between the entire friction face of the piston and the entire friction face of the adjacent portion of the housing of the torque converter. This can result in partial overheating of the fluid (such as oil and known as ATF=automatic transmission fluid) which fills the housing of the torque converter and forms two at least partially separated fluid bodies at opposite sides of the piston. Attempts to overcome such drawbacks by increasing the area of the friction face of the piston and/or the adjacent portion of the housing have met with limited success because the space which is available for the installation of a torque transmitting apparatus in the power train of a motor vehicle is normally limited, especially as seen in the radial direction of the torque converter and the associated lockup clutch. Similar problems arise if the dimensions of the torque transmitting apparatus are to be increased in the axial direction of the torque converter. Attempts to employ one or more torsional dampers which are to absorb fluctuations of torque between the piston of the lockup clutch and the turbine of the torque converter and which are installed at a considerable radial distance from the axis of the torque converter are equally unsatisfactory, particularly in view of the large space requirements of such dampers. As a rule, dampers are used to counteract the aforediscussed drawbacks of all or nearly all conventional torque transmission regulating systems, namely that such systems are incapable of adequately regulating the slip of a lockup clutch at rotational speeds of the output element of the prime mover which are close to or less than fifty.

OBJECTS OF THE INVENTION

An object of the invention is to provide a novel and improved method of regulating the transmission of torque between a prime mover and one or more driven units in the power train of a conveyance, such as an engine-driven motor vehicle.

Another object of the invention is to provide a method which renders it possible to ensure predictable, reproducible and optimal adjustment of torque transmission under many or all circumstances when the heretofore known methods fail or are not entirely satisfactory.

A further object of the invention is to provide a method which renders it possible to accurately regulate the transmission of torque at low rotational speeds of the output element of the prime mover, for example, at 50 RPM or less.

An additional object of the invention is to provide a method which can be practiced by resorting to numerous known components of torque transmitting apparatus in the power trains of motor vehicles.

Still another object of the invention is to provide a method which does not exhibit any of the drawbacks of conventional post-mortem methods of regulating the slip of lockup clutches or bypass clutches in hydrokinetic torque converters.

A further object of the invention is to provide a method which renders it possible to accurately select the slip of a lockup clutch in a hydrokinetic torque converter without necessitating any increase in the bulk of the torque transmitting apparatus.

Another object of the invention is to provide a method which reduces the likelihood of overheating of and/or of other undesirable effects upon the fluid which fills the housing of a hydrokinetic torque converter in the power train of a motor vehicle.

An additional object of the invention is to provide a method which can be practiced with apparatus constituting relatively simple and inexpensive but highly effective modifications of heretofore known apparatus for the transmission of torque in the power trains of motor vehicles and/or other types of conveyances.

Still another object of the invention is to provide a torque transmitting apparatus having a slip clutch or bypass clutch with novel and improved means for regulating the slip of the clutch.

A further object of the invention is to provide an apparatus which can be utilized with advantage in available vehicles for the transmission of torque between a prime mover, such as a combustion engine, and a driven unit, such as an automatic transmission.

Another object of the invention is to provide a novel and improved torque transmitting apparatus, particularly for use in the power trains of automotive vehicles.

An additional object of the invention is to provide a conveyance which embodies the above outlined torque transmitting apparatus and the above outlined power train.

Still another object of the invention is to provide a novel and improved combination of a hydrokinetic torque converter, a friction clutch and means for regulating the slip of the friction clutch.

A further object of the invention is to provide novel and improved dampers which can be utilized between the slip clutches and the hydrokinetic torque converters of the above outlined torque transmitting apparatus.

Another object of the invention is to provide a torque transmitting apparatus which embodies a slip clutch and wherein the operation of the slip clutch is satisfactory and can be accurately regulated even if the speed of the output element of the prime mover (such as a combustion engine) is extremely low, e.g., less than 50 RPM.

An additional object of the invention is to provide a novel and improved combination of a lockup clutch or bypass clutch and automatic slip regulating means therefor.

Still another object of the invention is to provide a compact and relatively inexpensive but highly flexible highly reliable means for automatically regulating the operation of a lockup clutch in the power train of a vehicle.

A further object of the invention is to provide a novel and improved combination of a piston or pressure plate forming part of a slip clutch and a housing forming part of a hydrokinetic torque converter in an apparatus of the above outlined character.

An additional object of the invention is to provide an apparatus which can be utilized for the practice of the above outlined method.

SUMMARY OF THE INVENTION

One feature of the present invention resides in the provision of a method of operating a torque transmitting apparatus which receives torque from a rotary output element (e.g., a camshaft or a crankshaft) of a prime mover (such as the combustion engine of a motor vehicle) and transmits torque to a rotary input element (e.g., a shaft) of a transmission (such as an automatic transmission) in a power train of the vehicle. The torque transmitting apparatus of the power train which can be operated in accordance with the improved method can comprise a hydrokinetic torque converter which is designed to transmit torque between the output element of the prime mover and the input element of the transmission and which operates in parallel with a lockup clutch or bypass clutch (hereinafter called slip clutch or friction clutch). The magnitude of torque being transmitted by the clutch is selectively variable by a computerized regulating unit. The method comprises the step of regulating the transmission of torque by the slip clutch as a function of the magnitude of torque being transmitted by the output element of the prime mover (this includes ascertaining and adaptively applying to the slip clutch a variable force for the transmission of a predetermined torque by the clutch with attendant automatic selection of a minimum slip between a torque receiving and a torque transmitting part of the power train. Another step of such method includes carrying out a compensation, particularly long-range compensation, for eventual differences between the predetermined and actual torques being transmitted by the slip clutch.

The torque which is to be transmitted by the slip clutch as a function of the RPM of the output element of the prime-mover is or can be ascertained by the regulating unit in accordance with the equation $$M_{clutch} k_{me} \cdot k_{corr} \cdot (M_{pm} + M_{corr\ pm}) + M_{corr\ wu}.$$

In this equation, $M_{clutch}$ denotes the torque to be transmitted by the slip clutch, $k_{me}$ is a torque dividing factor which is or which can be at least substantially constant within the entire operating range of the power train, $k_{corr}$ is a factor for correction of multiplicative errors, $M_{corr\ pm}$ is correction torque for compensation of errors which are added to the $M_{pm}$, $M_{corr\ wu}$ denotes correction torque which compensates for errors added to the clutch torque $M_{clutch}$. The minimum slip between torque receiving and torque transmitting parts of the power train is automatically selected as a function of the torque dividing factor $k_{me}$ and long-range compensation for any departures of actual torques from the predetermined torques can be carried out in dependency upon the correction factor $k_{corr}$ and correction torques $M_{corr\ pm}$ and $M_{corr\ wu}$.

The torque dividing factor $k_{me}$ is or can be a function of the RPM of the rotary output element, e.g., the factor $k_{me}$ can be solely or exclusively a function of the RPM of the rotary output element of the prime mover. Alternatively, the torque dividing factor $k_{me}$ can be a function of the RPM of the rotary output element as well as of the torque being transmitted by such element. It is also possible to select the factor $k_{me}$ in such a way that it is a function of the RPM and of the torque being transmitted by the prime mover.

The torque which is being transmitted by the slip clutch can be varied by a pressure differential between two bodies of a hydraulic fluid (such as oil) one of which is confined in a first compartment disposed between a housing of the hydrokinetic torque converter and a piston or pressure plate of the slip clutch, and the other of which is confined in a second compartment between the housing and the piston or pressure plate. Thus, the two compartments are disposed at opposite sides of the piston or pressure plate of the slip clutch.

If the prime mover which transmits torque to the torque transmitting apparatus is a combustion engine, the operating condition of the power train can be dependent upon at least one of a plurality of variable parameters including (a) the RPM of the rotary output element and the position of the throttle control lever of the vehicle, (b) the RPM of the rotary output element and the rate of admission of fuel to the engine, (c) the RPM of the rotary output element and the subatmospheric pressure in a suction pipe of the engine, and (d) the RPM of the rotary output element and the duration of fuel injection into the engine.

The regulating step can include shifting from the transmission by the slip clutch of a first torque to the transmission of a different second torque with a certain delay, namely a delay which is a function of a variable parameter denoting the division of torque being transmitted by the rotary output element of the prime mover into a first torque being transmitted by the hydrokinetic torque converter and a second torque being transmitted by the slip clutch. The variable parameter can constitute a pressure differential between the aforementioned bodies of hydraulic fluid in the housing of the torque converter at opposite sides of the piston or pressure plate of the slip clutch. Alternatively, the variable parameter is or can be variable as a function of a difference between the RPM of the rotary output element of the prime mover and the RPM of the rotary input element of the transmission. Still further the parameter can vary as a function of a gradient of the RPM of the rotary output element of the prime mover. If the variable parameter is constituted by the variable pressure differential between the two bodies of hydraulic fluid at the opposite sides of the piston or pressure plate of the clutch, the pressure differential can be actually varied by (a) a PI regulator or (b) a PID regulator. If the pressure differential is actually varied by a PI regulator or by a PID regulator, the variation of the pressure differential can be unequivocally defined by a non-analytical technique. In other words, the manner of carrying out the transition from a previously prevailing pressure differential to the desired pressure differential is not susceptible of unequivocal analytical description.

It is equally within the purview of the invention to vary the pressure differential between the two fluid bodies at opposite sides of the piston or pressure plate forming part of a slip clutch and being installed for axial movement in the housing of a hydrokinetic torque converter by scanning a characteristic curve and utilizing the thus obtained signals to determine differences between actual and desired pressure differentials. Such regulating step further comprises eliminating the thus ascertained differences by establishing a so-called I return flow of fluid from one of the compartments into the other compartment. Again, variation of the pressure differential is unequivocally definable by a non-analytical technique. Otherwise stated, the manner of carrying out the transition from a previously established pressure differential to the new or desired pressure differential is not susceptible of unequivocal analytical description. The aforementioned signals are or can be generated as a result of variable flow of fluid between the two fluid bodies through an adjustable valve.

Still further, if the magnitude of torque being transmitted by the slip clutch is variable by the aforediscussed pressure differential between the two bodies of hydraulic fluid at opposite sides of the piston or pressure plate of the clutch, the pressure differential can be varied by a PI regulator, an I regulator or a PID regulator. The variable flow of hydraulic fluid between the two fluid bodies can be monitored for the generation of signals as a function of a duty factor or as a function of fluid flow through an adjustable valve. Again, the variation of the pressure differential is unequivocally definable by a non-analytical technique, i.e., the manner of carrying out the transition from the previously established pressure differential to the desired pressure differential is not susceptible of unequivocal analytical description.

The step of carrying out a compensation for eventual differences between the predetermined and actual torques being transmitted by the slip clutch can include monitoring the actual torques being transmitted by the clutch and comparing the actual torques with reference values.

Alternatively, the step of carrying out a compensation can include computing the torque being converted by the hydrokinetic torque converter on the basis of the characteristics of the torque converter and determining the actual ratio of torques being transmitted by the torque converter and the slip clutch.

If the torque to be converted by the slip clutch as a function of the RPM of the output element of the prime mover is ascertained by the regulating unit in accordance with the aforementioned equation $$M_{clutch} = k_{me} \cdot k_{corr} \cdot (M_{pm} + M_{corr\ pm}) + M_{corr\ wu},$$

the minimum slip between torque receiving and torque transmitting parts of the power train can be automatically selected as a function of the torque dividing factor $k_{me}$ and long-range compensation for any departures of actual torques from the predetermined torques such as are being carried out in dependency upon the correction factor $k_{corr}$ and correction torques $M_{corr\ pm}$ and $M_{corr\ wu}$. The differences between the actual and predetermined torques being transmitted by the slip clutch are or can be attributable to at least one of (a) multiplicative errors ($k_{corr} \neq 0$, $M_{corr\ pm}=0$, $M_{corr\ wu}=0$), (b) errors which are additive to prime mover torque ($k_{corr}=0$, $M_{corr\ pm} \neq 0$, $M_{corr\ wu}=0$), (c) errors additive to the clutch torque ($k_{corr}=0$, $M_{corr\ pm}=0$, $M_{corr\ wu} \neq 0$), (d) multiplicative errors and additive errors to prime mover torque ($k_{corr} \neq 0$, $M_{corr\ pm} \neq 0$, $M_{corr\ wu}=0$), (e) errors multiplicative and additive to prime mover torque ($k_{corr} \neq 0$, $M_{corr\ pm}=0$, $M_{corr\ wu} \neq 0$) multiplicative of and additive to prime mover torque and clutch torque ($k_{corr} \neq 0$, $M_{corr\ pm} \neq 0$, $M_{corr\ wu} \neq 0$). The step of carrying out a compensation in such method takes place or can take place with a time constant of several seconds to thus impart to the step of carrying out compensation a purely adaptive character.

If the prime mover is operable at a plurality of speeds, the method can further comprise the step of utilizing a desired acceleration of the prime mover by an operator of the vehicle to increase the slip of the clutch as a result of a reduction of the aforementioned factor $k_{me}$ which denotes the division of torque being transmitted by the rotary output element into first and second torques being respectively transmitted by the hydrokinetic torque converter and the slip clutch with attendant establishment of additional spare torque which can be transmitted by the torque converter and which is attributable to an increase of the torque being transmitted by the torque converter.

If the transmission of the power train has a plurality of drive ratios, the regulating step can include utilizing the slip of the clutch at each of the plurality of drive ratios as a primary factor and the efficiency of the torque converter as a secondary factor for the transmission of torque from the rotary output element of the prime mover to the rotary input element of the transmission to thus permit the utilization of a hydrokinetic torque converter operating with a high stall speed and having a wide torque conversion range.

If the transmission has a plurality of speed ratios, the regulating step can include utilizing the slip of the clutch at each of the speed ratios as a primary factor and the efficiency of the torque converter as a secondary or background factor for the transmission of torque from the rotary output element of the prime mover to the rotary input element of the transmission to thus permit the utilization of a torque converter operating with a high stall speed and having a wide torque transmission range.

Another feature of the invention resides in the provision of a method of operating a torque transmitting apparatus which receives torque from a rotary output element of a prime mover (e.g., the camshaft or the crankshaft of a combustion engine) and transmits torque to a rotary input element (e.g., a shaft) of an automatic transmission in a power train of a vehicle, wherein a hydrokinetic torque converter serves to transmit torque between the output element of the prime mover and the input element of the transmission in parallel with a slip clutch, and wherein the magnitude of torque being transmitted by the clutch is variable by a monitoring unit in conjunction with a central computer unit. The application of force to, and hence the magnitude of torque being transmitted by, the slip clutch is selectively regulatable by the computer unit. The method of operating such torque transmitting apparatus comprises the steps of ascertaining the magnitude of torque to be transmitted by the slip clutch in dependency upon the operating condition of the power train in accordance with the equation $$M_{clutch} k_e \cdot k_{corr} \cdot M_{pm}$$

wherein $k_e (=k_{me})$ denotes a torque dividing factor which is at least substantially constant within the entire operating range of the power train, $k_{corr}$ is a correction factor or constant, $M_{clutch}$ is the torque being transmitted by the slip clutch and $M_{pm}$ is the torque being transmitted by the rotary output element of the prime mover, ascertaining the magnitude of the force to be applied by the clutch for the transmission of a predetermined torque, applying the thus ascertained force to the clutch with attendant automatic selection of the slip between the input and output elements as a function of the torque dividing factor $k_e$ and compensation for eventual departures from the desired torque transmission (as a function of the correction factor $k_{corr}$) due to the characteristics of the selected power train.

A further feature of the invention resides in the provision of a method of operating a torque transmitting apparatus, particularly in a power train for a motor vehicle, which receives torque from a rotary output element of a prime mover, such as a combustion engine, and transmits torque to a rotary input element of an automatic transmission, wherein a hydrokinetic torque converter serves to transmit torque between the output element of the prime mover and the input element of the transmission in parallel with a slip clutch, and wherein the magnitude of torque being transmitted by the clutch is selectively variable by a monitoring device in conjunction with a central computer unit. The method comprises the steps of ascertaining the magnitude of the torque $M_{clutch}$ to be transmitted by the slip clutch in dependency upon the operating condition of the torque transmitting apparatus in accordance with the equation $M_{clutch} = k_e \cdot k_{corr} \cdot M_{pm}$ wherein $k_e = k_{me}$ denoting a torque dividing factor which is independent of a characteristic field of the prime mover, $k_{corr}$ is a correction factor, and $M_{pm}$ is the torque being transmitted by the prime mover, ascertaining the magnitude of the force to be applied to the clutch for the transmission of a predetermined torque, and applying the thus ascertained force to the clutch with attendant (resulting) automatic selection of the slip between the output element of the prime mover and the input element of the transmission as a function of the factor $k_e$ and attendant (resulting) compensation for eventual departures from the desired torque transmission (as a function of the correction factor or constant $k_{corr}$) due to the characteristics of the selected power train.

Another feature of the invention resides in the provision of a method of operating a torque transmitting apparatus, particularly in a power train of a motor vehicle, which receives torque from a rotary output element of a prime mover, such as a combustion engine, and transmits torque to a rotary input element of an automatic transmission, wherein a hydrokinetic torque converter serves to transmit torque between the output element of the prime mover and the input element of the transmission in parallel with a slip clutch, and wherein the magnitude of torque being transmitted by the clutch is selectively variable by a monitoring device in conjunction with a central computer unit. This method comprises the steps of ascertaining the magnitude of torque $M_{clutch}$ to be transmitted by the clutch in dependency upon the operating condition of the torque transmitting apparatus in accordance with the equation $M_{clutch}=k_e \cdot k_{corr} \cdot M_{pm}$ wherein $k_e=k_{me}$ denoting a torque dividing factor which is dependent only upon the RPM of the output element of the prime mover, $k_{corr}$ is a correction factor and $M_{pm}$ is the torque being transmitted by the prime mover, ascertaining the magnitude of the force to be applied to the clutch for the transmission of a predetermined torque, and applying the thus ascertained force to the clutch with attendant automatic selection of the slip between the output element of the prime mover and the input element of the transmission as a function of the factor $k_e$ and compensation for eventual departures from the desired torque transmission (as a function of the correction factor $k_{corr}$) due to the characteristics of the selected power train.

Still another feature of the invention resides in the provision of a method of operating a torque transmitting apparatus, particularly in a power train of a motor vehicle, which receives torque from a rotary output element of a prime mover (such as a combustion engine) and transmits torque to a rotary input element of an automatic transmission, wherein a hydrokinetic torque converter serves to transmit torque between the output and input elements in parallel with a slip clutch, and wherein the magnitude of torque being transmitted by the clutch is selectively variable by a monitoring device in cooperation or conjunction with a central computer unit. This method comprises the steps of ascertaining the magnitude of the torque $M_{clutch}$ to be transmitted by the slip clutch in dependency upon the operating condition of the torque transmitting apparatus in accordance with the equation $M_{clutch}=k_e \cdot k_{corr} \cdot M_{pm}$ wherein $k_e=k_{me}$ denoting a torque dividing factor which is dependent upon the RPM of the output element of the prime mover and the magnitude of torque being transmitted by the output element of the prime mover, $k_{corr}$ is a correction factor and $M_{pm}$ is the torque being transmitted by the prime mover, ascertaining the magnitude of the force to be applied by the clutch for the transmission of a predetermined torque, and applying the thus ascertained force to the clutch with attendant (resulting) automatic selection of the slip between the output and input elements as a function of the factor $k_e$ and attendant automatic (resulting) compensation for eventual departures from the desired torque transmission (as a function of the correction factor $k_{corr}$) due to the characteristics of the selected power train.

A further feature of the invention resides in the provision of a method of operating a torque transmitting apparatus which receives torque from a rotary output element of a prime mover (such as a combustion engine) and transmits torque to a rotary input element of an automatic transmission in a power train of a vehicle, wherein a hydrokinetic torque converter serves to transmit torque between the output and input elements in parallel with a slip clutch, wherein the magnitude of torque being transmitted by the clutch is variable by a pressure differential between two bodies of a hydraulic fluid one of which is confined in a first compartment between a housing of the torque converter and the slip clutch and the other of which is confined in a separate second compartment between the housing and the clutch, and wherein the pressure differential is variable by a monitoring unit in conjunction or cooperation with a central computer unit and the application of force to, and hence the magnitude of torque being transmitted by, the slip clutch is selectively regulatable by the computer unit. This method comprises the steps of ascertaining the magnitude of torque to be transmitted by the clutch in dependency upon the operating condition of the power train in accordance with the equation $$M_{clutch}=k_e \cdot k_{corr} \cdot M_{pm}$$

wherein $M_{clutch}$ is the torque to be transmitted by the slip clutch, $k_e=k_{em}$ denoting a torque dividing factor which satisfies at least one of the requirements including (a) at least substantial constancy within the entire operating range of the power train, (b) independence from the characteristic field of the prime mover, (c) dependency exclusively or solely upon the RPM of the output element of the prime mover, and (d) dependency upon the RPM of the prime mover and the magnitude of torque being transmitted by the output element, $k_{corr}$ is a correction factor, and $M_{pm}$ is the torque being transmitted by the rotary output element of the prime mover, ascertaining the magnitude of the force to be applied to the clutch for the transmission of a predetermined torque, and applying the thus ascertained force to the clutch with attendant (resulting) automatic selection of the slip between the output and input elements as a function of the torque dividing factor $k_e$ and automatic (resultant) compensation for eventual departures from the desired torque transmission (as a function of the correction factor $k_{corr}$) due to the characteristics of the selected power train.

The prime mover can constitute a combustion engine the operating condition of which is dependent upon the RPM of the output element and upon the position of a throttle valve lever of the motor vehicle.

Furthermore, the prime mover can constitute a combustion engine the operating condition of which is dependent upon the RPM of the output element and the subatmospheric pressure in a suction pipe of the engine.

Still further, the prime mover can constitute a combustion engine the operating condition of which is dependent upon the RPM of the output element and the duration of fuel injection into the engine.

The method which embodies the aforediscussed further feature of the invention can further comprise the step of selecting in the central computer unit that torque which is to be transmitted by the clutch in response to changes of the torque being transmitted by the power train in accordance with the following undertakings: (A) advance determination of a parameter X which is indicative of the torque being transmitted by the clutch at an instant $t_{n+1}$ after the elapse of a monitoring interval and which is ascertained in accordance with a function excluding at least one undesirable phenomenon (such as blocking of the slip clutch), (B) determination of a gradient $\Delta X$ which is required to arrive at a desired value of the parameter X after the elapse of an interval $\Delta t$, (C) applying the thus determined gradient $\Delta X$ with a hydraulic system including a proportionality regulation wherein a parameter includes a pressure differential $\Delta P$ established in advance between bodies of a hydraulic fluid at opposite sides of a piston or pressure plate of the slip clutch in a housing of the torque converter in accordance with the equation $$\Delta P_{n+1}=(1-\beta) \cdot \Delta P_{desired}+\beta \cdot P_n$$

wherein $\beta=f(T_v, t)$, and (D) repeating the steps (A), (B) and (C) until the parameter X matches or at least very closely approximates the desired parameter.

The method which embodies the aforediscussed further feature of the invention can also comprise the step of selecting in the central computer unit that torque which is to be transmitted by the slip clutch, in response to changes of torque being transmitted by the power train, in accordance with the following undertakings: (A) determining a gradient $\Delta X$ of a parameter X which is indicative of the torque being transmitted by the clutch and is ascertained in accordance with a function excluding at least one undesirable phenomenon (such as short-lasting blocking of the slip clutch), (B) applying the gradient $\Delta X$ with a hydraulic system wherein the gradient is indicative of the pressure differential $\Delta P$ between bodies of hydraulic fluid at opposite sides of a pressure plate or piston of the slip clutch in a housing of the torque converter and is arrived at in accordance with the equation $$\Delta\Delta P = C_1 \cdot (\Delta P_{desired} - \Delta P_n)$$

wherein $C_1$ is a proportionality factor, and (C) repeating the steps (A) and (B) until the parameter X matches or at least closely approximates a desired value.

The method which embodies the aforediscussed further feature of the invention can be practiced with a torque transmitting apparatus wherein a reduction of the torque being transmitted to the torque converter is likely to develop as a result of at least one of a plurality of occurrences including shifting of the transmission into a lower drive ratio and attachment of at least one auxiliary aggregate to an output element of the transmission; such reduction of torque is likely to entail short-lasting blocking of the slip clutch. The method can further comprise the steps of reducing the magnitude of torque being transmitted by the slip clutch including at least one of the following undertakings: (A) reducing the factor $k_e$ by a predetermined value, (B) reducing the factor $k_{corr}$ by a predetermined value, and thereupon gradually increasing the reduced factor $k_e$ and/or $k_{corr}$ as a function of time to a value which ensures insulation of the transmission against vibrations and further ensures economical fuel consumption by the prime mover.

Still further, the method which embodies the aforediscussed further feature of the invention can be practiced with a torque transmitting apparatus wherein a reduction of torque being transmitted by such apparatus is likely to develop as a result of at least one of a plurality of occurrences including shifting of the transmission into a different drive ratio and attachment of at least one aggregate to an output element of the transmission and wherein such reduction of torque is likely to entail short-lasting blocking or blockage of the slip clutch. Such method preferably further comprises the steps of reducing the magnitude of torque being transmitted by the clutch including at least one of the following undertakings: (A) reducing the factor $k_e$ by a predetermined value, and (B) reducing the factor $k_{corr}$ by a predetermined value, and thereupon increasing the reduced factor $k_e$ and/or $k_{corr}$ as a function of time to a value which ensures corr insulation of the transmission from vibrations and economical fuel consumption by the prime mover.

If the factor $k_{corr}$ is indicative of the selected power train in the vehicle, the method can further comprise the steps of selecting the factor $k_{corr}$ to compensate for eventual departures of the characteristics of the selected power train from desired characteristics including monitoring that slip of the clutch which develops in a predetermined quasi stationary range of operation of the torque transmitting apparatus with a time delay which is sufficient to prevent the transmission of fluctuations of transmitted torque, comparing the monitored slip with a reference value which is selected to ensure optimal insulation of the transmission from vibrations and to ensure optimal fuel consumption by the prime mover, and altering the slip of the clutch when the monitored slip departs from the reference value.

The method can further comprise the step of reducing at least one of the factors $k_e$ and $k_{corr}$ in response to detected indication of intended acceleration of the prime mover (such as by a change of the position of a throttle control lever of the vehicle) with attendant increase of slip of the clutch and the establishment of additional spare torque being transmittable by the torque converter.

If the transmission has a plurality of drive ratios, the regulating step can comprise utilizing the slip of the clutch at each of the plurality of drive ratios as a primary factor and the efficiency of the torque converter as a secondary factor for transmission of torque from the rotary output element to the rotary input element to thus permit the utilization of a torque converter having a wide torque conversion range.

The regulating step can include utilizing the slip of the clutch at each speed ratio of the transmission as a primary factor and the efficiency of the torque converter as a secondary or auxiliary factor for the transmission of torque from the rotary output element of the prime mover to the rotary input element of the transmission to thus permit the utilization of a torque converter having a wide torque conversion range.

An additional feature of the invention resides in the provision of a method of regulating, as a function of the magnitude of torque, the slip of a friction clutch which transmits torque jointly with a hydrokinetic torque converter to a transmission having a plurality of speed ratios including at least two forward speed ratios. The method comprises the step of selecting—at least for the forward speed ratios—the slip of the clutch as a function of at least one of two variable parameters including the energy requirements and the output of the torque transmitting apparatus including the clutch and the torque converter.

A further feature of the invention resides in the provision of a method of regulating the operation of a driving unit wherein a rotary output element of a combustion engine transmits torque to a hydrokinetic torque converter and to a slip clutch. The method comprises the steps of selecting the slip of the clutch in two stages including a first stage while the output element transmits between about 10% and about 60% of a maximum torque capable of being transmitted by the engine and a second stage while the output element transmits torque exceeding the torque being transmitted during the first stage. The maximum torque transmittable by the slip clutch during the first stage is or can be between at least 1 and 1.2 times the torque being transmitted by the output element of the engine. The maximum torque which is transmittable during the first stage can at least match the torque being transmitted by the engine. The design of the driving unit can be such that, during the first stage, the output element of the engine transmits between about 15% and about 50% of maximum torque capable of being transmitted by the engine and the second stage then involves the transmission of torque exceeding the torque being transmitted during the first stage.

Still another feature of the invention resides in the provision of a method of operating a driving unit which is adapted to be used in a motor vehicle and employs a variable-speed combustion engine with a rotary torque transmitting output element, a transmission, a hydrokinetic torque converter which is driven by the output element of the engine and serves to transmit torque to the transmission, and an adjustable slip clutch which is engageable to transmit torque from the output element of the engine to the transmission. The method comprises the step of adjusting the slip clutch as a function of variations of torque being transmitted by the output element of the engine. The transmission is or can constitute an automatic transmission, such as a multistep transmission, a continuously variable transmission, an infinitely variable transmission, an infinitely variable transmission employing sheaves and one or more endless flexible elements trained over the sheaves, a transmission which is shiftable into a finite number of drive ratios or a transmission which is shiftable into an infinite number of drive ratios.

The apparatus of the present invention can be utilized to transmit torque between a variable-speed rotary output element of a prime mover (such as a combustion engine in a motor vehicle) and a rotary input element of a driven unit (e.g., an automatic transmission). The improved apparatus comprises a hydrokinetic torque converter including a housing rotatable about a predetermined axis, defining a fluid-containing chamber and receiving torque from the output element of the prime mover, a pump which is driven by (and can form part of) the housing, a turbine disposed in the housing and serving to transmit torque to the input element, and a stator (which is optional) disposed in the housing between the pump and the turbine. The apparatus further comprises a friction clutch having a piston or pressure plate disposed in the chamber between the turbine and the housing and comprising a conical radially outer portion which is movable in the direction of the axis of the housing into and from frictional engagement with a complementary portion of the housing to thereby respectively engage and disengage the clutch. The piston or pressure plate further comprises a radially inner portion which is non-rotatably and sealingly connected with the turbine.

The radially inner portion of the piston or pressure plate (hereinafter called piston for short) can include a first hub and the turbine can include a second hub. One of these hubs is or can be sealingly and non-rotatably telescoped into the other hub.

The complementary portion of the housing and the radially inner portion of the piston can diverge radially outwardly and away from the turbine, as seen in the direction of rotational axis of the housing of the torque converter.

The apparatus can further comprise a torsional damper between the clutch and the turbine, and such damper can include an input member which is non-rotatably connected with the piston, an output member which is non-rotatably connected with the turbine, and at least one annular torque transmitting member disposed between the input and output members and acting in the circumferential direction of the piston.

The output member of the torsional damper can be non-rotatably connected with a radially outer portion of the turbine.

The output member of the damper can constitute or include an annulus which is bonded (e.g., welded) to the turbine and is provided with motion transmitting portions extending toward the radially outer portion of the piston.

In accordance with a presently preferred embodiment, the torsional damper between the clutch and the turbine can include an input member having at least one leaf spring (or a leaf spring-shaped portion) connected with the piston of the clutch. The radially outer portion of the piston has a friction face which confronts a friction face of the complementary portion of the housing and a surface which faces away from the friction faces. The damper further includes energy storing elements which extend circumferentially of the radially outer portion of the piston and the input member of the damper further includes first projections extending from the aforementioned surface of the radially outer portion of the piston and at least partially surrounding the energy storing elements, and second projections alternating with the energy storing elements in the circumferential direction of the radially outer portion of the piston.

An additional feature of the invention resides in the provision of an apparatus for transmitting torque in a power train between a variable-speed rotary output element of a prime mover and a rotary input element of an automatic transmission installed in a conveyance and having a plurality of speed ratios. The apparatus comprises a hydrokinetic torque converter which receives torque from the output element of the prime mover and serves to transmit torque to the input element of the transmission. The torque converter comprises a housing which receives torque from the output element of the prime mover and defines a fluid-containing chamber, and a turbine which is rotatable in the housing about a predetermined axis. The improved apparatus further comprises a slip clutch which is installed to operate in parallel with the torque converter and includes a piston disposed in and dividing the chamber of the torque converter housing into first and second compartments. The piston is movable in the direction of the axis of the torque converter housing to thereby engage and disengage the clutch as a result of the establishment of pressure differentials between the fluids in the compartments so that the pressure differentials determine the magnitude of the torque being transmitted by the clutch from the housing of the torque converter to the turbine. Still further, the improved apparatus comprises means for selecting the pressure differentials for all speed ratios of the transmission as a function of at least one of a plurality of variable parameters and such selecting means includes means for monitoring the at least one parameter. The ratio of the torque converter is greater than 2.5.

The at least one parameter is or can be the heat which is generated by the apparatus while the conveyance is in motion, and the selecting means can include means for comparing the thus ascertained heat with a predetermined value denoting a maximum permissible heat.

The selecting means can include means for establishing a pressure differential which entails or brings about a reduction of the generation of heat by the clutch in response to detection by the selecting means of at least one of a plurality of circumstances of operation of the conveyance. For example, the selecting means can be designed to be operative to select a pressure differential at which the clutch is operated with a minimal slip of the piston and the housing relative to each other except when the at least one circumstance of operation involves or constitutes starting or acceleration or movement of the conveyance along sloping roads (e.g., along mountain roads).

Such apparatus can further comprise a torsional damper which is interposed between the piston of the clutch and the turbine of the torque converter to damp fluctuations of torque being transmitted by the clutch at least when the conveyance is operated at or under a partial load.

Still another feature of the invention resides in the provision of an apparatus for transmitting torque in a power train between a variable-speed rotary output element of a prime mover (such as a combustion engine in a motor vehicle) and a rotary input element of an automatic transmission installed in the power train of the motor vehicle or another conveyance and having a plurality of transmission ratios. The apparatus comprises a hydrodynamic torque converter having a conversion ratio greater than 2.5 and including a housing rotatable by the output element of the prime mover about a predetermined axis and defining a fluid-containing chamber, and a turbine which is rotatable in the chamber about the aforementioned axis and serves to transmit torque to the input element of the transmission. The apparatus further comprises a slip clutch which operates in parallel with the torque converter and includes a piston installed in and dividing the chamber of the torque converter housing into a first compartment for the turbine and a second compartment. The piston is movable in the direction of the predetermined axis to thus at least partially engage and disengage the clutch in response to the establishment of different pressure differentials between the fluids in the two compartments. The piston has a friction face in contact with a friction face of the housing in the engaged condition of the clutch, and the apparatus further comprises computerized means including a hydraulic circuit between the two compartments and being operative or operable to select the pressure differential (and hence the magnitude of torque being transmitted by the clutch) at least at some of the transmission ratios of the transmission. The computerized means is or can be operative to select the pressure differential as a function of the heat which is generated by the torque transmitting apparatus while the conveyance is in motion and to compare the thus ascertained heat with a predetermined value denoting a maximum permissible heat. Alternatively, or in addition thereto, the computerized means can include means for establishing a pressure differential which entails a reduction of heat generation by the clutch in response to detection by a selecting means of the computerized means of at least one of a plurality of extreme circumstances of operation of the conveyance. The selecting means can be operative to select a pressure differential at which the clutch is operated with a minimal slip of the piston and the housing relative to each other except when the at least one circumstance of operation involves starting or acceleration of the conveyance or advancement of the conveyance along sloping roads (such as mountain roads).

The apparatus can further comprise a torsional damper which is interposed between the piston of the clutch and the turbine of the torque converter to damp fluctuations of torque being transmitted by the clutch at least when the conveyance is operated at or under a partial load.

A further feature of the invention resides in the provision of an apparatus for transmitting torque in a power train between a variable-speed rotary output element of a prime mover and a rotary input element of an automatic transmission installed in a power train of a conveyance and having a plurality of forward transmission or drive ratios. The apparatus comprises a hydrodynamic torque converter having a conversion ratio greater than 2.5 and including a housing rotatable by the output element of the prime mover about a predetermined axis and defining a fluid-containing chamber, and a turbine which is rotatable in the chamber about the aforementioned axis and serves to transmit torque to the input element of the transmission. The apparatus further comprises a slip clutch which is disposed in parallel with the torque converter and includes a piston installed in and dividing the chamber of the torque converter housing into a first compartment for the turbine and a second compartment. The piston is movable in the direction of the predetermined axis to thus at least partially engage and disengage the clutch in response to the establishment of different pressure differentials between the fluids in the two compartments, and the piston has a friction face in contact with a friction face of the housing in the engaged condition of the clutch. Still further, the apparatus comprises computerized means including a hydraulic circuit between the two compartments and being operative to select the pressure differential (and hence the magnitude of torque being transmitted by the clutch). The clutch is at least partially engaged at least during a portion of the interval of operation of the transmission at any one of the forward ratios.

An additional feature of the invention resides in the provision of an apparatus for transmitting torque in a power train between a variable-speed rotary output element of a prime mover and a rotary input element of an automatic transmission which is installed in a power train of a conveyance (such as an engine-driven motor vehicle) and has a plurality of forward transmission or drive ratios. The apparatus comprises a hydrodynamic torque converter serving to transmit torque between the output element of the prime mover and the input element of the transmission, a slip clutch which is disposed in parallel with the torque converter and is engageable to transmit torque from the output element of the prime mover to the input element of the transmission, and means for regulating the slip of the clutch in each forward ratio of the transmission as a function of at least one of a plurality of variable parameters including the energy requirements and the output of the torque transmitting apparatus.

A further feature of the invention resides in the provision of a driving unit including a combustion engine having a rotary output element for the transmission of torque including a nominal torque, a hydrokinetic torque converter which receives torque from the output element of the engine, a slip clutch which is engageable to transmit torque from the output element of the engine, and a torsional damper which is interposed between the clutch and the torque converter and has a capacity for transmission of torque having a magnitude at most matching the nominal torque of the engine.

The maximum torque which can be transmitted by the damper is or can be between about 10% and about 60% (preferably between about 25% and about 50%) of maximum torque which can be transmitted by the engine.

The damper can be of a design which is devoid of friction generating means.

The selected damper can be designed in such a way that it includes rotary input and output members turnable relative to each other through angles of between about ±2° and about 8°, particularly between about ±3° and about 6°.

The rigidity of the damper is or can be between about 7 Nm/° and about 30 Nm/°.

An additional feature of the invention resides in the provision of a driving unit including a combustion engine having a torque transmitting rotary output element, a hydrokinetic torque converter receiving torque from the output element of the engine, a slip clutch which is engageable to transmit torque from the output element of the engine, and a torsional damper which is interposed between the clutch and the torque converter. The damper is operative to damp eventual fluctuations of torque which is being transmitted by the output element of the engine within a first range of magnitudes of torque being transmitted by the output element of the engine, and the clutch is operative to damp eventual fluctuations of torque which is being transmitted by the output element of the engine within a different second range of magnitudes of torque being transmitted by the output element of the engine.

The clutch is preferably adjustable to transmit torques of varying magnitude, and the apparatus can further comprise means for reducing the torque transmitting capacity of the adjustable clutch within the aforementioned first range in response to high-frequency fluctuations of torque.

The means for reducing the torque transmitting capacity of the clutch can be designed to be responsive to high-frequency fluctuations of torque which develop as a result of resonance and/or abrupt changes of load upon the engine.

The damper can be designed to have a capacity for the transmission of a maximum torque when the magnitude of torque being transmitted by the output element of the engine is at least close to an upper limit of the first range.

The minimum torque which is transmittable by the clutch at least during a portion of the second range can exceed about 1% of a nominal torque being transmitted by the output element of the prime mover.

If the apparatus employs an adjustable clutch, it further comprises or can further comprise means for adjusting the clutch for the transmission of at least substantially constant torque at least within a portion of the second range of the magnitudes of torque being transmitted by the output element of the prime mover.

The rotational speed of the output element of the prime mover can be between the idling RPM of the prime mover and approximately 3000 RPM (preferably between about 2000 and 2500 RPM) within the first range of magnitudes of torque being transmitted by the output element of the prime mover.

The magnitude of torque being transmitted within the second range of magnitudes of torque being transmitted by the output element of the prime mover can be between about 0.6 and 1.0 times (preferably between about 0.8 and 0.9 times) the torque being transmitted by the output element.

At least a major part of the characteristic field of the prime mover (such as a combustion engine) which is utilized within the main operating range of the prime mover coincides or can coincide with the first range of magnitudes of torque being transmitted by the output element of the prime mover. The characteristic field includes or can include at least one of (a) those zones of the characteristic field which are relevant for the FTP75-cycle and (b) those zones which are relevant for the ECE-cycle [city 90 kilometers per hour, 120 kilometers per hour].

A further feature of the invention resides in the provision of a driving unit for a vehicle. The driving unit comprises a combustion engine, means for accelerating the engine, a transmission which is shiftable between a plurality of progressively higher drive ratios, a hydrokinetic torque converter which is driven by the engine and serves to transmit torque to the transmission, a slip clutch which is engageable to transmit torque from the engine to the transmission, means for monitoring the transmission of torque by the clutch and by the torque converter at least during acceleration of the engine, and means (a) for disengaging the clutch when such disengagement within any one of the drive ratios of the transmission entails an increase of the pulling force of the vehicle as a result of torque conversion, and (b) for shifting the transmission into a lower drive ratio when the disengagement of the clutch does not entail an increase of the pulling force.

An additional feature of the invention resides in the provision of a driving unit for a motor vehicle. The improved driving unit comprises a combustion engine, means for accelerating the engine, a transmission which is shiftable between a plurality of progressively higher drive ratios, a hydrokinetic torque converter which is driven by the engine and serves to transmit torque to the transmission, a slip clutch which is engageable to transmit torque from the engine to the transmission (e.g., in parallel with the torque converter), means for monitoring the transmission of torque by the torque converter and the clutch, and means for (a) disengaging the clutch when such disengagement at a given drive ratio of the transmission entails an increase of the pulling force of the vehicle, and (b) for shifting the transmission to a different drive ratio when the disengagement of the clutch at the given drive ratio of the transmission does not entail an increase of the pulling force.

Still another feature of the invention resides in the provision of a driving unit for use in a motor vehicle. The improved driving unit comprises a combustion engine having a rotary variable torque transmitting output element (such as the crankshaft or the camshaft of the combustion engine), a transmission having a rotary input element (e.g., a shaft), a hydrokinetic torque converter which is driven by the output element of the combustion engine and is mounted to transmit torque to the input element of the transmission, an adjustable slip clutch which is engageable (at least in part) to transmit torque from the output element of the combustion engine to the input element of the transmission, and means for adjusting the slip of the clutch as a function of variations of the torque being transmitted by the output element of the combustion engine.

In a presently preferred embodiment of the improved driving unit, the transmission is an automatic transmission.

The automatic transmission can constitute a multi-step transmission. Alternatively, the automatic transmission can include or constitute a continuously variable transmission. It is also possible to employ an automatic transmission which is an infinitely variable change-speed gear. Still further, the automatic transmission can include or constitute an infinitely variable transmission including sheaves and at least one endless flexible element trained over the sheaves. A transmission of such character is disclosed, for example, in commonly owned U.S. Pat. No. 5,169,365 granted Dec. 8, 1992 to Oswald Friedmann for "Power train".

It is further possible to employ an automatic transmission which is shiftable into a finite number of discrete drive ratios or into an infinite number of drive ratios.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1c shows comparable losses in apparatus serving to transmit torque from the engine of an arrested vehicle and employing two different torque converters;

FIG. 1d is a diagram with curves showing losses in output as a function of the speed of a motor vehicle, with one of the curves showing losses when the torque transmitting apparatus of the vehicle employs a standard torque converter and the other curve denoting losses when the apparatus employs a so-called soft torque converter;

FIG. 1e is a diagram wherein the curves denote the influence of different torque converters upon the pulling force of the vehicle;

FIG. 2 is a partly diagrammatic and partly schematic sectional view of a torque transmitting apparatus of the character shown in FIG. 1a, and further shows the controls or regulating means for the pressure differential between the bodies of hydraulic fluid which engage or disengage the slip clutch;

FIG. 6 is a diagram similar to that of FIG. 4 but showing the relationship of the engine RPM and the RPM of the output element of the torque converter during acceleration of the engine and with regulation of the slip of the clutch;

FIG. 7 is a diagram similar to that of FIG. 5 but showing the changes of the output torque under the circumstances corresponding to those denoted by the curves in the diagram of FIG. 6;

FIG. 8 is a diagram similar to those shown in FIGS. 4 and 6 showing acceleration of the engine with the clutch disengaged during shifting of the transmission into a different drive ratio but with the clutch engaged upon completion of such shifting;

FIG. 9 is a diagram similar to those shown in FIGS. 5 and 7 but illustrating the changes of output torque under the circumstances corresponding to those denoted by the curves in the diagram of FIG. 8;

FIG. 10 is a diagram showing various pressure differentials between the bodies of fluid in the compartments of the torque converter housing as a function of time during advance determination of a desired pressure differential (i.e., of a desired slip) upon elapse of a selected interval of time;

FIG. 11a is an axial sectional view of one presently preferred embodiment of a torque transmitting apparatus with a slip clutch in parallel with a hydrokinetic torque converter;

FIG. 11b is a fragmentary axial sectional view of a torque transmitting apparatus employing a different combination of torque converter and slip clutch and showing the distribution of temperatures in the torque converter housing when the clutch is engaged;

FIG. 11c is a fragmentary axial sectional view similar to that of FIG. 11b but showing the distribution of temperatures in the housing of the torque converter forming part of the apparatus shown in FIG. 11a;

FIG. 11d illustrates the pressure between the friction faces of the slip clutch forming part of the structure shown in FIG. 11b;

FIG. 11e illustrates the pressure between the friction faces of the slip clutch forming part of the structure shown in FIGS. 11a and 11c;

FIG. 18 is a diagram similar to those shown in FIGS. 14 and 17 and illustrates the differences between the advantages of a "soft" torque converter (FIG. 17) and the drawbacks of a "hard" torque converter (FIG. 14);

FIG. 19 is a view similar to that of FIG. 15 but showing the characteristic field at the output of a "soft" torque converter;

FIG. 27 shows a row of five diagrams wherein the curves indicate various criteria for the selection of the torque dividing factor $k_{me}$ and the characteristic field of such factor;

FIG. 29 shows a row of three diagrams wherein the curves denote various additive and multiplicative correction factors which can be relied upon to regulate the transmission of torque by the slip clutch;

FIG. 32 is an exploded view of a portion of the damper which is utilized in the apparatus embodying the structure of FIG. 31;

FIG. 33 is a plan view of another portion of the damper in the apparatus embodying the structure of FIG. 31;

FIG. 39 is a diagram wherein the curves indicate the ability of the vehicle to pull a load in different drive ratios of the transmission which receives torque from the improved apparatus.

DESCRIPTION OF PREFERRED EMBODIMENTS

Figure 1A:
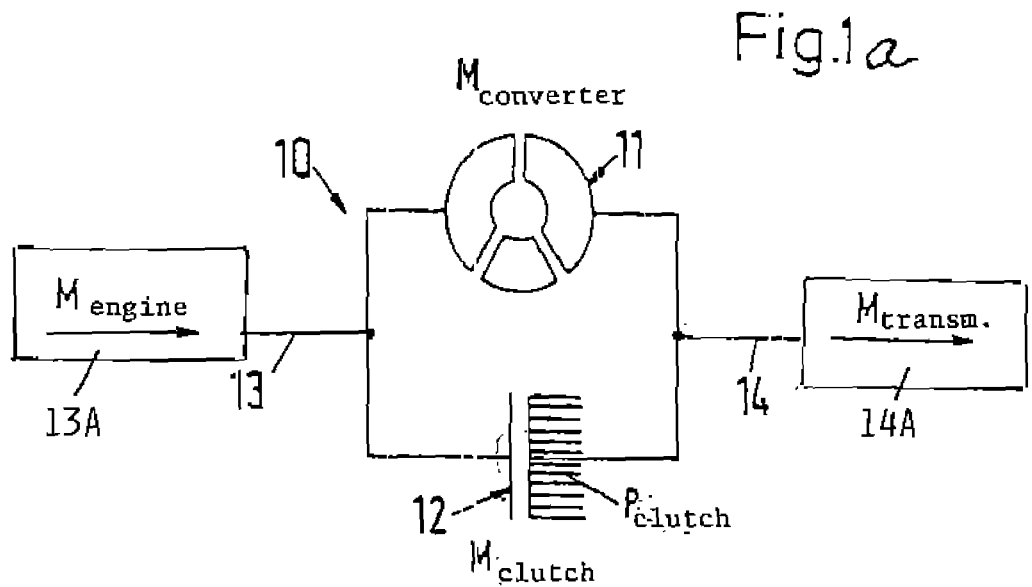
FIG. 1a is a diagrammatic view of a torque transmitting apparatus which embodies the invention and employs a hydrokinetic torque converter in parallel with a lockup clutch or bypass clutch (hereinafter called slip clutch or friction clutch)

FIGS. 1a and 2 show a portion of a torque transmitting apparatus 10 which embodies one form of the invention. The apparatus 10 comprises a hydrokinetic torque converter 11 and a so-called bypass clutch or lockup clutch 12 which is a friction clutch that operates or can operate with slip when in the engaged condition. The engagement and disengagement of the clutch 12 are effected by the establishment of appropriate pressure differentials between two bodies of hydraulic fluid (such as oil) in two compartments 24, 25 at the opposite sides of an axially movable piston or pressure plate 20. The latter forms part of the clutch 12 and is installed in the housing or cover 16 of the torque converter 11. When engaged, the clutch 12 operates in parallel with the torque converter 11.

The housing 16 of the torque converter 11 receives torque, either directly or indirectly, from the rotary output element 13 of a prime mover, e.g., a combustion engine 13A in a motor vehicle. The output element 13 can constitute the camshaft or the crankshaft of the engine 13A. The character 14 denotes the common output element of the torque converter 11 and the clutch 12, e.g., a shaft which constitutes the input element of a preferably automatic transmission 14A in the power train between the engine 13A and the wheels (not shown) of the motor vehicle.

The torque converter 11 in the apparatus 10 of FIGS. 1a and 2 can constitute a conventional hydrokinetic torque converter which, in addition to the housing or cover 16, comprises a pump 17 driven by and forming part of the housing 16, a turbine 18 between the pump 17 and the piston or pressure plate 20 (hereinafter called piston for short), and an often optional stator 19 between the pump 17 and the turbine 18 (all as seen in the direction of the common axis X-X of the torque converter, hereinafter converter for short) and the clutch. The turbine 18 has a hub which can constitute the output element 14 or which is non-rotatably and preferably sealingly coupled to the input element of the transmission 14A. The arrangement can be such that the hub of the turbine 18 is sealingly and non-rotatably telescoped into a hub of the input element of the transmission 14A or vice versa.

The compartments 24 and 25 form part of a fluid-filled chamber 16a of the housing 16. The piston 20 between the compartments 24, 25 is non-rotatably but axially movably coupled to the hub of the turbine 18 so that it can move toward or away from the adjacent radially extending wall 16b of the housing 16 in order to engage or disengage the clutch 12. The radially outer portion of the piston 20 has an annular friction face 21 which is in engagement with the confronting friction face 22 of the wall or portion 16b of the housing when the clutch 12 is called upon to transmit torque, namely directly from the output element 13 and housing 16 to the turbine 18 and thence to the output element 14, i.e., to the input element of the transmission 14A. The friction face 21 can be provided directly on the radially outer portion of the piston 20 or on a friction lining which is bonded and/or otherwise affixed to the piston. Analogously, the friction face 22 can be provided directly on the wall 16b or on a friction lining which is bonded and/or otherwise affixed to the housing 16.

Figure 1B:
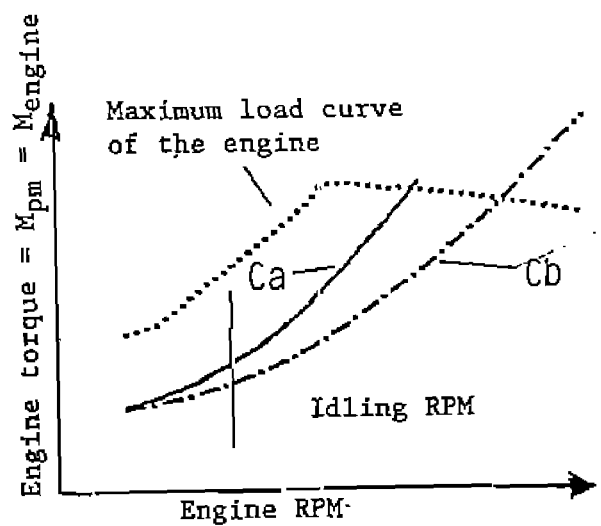
FIG. 1b is a diagram showing the prime mover torque as a function of the RPM of the output element of the prime mover.

The converter 11 transmits torque to the transmission 14A when the clutch 12 is disengaged or when the clutch operates with slip between the friction faces 21 and 22. If the RPM of the input element 13 and housing 16 is constant, the transmission of torque by the converter 11 increases in response to increasing slip of the clutch 12. Reference may be had to FIG. 1b which shows the relationship between the transmission of torque by the converter 11 and the slip of the clutch 12 when the output element of the transmission 14A is braked and is close to a standstill. The solid-line curve Ca in the diagram of FIG. 1b is the characteristic curve of a conventional torque converter, and the curve Cb is the characteristic curve of a so-called "soft" torque converter.

A "soft" torque converter operates with a more pronounced slip than a "hard" converter even though the torque is the same. Otherwise stated, a "soft" converter transmits less torque than a "hard" converter though the slip is the same. Thus, the "soft" converter offers to the engine a lesser resistance than a "hard" converter. If the operator of the vehicle desires the transmission of a more pronounced torque, the RPM differences which are established by a "soft" or softer converter are more pronounced than those built up with a "hard" or harder converter. The more pronounced RPM differences establish a so-called rubber band effect which means that the vehicle reacts to the application of fuel with a delay. Another definition of the rubber band effect is that the conveyance does not "hang" or "pend" on fuel.

However, it is to be noted that a large majority of tests start with a cold phase. If the engine can more readily reach higher rotational speeds during such cold phase, it heats up more rapidly and the emission of fuel combustion products is much more satisfactory.

A so-called "soft" converter opposes the engine with a lesser torque at a particular RPM of the engine. If the vehicle is at a standstill while the rotational speed of the engine matches or approximates the idling RPM, the engine must overcome the converter torque. This, in turn, ensures a reduction of losses when the vehicle is at a standstill. FIG. 1c shows, by way of example, that the losses with a "soft" converter when the vehicle is at a standstill amount to 0.95 in contrast to 1.6 when the vehicle is at a standstill and the torque transmitting apparatus employs a conventional "hard" converter.

FIG. 1b shows that, the slip of a "soft" converter is more pronounced when the output torque is to match a desired value, e.g., at a given vehicle speed and while the vehicle is travelling along a road surface having a predetermined slope. This involves the development of more pronounced losses as can be seen by referring to the diagram of FIG. 1d.

As is well known to those familiar with the relevant art, a converter can increase the torque in contrast to a lockup clutch or bypass clutch. If the diameter of a "soft" converter matches that of a "hard converter, the torque conversion which can be achieved with a "soft" converter is more pronounced than that achievable with a conventional "hard" converter. If the conversion is increased while the diameters remain the same, the respective converter can be termed to be softer. Higher or more pronounced conversion renders it possible to increase the pulling force, and hence the ability of the engine to undergo more rapid acceleration. This will be appreciated by referring to FIG. 1e.

Referring again to FIG. 2, the chamber 16a of the converter housing 16 receives hydraulic fluid from a source by way of a conduit 30, and the pressure of such fluid is regulated by a valve 31. The operation of the valve 31 is controlled by a regulator 32. One port of the illustrated valve 31 discharges fluid into a conduit 33a which supplies a heat exchanger 33 constituting a means for cooling the inflowing fluid. The pressurized fluid at the outlet side of the pump 17 acts upon the turbine 18 and also determines the pressure of the body of such fluid in the compartment 24 at that side or surface of the piston 20 which faces away from the wall 16b of the housing 16. If the pressure of fluid in the compartment 24 is sufficiently high, i.e., if the pressure differential between the bodies of fluid in the compartments 24 and 25 rises to a certain value, the piston 20 is caused to move in the direction of the axis X-X and moves its friction face 21 into engagement with the friction face 22 of the rotating wall 16b.

In accordance with one feature of the present invention, the clutch which is disposed in parallel with the converter of the improved torque transmitting apparatus invariably operates with a certain amount of slip while the friction face of the piston engages the friction face of the adjacent portion or wall of the converter housing. One such combination of clutch and converter will be described in detail with reference to FIG. 11a. Thus, and assuming that the apparatus 10 of FIG. 2 were modified in accordance with the instant invention so that the (partly) engaged clutch 12 would always permit the friction faces 21 and 22 to slip relative to each other, the rate of fluid flow between the compartments 24 and 25 along the friction faces 21 and 22 would depend upon the extent of slip between such friction faces. This, in turn, would influence the pressure of fluid in the compartment 25, i.e., the magnitude of the pressure differential between the bodies of hydraulic fluid in the compartments 24 and 25. In the apparatus 10 of FIG. 2, the pressure of fluid in the compartment 25 is regulatable by the valve 31 which controls the flow of fluid in a conduit 34 having one of its ends in communication with the compartment 25. Thus, the valve 31 can select the magnitude of the pressure differential between the bodies of fluid in the compartments 24, 25 and hence the slip of the clutch 12 in the conventional apparatus 10 of FIG. 2. Otherwise stated, the valve 31 can determine the magnitude of torque which the clutch 12 can transmit directly from the wall 16b of the housing 16 to the hub of the turbine 18, i.e., to the input element of the automatic transmission 14A.

Since the clutch 12 operates in parallel with the converter 11, the engine torque equals the sum of torques transmitted by the clutch and the (pump 17 of the) converter. Thus, $M_{engine} = M_{clutch} + M_{pump}$. If one disregards the losses attributable to the torque transmission system, the torque M being transmitted by the transmission 14A can be expressed as follows:

$$M_{transm} = M_{clutch} + M_{turbine} \text{ or } M_{clutch} + + (M_{pump} \times \text{conversion}).$$

Figure 3:
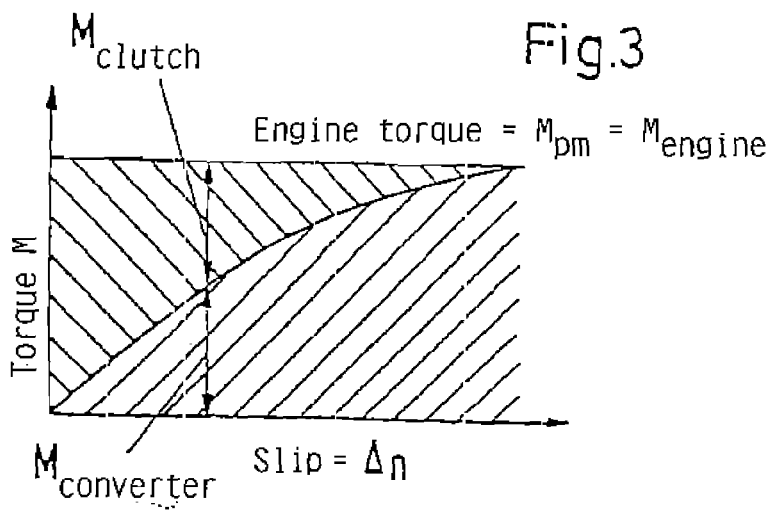
FIG. 3 is a diagram showing the division of prime mover torque into torque converter torque and slip clutch torque and the influence of the slip of the clutch upon such division.

The breaking up of engine torque $M_{engine}$ into engine torques which are to be transmitted by the converter and the clutch, respectively, is illustrated in the diagram of FIG. 3 wherein the magnitudes of the torques $M_{clutch}$ and $M_{converter}$ are represented in dependency upon the slip $\Delta_n$ of the clutch. It can be seen that, as the slip of the clutch increases, the percentage of torque being transmitted by the converter also increases with a corresponding decrease of $M_{clutch}$.

In contrast to the conventional regulation of transmitted torque, the method of the present invention does not involve the regulation of the slip or slippage; instead, the method includes the steps of determining, as a function of the operating condition of the engine, that percentage of torque which is to be transmitted by the clutch and thereupon resorting to a regulating unit (such as a computerized unit employing a microprocessor) to establish that pressure differential between the bodies of fluid at opposite sides of the piston of the clutch which is necessary to ensure the development and maintenance of the required slip. In other words, the desired slip develops automatically as a result of advance determination of the torque to be transmitted by the clutch and subsequent appropriate selection of the pressure differential which is required to ensure the transmission of a requisite percentage of torque by the clutch.

Figure 4:
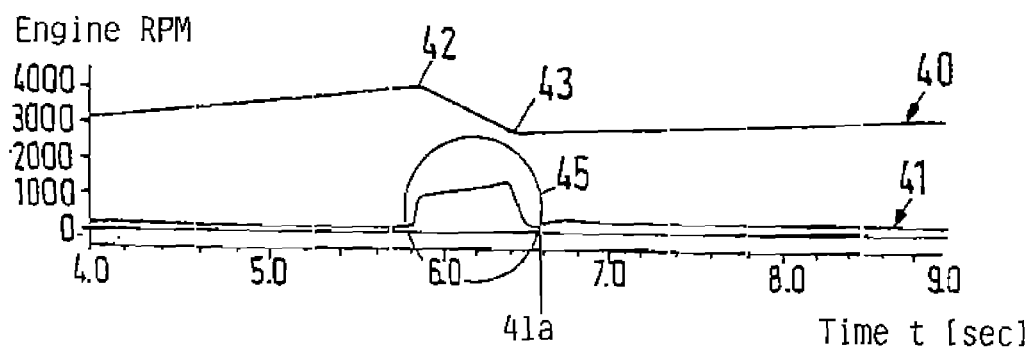
FIG. 4 is a diagram showing the relationship of the engine RPM and the RPM of the output element of the torque converter as a function of time during acceleration of the engine.

In the diagram of FIG. 4, the engine RPM is measured along the ordinate and the time (in seconds) is measured along the abscissa. The curve 40 denotes the variations of engine RPM as a function of time, and the curve 41 denotes the RPM differential at the converter during acceleration and during shifting into a higher drive ratio of the transmission, e.g., from the second into the third drive ratio. Due to acceleration, the engine RPM initially rises during operation of the transmission in the second ratio, i.e., prior to actual shifting into the next-higher ratio, but decreases during actual shifting (such shifting begins at 42). On the other hand, the RPM differential (curve 41) at the converter initially remains unchanged but increases quite abruptly and substantially in the course of actual shifting into the third drive ratio. When the shifting into the third drive ratio is completed, the engine RPM decreases at 43 and the RPM differential at the converter also decreases. As can also be seen in FIG. 4, the RPM differential undergoes a short-lasting fluctuation (as at 41a) prior to reaching and remaining at a level slightly above the initial value. The engine RPM (curve 40) begins to increase upon completion of shifting (at 43) into the third drive ratio, it being assumed here that the engine is accelerated in the third drive ratio of the transmission. The clutch does not block or stick during any stage of the operation described with reference to FIG. 4. Thus, the two friction faces of the clutch are free to slip relative to each other during each setting of the transmission.

Figure 5:
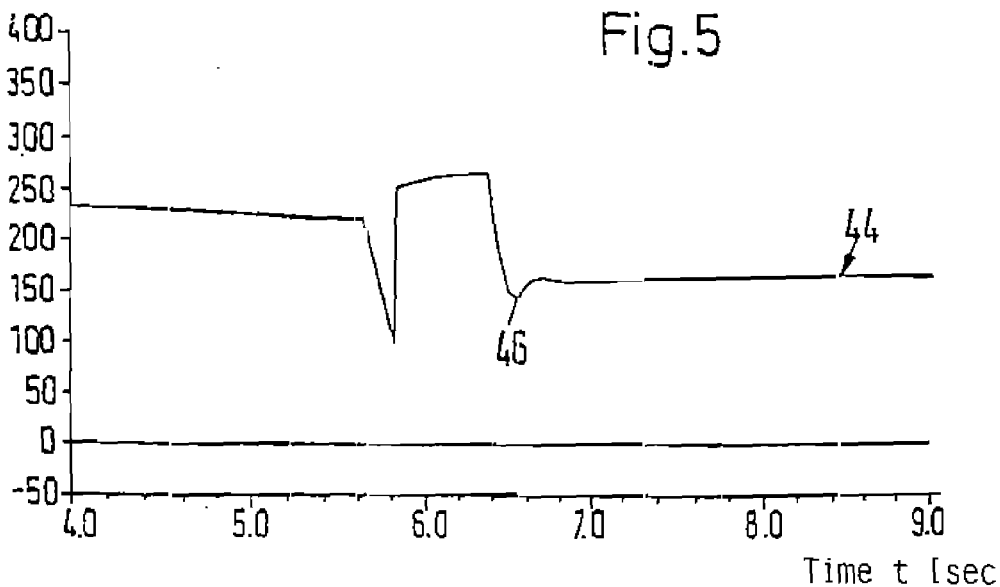
FIG. 5 is a diagram showing the changes of output torque as a function of time during acceleration of the engine.

The curve 44 in the diagram of FIG. 5 denotes the changes of output torque Nm as a function of time during the same interval which is measured along the abscissa in the diagram of FIG. 4. It will be seen that the output torque Nm decreases abruptly during the initial stage of shifting of the transmission from the second into the next-higher drive ratio. The output torque Nm thereupon undergoes an abrupt increase during the stage of pronounced slip of the clutch due to the resulting rise of the RPM differential (curve 41 within the circle 45 shown in FIG. 4). The torque Nm undergoes a slight fluctuation (as at 46) when the shifting into the higher drive ratio is completed and thereupon assumes a value (less than prior to shifting) corresponding to that required or determined for the operation of the transmission in the third drive ratio.

The diagrams of FIGS. 6 and 7 show that the situation is quite different during shifting into a different drive ratio when the torque transmitting system is set up for slip-regulated bypassing of the converter. The basic conditions are assumed to be the same as those already described with reference to FIGS. 4 and 5, i.e., the transmission is to be shifted from the second into the third drive ratio during acceleration of the motor vehicle. The curve 40' of FIG. 6 shows that the engine RPM increases while the transmission is in the second drive ratio and such RPM begins to decrease at 42', namely during the initial stage of shifting from the second into the third drive ratio. The RPM differential (curve 41') at and hence the slip of the converter remains constant during acceleration of the engine (up to the point 42' of the curve 40'). The engine RPM begins to decrease at the point 42', i.e., in response to start of the shifting from the second into the third drive ratio but the RPM differential begins to increase to thereupon decrease, first gradually and then abruptly (at 47') so that the slip decreases to zero. The engine RPM remains substantially constant upon completion of shifting into the third gear ratio but is less than prior to shifting. The RPM differential (curve 41') also increases from zero (at 47') but is less than prior to shifting from the second drive ratio.

As a rule, it is desirable to maintain the RPM differential at a constant value, also during shifting into a different gear ratio, if the torque transmitting apparatus is set up to operate with slip-regulation during bypassing of the converter. Therefore, the duration of shifting into a different gear ratio is longer than in the case of torque-regulated bypassing of the converter. The reason is that the turbine of the converter cannot yield. Therefore, and as shown at 47' in the diagram of FIG. 6, the slip of the clutch is reduced to zero when the shifting into the different drive ratio is completed because the regulation of slip can become effective only after the establishment of a departure. Even at such time, the slip is reestablished at a speed which is limited by the construction and operation of the slip adjusting elements and the stability of the regulator system. As already mentioned in connection with the description of FIG. 6, the slip is reestablished after the point 47' on the curve 411, namely with a certain delay following completion of the shifting into the higher gear ratio. The extent of renewed slip upon completion of the shifting operation is somewhat less than or approximates the extent of slip prior to shifting.

FIG. 7 shows that, in the event of slip-regulated bypassing of the converter, the output torque (curve 44') decreases abruptly at the outset of shifting into the higher drive or gear ratio to thereupon increase in a manner similar to that already described with reference to the curve 44 of FIG. 5, i.e., in a manner similar to that in the course of operation with torque-regulated bypassing of the converter. The difference between the curves 44 and 44' is that the output torque Nm undergoes pronounced fluctuation (as indicated at 46' in FIG. 7) prior to stabilization upon completion of shifting into the higher gear or drive ratio, i.e., prior to reaching a value corresponding to that needed or desired or contemplated for operation at the third drive ratio of the transmission.

The heretofore described drawings show that, when the bypassing of the converter takes place in the conventional manner (regulation of slip), the RPM gradient and the RPM differential upon completion of shifting into a different drive or gear ratio are quite pronounced. This is the reason that the friction clutch blocks (see 47' in FIG. 6) when the shifting into a different gear ratio is completed. This, in turn, is the reason that, in view of complete bypassing of the converter by the blocked clutch, the output torque exhibits pronounced fluctuations when the shifting into the different gear ratio is completed (note again the afterfluctuations denoted by the portion 46' of the curve 44' shown in FIG. 7).

Referring to FIGS. 8 and 9, the curves 40", 41" and 44" shown therein respectively correspond to the curves 40', 41' and 44' respectively shown in FIGS. 6 and 7 as well as to the curves 40, 41 and 44 respectively shown in FIGS. 4 and 5. The difference is that the clutch is disengaged during shifting into a different drive ratio but is Engaged when the shifting operation is completed. FIG. 8 shows that, prior to initiation of a shifting operation at 42", the RPM of the engine (curve 40") increases whereas the RPM differential (curve 41") undergoes a slight decrease. The engine RPM decreases in the course of the actual shifting operation from a lower into a higher drive ratio. The RPM differential increases abruptly during the initial stage of gear shifting and thereupon increases gradually until the shifting into the higher gear is completed (see the curve 41"). Such differential decreases again, rather abruptly, when the shifting into the higher drive ratio is completed and thereupon remains substantially constant at a level somewhat above that prior to shifting. The RPM differential decreases to zero after elapse of a preselected interval of time following completion of the shifting operation (this is shown in FIG. 8, as at 48) as a result of engagement of the lockup clutch.

The output torque (note the curve 44" in FIG. 9) at first varies in the same way as shown in FIG. 7 but the afterfluctuations (at 46") upon completion of the shifting operation are followed, with a certain delay, by pronounced and gradually decreasing-relatively long-lasting fluctuations (at 49 in FIG. 9) taking place when the clutch is fully engaged so that the converter ceases to transmit torque.

A comparison of the novel mode of torque transmission (as shown in FIGS. 4 and 5) with the conventional mode of torque transmission as shown in FIGS. 6 and 7 (as well as with the aforedescribed mode of torque transmission according to FIGS. 8 and 9, namely with the clutch open during shifting and engaged upon completion of shifting into a higher drive ratio) indicates that the torque-regulated bypassing of the converter in accordance with the present invention entails much less pronounced fluctuations during shifting than in accordance with heretofore known proposals. This is due to the fact that the clutch, which is invariably operated with a certain amount of slip, can yield during shifting into a different drive ratio so that the RPM differential can increase accordingly.

In the diagram of FIG. 10, the curve 50 denotes the progress of the pressure differential $\Delta p$ while the bodies of fluid at opposite sides of the piston of the clutch are maintained at different pressures, all as a function of time. Proceeding from the initial pressure differential $\Delta p_{start}$, the pressure differential increases as a function of time, at first at a highly pronounced rate as indicated by the tangent 51 applied to the curve 50 at the intersection of the abscissa (time t) and ordinate ($\Delta p$) of the coordinate system of FIG. 10. The pressure differential $\Delta p$ thereupon increases at a decreasing rate (from $\Delta p_n$ to $\Delta p_{n+1}$) to thereupon asymptotically approach the desired pressure differential ($\Delta p_{des}$) which is indicated by the broken line 52. This takes place as a result of stepwise approximation, starting with the pressure differential $\Delta p_n$ at the instant $t_n$ and proceeding to the pressure differential $\Delta p_{n+1}$ after elapse of an interval $\Delta t$ (i.e., at the instant $t_{n+1}$). The pressure differential gradient which is required after the elapse of the interval $\Delta t$ is calculated and is set up with the hydraulic system of the regulating unit. The same sequence of steps is repeated again and again until the pressure differential reaches the value $\Delta p_{des}$ as indicated by the broken line 52.

Stated otherwise, the central computer unit of the apparatus for the practice of the present invention selects that torque which is to be transmitted by the clutch in response to changes of the torque being transmitted by the power train in accordance with the following undertakings: (A) Advance determination of a parameter X which is indicative of the torque being transmitted by the clutch at the instant $t_{n+1}$ after the elapse of a monitoring interval and which is ascertained in accordance with a function excluding at least one undesirable phenomenon (such as blocking of the clutch), (B) determination of a gradient ΔX which is required to arrive at a desired value of the parameter X after elapse of the interval Δt, and (C) applying the thus determined gradient ΔX with a hydraulic system including a proportionality regulation wherein a parameter includes a pressure differential Δp established in advance between bodies of a hydraulic fluid at opposite sides of the piston of the clutch in the housing of the converter in accordance with the equation $$\Delta p_{n+1} = (1-\beta) \cdot \Delta p_{des} + \beta \cdot p_n,$$

wherein $\beta = f(T_v, t)$. The steps (A), (B) and (C) are thereupon repeated until the parameter X at least closely approximates the desired parameter (broken line 52 in the diagram of FIG. 10).

Alternatively, the pressure differential Δp between the two bodies of hydraulic fluid at opposite sides of the piston of the clutch can be arrived at in accordance with the equation $\Delta \Delta p = C_1 \cdot (\Delta p_{des} - \Delta p_n)$ wherein $C_1$ is a proportionality factor. The steps (A) and (B) are thereupon repeated until the parameter X matches or at least adequately approximates the desired value.

FIG. 11a shows the details of a portion of a presently preferred torque transmitting apparatus 60 including a hydrokinetic torque converter 61 and a slip clutch or lockup or bypass clutch 62. The structure of FIG. 11a further includes a damper 63 which is installed between the clutch 62 and the converter 61.

The converter 61 comprises a pump 65 which is directly or indirectly connected to and thus receives torque from the output element of the prime mover (such as the output element 13 of the engine 13A shown in FIG. 1a). The pump 65 forms part of the torque converter housing 70 having a chamber 70a which confines a turbine 67 also forming part of the converter 61 and serving to transmit torque to a hub 66 having axially parallel internal splines arranged to transmit torque to an externally splined input element of an automatic transmission (such as the element 14 of the transmission 14A shown in FIG. 1a). A stator 68 of the converter 61 is installed in the chamber 70a between the pump 65 and the turbine 67 as seen in the direction of the common axis of the converter 61 and clutch 62. The shell of the illustrated pump 65 is shown as being welded to housing 70; however, it is equally possible to make the shell of the pump of one piece with such housing.

FIG. 11a shows two threaded fasteners 71, 72 which are provided on or are affixed to the radially extending wall 70b of the housing 70 and serve to secure such housing to the output element of the prime mover. For example, the fasteners 71, 72 (together with one or more additional and/or different fasteners, not shown) can serve to secure the wall 70b of the housing 70 (and hence the pump 65) to a flywheel (not shown) on the camshaft or crankshaft of a combustion engine.

The piston or pressure plate 74 of the clutch 62 is or can be made of metallic sheet material and is movable in the direction of the aforementioned common axis in order to engage, partially engage or disengage the clutch 62. The radially inner portion of the piston 74 is provided with a hub 75 which is sealingly and non-rotatably affixed to a complementary hub 76 of the turbine 67. In the embodiment which is shown in FIG. 11, the hub 76 is telescoped into the hub 75.

The illustrated hub 76 is of one piece with the hub 66 and is riveted to the adjacent main portion of the turbine 67. The radially outer portion of the piston 74 is a hollow conical frustum and has an annular friction face 79 engageable with a complementary annular friction face 80 on the adjacent portion of the radially extending wall 70b of the converter housing 70. The friction face 79 is provided on an annular friction lining 78 which is bonded and/or otherwise affixed to the radially outer portion of the piston 74. However, it is equally possible to provide the friction face 79 directly on the radially outer portion of the piston 74. Analogously, the friction face 80 can be provided on a friction lining which is bonded and/or otherwise affixed to the wall 70b.

The friction faces 79 and 80 extend radially outwardly from the axis of the clutch 62 and diverge toward the pump 65 as seen in the direction of this axis. Such configuration of the friction lining 78 and of the radially outer portion of the piston 74 entails the development of an annular space which is disposed between the radially outer portion of the turbine 67 and the adjacent portion of the piston and has a substantially wedge-shaped cross-sectional outline.

An advantage of the frustoconical radially outer-portion of the piston 74 and of the frustoconical friction lining 78 is that the area of the friction face 79 is increased accordingly. In addition, the radially outer portion of the piston 74 can offer a more pronounced resistance to deforming stresses. Still further, the percentage of lost output which can be led away is much greater than in clutches having radially extending washer-like friction faces or friction linings and, therefore, the maximum temperature of the hydraulic fluid in the chamber 70a of the converter housing 70 is lower than in conventional torque transmitting apparatus. The feature that the temperature of the hydraulic fluid can be lowered brings about a number of important advantages. Thus, this renders it possible to shorten the interval which is required to achieve a change of slip by the clutch 62. In the event of an unstable (non-stationary) operation, any adjustment of the slip necessitates a certain interval of time. The actual (or still existing) slip then deviates from the desired slip, i.e., from the slip the selection and establishment of which necessitate a certain interval of time. In order to avoid engine noise (boom), it is necessary to maintain a certain amount of slip during the aforementioned interval of time. This, in turn, normally involves the establishment of a slip ($\Delta n_2$, $\Delta n_3$) which is higher than necessary.

Another problem which is solved as a result of maintaining the temperature of hydraulic fluid in the chamber 70a at a relatively low value is that the so-called choking of the combustion engine is either prevented or is rendered much less likely. It is known that, when operating under a heavy load, many types of engines should not undergo pronounced choking, i.e., an excessive reduction of RPM. In fact, in many instances, choking of the engine should or must be prevented even when the engine is operated under a heavy load. This can be achieved by increasing the engine RPM as a result of full disengagement of the bypass clutch or as a result of the establishment of a pronounced slip of such clutch. If the engine RPM is increased as a result of a pronounced increase of the slip of the clutch, the losses at the bypass ($\Delta n_4$) are greatly increased.

Still another problem which is solved by preventing an excessive or pronounced rise of temperature of hydraulic fluid in the chamber 70a of the converter housing 70 is that this renders it possible to regulate relatively small amounts of slip of the clutch 62 with a much higher degree of accuracy. Regulation of relatively small amounts of slip of a lockup or bypass clutch is difficult even though it is highly desirable under many operating conditions. Accurate regulation of relatively small slip is particularly difficult in the case of selection of so-called "sharp" or precise regulation parameters. On the other hand, if the parameters are less strict or "sharp", the actual slip might considerably deviate or depart from the desired or optimal slip. Therefore, highly accurate selection of and adherence to an optimal slip, even if the slip is not pronounced, is normally preferred; nevertheless, even such highly accurate selection still cannot prevent at least some and often rather pronounced fluctuations of the actual slip. This can result in the generation of pronounced noise if the fluctuations are sufficient to cause actual blocking (full engagement) of the clutch or in excessive losses if the actual slip considerably exceeds the selected or desired slip.

A further advantage of the aforediscussed frustoconical design of the radially outer portion of the piston 74 is that the friction lining(s) and/or the friction faces of the clutch are subjected to much more evenly distributed stresses (pressures per unit square area) which results in longer useful life of the parts defining the friction faces 79 and 80.

Still further, the frustoconical design of the radially outer portion of the piston 74 renders it possible to increase the maximum torque which can be transmitted by the clutch 62. Many clutches which operate with a single friction disc (such as the clutch 62 which employs a single pressure plate or piston 74) must operate at the upper limit of their ability to transmit torque. Resort to flows of coolant along the friction faces of such single-disc clutches (in order to prevent an overheating of the hydraulic fluid and/or of the parts provided with the friction faces) entails a further reduction of maximum torque which can be transmitted by a lockup or bypass clutch. Such cooling of the friction faces can be eliminated or reduced to a minimum if the temperature of hydraulic fluid in the chamber 70a of the housing 70 and particularly in the region of the friction faces 79, 80 can be maintained at a relatively low value.

A further advantage of the frustoconical design of the radially outer portion of the piston 74 and of the friction faces 79, 80 is that the weight and the moment of inertia of the piston and of the entire clutch 62 can be reduced accordingly. The reason is that the frustoconical radially outer portion of the piston exhibits a required stability even if it is made of a relatively thin metallic and/or other suitable sheet material.

Last but not least, the utilization of a piston 74 having a frustoconical radially outer portion renders it possible to reduce the so-called swelling or expansion of the converter 61. This, in turn, renders it possible to regulate the converter 61 and the entire torque transmitting apparatus 60 with a higher degree of accuracy.

The feature that the temperature of hydraulic fluid at the friction faces 79, 80 of the clutch 62 can be maintained at a relatively low value (or at a value lower than in conventional torque transmitting apparatus) further contributes to longer-useful life of the fluid. Localized overheating or pronounced heating of the hydraulic fluid can be counteracted by the aforementioned undertaking of causing cool or relatively cool fluid to circulate along and between the friction faces 79 and 80 when the clutch 62 is in use. The differences between the temperatures of hydraulic fluid in various portions of the housing chamber in a conventional torque converter are shown in FIG. 11*b*. FIG. 11*c* shows the fluid temperatures in certain portions or regions of the chamber 70a in the housing 70 of the torque converter 61 shown in FIG. 11*a*. It will be seen that, though the temperature (100° C.) of the inflowing fluid and the temperature (110° C.) of the outflowing fluid is the same in the conventional apparatus of FIG. 11*b* and in the improved apparatus of FIG. 11*c*, the temperature (130° C.) at the piston 74 of the improved apparatus is much lower than the temperature (200° C.) in the corresponding portion of the conventional apparatus.

Cooling of the friction linings(s) and/or of the parts other than friction linings and bearing the friction faces entails a reduction of the supporting or carrying surfaces. This presents no problems when the slip clutch employs frustoconical friction faces (79 and 80 in FIG. 11*a*) because the pressure upon the friction faces is more uniform. This can be seen by comparing the structures shown in FIGS. 11*d* and 11*e*. FIG. 11*d* shows the maximum pressure per unit area of the friction faces in a conventional clutch of the type also shown in FIG. 11*b*, and FIG. 11*e* shows that the maximum pressure per unit area of the friction faces 79, 80 in the clutch 62 of FIGS. 11*a* and 11*c* is only about 25 percent of the maximum pressure per unit area of friction faces shown in FIGS. 11*b* and 11*d*.

Furthermore, and as already mentioned above, the magnitude of torque which can be transmitted by a clutch having cooled friction surfaces is less than the magnitude of torque adapted to be transmitted by non-cooled friction faces. This can be compensated for by utilizing a clutch with conical friction faces (such as 79 and 80), i.e., a clutch wherein the radially outer portion of the piston is reinforced or stiffened in that it has a frustoconical outline.

The damper 63 is installed in the aforementioned annular portion of the housing chamber 70a between the radially outer portion of the turbine 67 and the piston 74 in the apparatus 60 of FIG. 11*a*. This damper comprises resilient energy storing elements 82 which together form an annulus and alternate with torque transmitting projections 83 non-rotatably affixed to or otherwise provided on the piston 74. Each projection 83 bears against one end portion of the respective energy storing element 82, and the other end portion of each such energy storing element bears against one of the projections 84 non-rotatably affixed to or otherwise provided on the turbine 67. The projections 83 are provided at that side of the piston 74 which faces away from the friction faces 79 and 80. Such torque transmitting projections 83 include or constitute leaf springs which are affixed to the right-hand side of the piston 74 (as viewed in FIG. 11*a*) by rivets 85. These rivets are affixed to the piston 74 between the hub 75 and the friction lining 78 (as seen in the radial direction of the clutch 62). The projections 83 include portions which follow the outline of the adjacent side or surface of the piston 74 as well as arms 86, 87 which flank the adjacent portions of the energy storing elements 82. Still further, the projections 83 include pushers in the form of lugs 88, 89 which bear against the adjacent end portions of the energy storing elements 82.

The projections 84 of the damper 63 which is shown in FIG. 11*a* include arcuate members which are welded or otherwise affixed to the adjacent portions of the turbine 67 and include fingers 90 extending in a direction toward the friction lining 78 on the piston 74. Such fingers engage the adjacent end portions of the energy storing elements 82. Thus, each energy storing element 82 is confined between two lugs 88, 89 of one of the projections 83 and a finger 90 of the composite projection 84.

The characteristics of the damper 63 are preferably selected in such a way that it is effective, or that it is most effective, within the main operating range (see FIG. 19) of the torque transmitting apparatus. Such design of the damper furnishes a much more satisfactory damping of fluctuations or vibrations in the circumferential direction of the clutch than a damper which is designed to be effective within a wider operating range extending beyond the main operating range indicated in FIG. 19. Moreover, a damper which is effective (either exclusively or primarily) within the main operating range is more compact than a damper which must be designed to cover a wider range. The converter 61 is completely bypassed only within the main operating range.

The chamber 70a of the housing 70 forming part of the converter 61 in the torque transmitting apparatus 60 of FIG. 11a includes a first compartment 92 at the right-hand side and a second compartment 93 at the left-hand side of the piston 74. The compartment 92 is bounded in part by the turbine 67, and the compartment 93 is bounded in part by the radially extending wall 70b of the housing 70. The piston 74 is caused to move in the direction of the common axis of the converter 61 and clutch 62 toward the wall 70b (to bring about at least partial engagement between the friction faces 79 and 80) when the pressure of the body of hydraulic fluid in the compartment 92 exceeds the pressure of the body of fluid in the compartment 93. The magnitude of torque which is being transmitted by the clutch 62 is regulated by appropriate selection of the pressure differential between the bodies of fluid in the compartments 92 and 93.

When the clutch 62 is disengaged, the torque which the aforementioned flywheel on the output element (camshaft or crankshaft) of the engine transmits to the fasteners 71, 72 is transmitted only to the pump 65 and is applied to the hub 66 as a result of the flow of hydraulic fluid due to rotation of the pump 65.

If the clutch 62 is fully engaged, i.e., if the pressure of fluid in the compartment 92 is sufficiently higher than the pressure in the compartment-93 to ensure that the friction faces 79, 80 cannot slip relative to each other, the energy storing elements 82 of the damper 63 effect a direct mechanical transmission of torque from the cover-70 to the turbine 67 and thence to hub 66, i.e., to the input element of the automatic transmission in the power train between the engine and the wheels of the motor vehicle.

Figure 12:
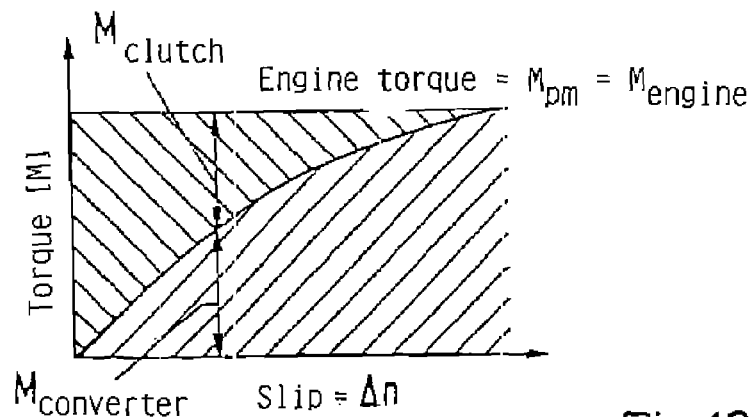
FIG. 12 is a diagram similar to that of FIG. 3.

If the pressure differential between the bodies of fluid in the compartments 92, 93 is selected in such a way that the clutch 62 operates with a certain amount of slip, the transmission of torque from the flywheel to the input element of the transmission takes place in part by way of the clutch 62 and in part by way of the converter 61. The division of engine torque is shown in FIG. 12 in a manner similar to that shown in and described with reference to FIG. 3.

Transmission of torque from the clutch 62 to the turbine 67 (by way of the damper 63) ensures a highly effective compensation for fluctuations of torque being transmitted by the output element of the engine. Moreover, and since the energy storing elements 82 of the damper 63 are installed at a substantial radial distance from the axis of the clutch 62, these energy storing elements are or can be relatively long (as seen in the circumferential direction of the friction lining 78) so that they can yield through large angles to thus ensure adequate damping of relatively small as well as highly pronounced fluctuations of engine torque, i.e., such fluctuations are not transmitted to the hub 66 and hence to the input element of the automatic transmission.

In accordance with a feature of the invention, the operation of the friction clutch 62 is such that the clutch 62 remains at least partially engaged at least during certain stages of each forward drive ratio of the transmission. In other words, the slip of the clutch 62 can be regulated not only in the first forward drive ratio but also in each higher forward drive ratio of the transmission or, at the very least, in each higher than first drive ratio. Such regulation of slip can include partial transmission of engine torque by way of the clutch as well as full engagement of the clutch, i.e., the transmission of engine torque solely by the clutch rather than by the clutch in conjunction with the converter 61 or by the converter alone.

As indicated in FIG. 11a by zig-zag lines, the orientation of the radially outer portion of the piston 74 and of the adjacent portion of the wall 70b can be changed in such a way that the friction lining 78 and the friction face 80 extend radially outwardly and diverge in a direction toward (rather than away from, as indicated by solid lines) the radially outer portion of the turbine 67. The modified orientations of the friction lining 78 and friction face 80 are respectively shown at 78a' and 80a'. The energy storing elements 82 are then replaced by energy storing elements jointly forming a smaller-diameter annulus and being disposed nearer to the axis of the clutch 62, e.g., in the region of the hub 66.

Figure 13:
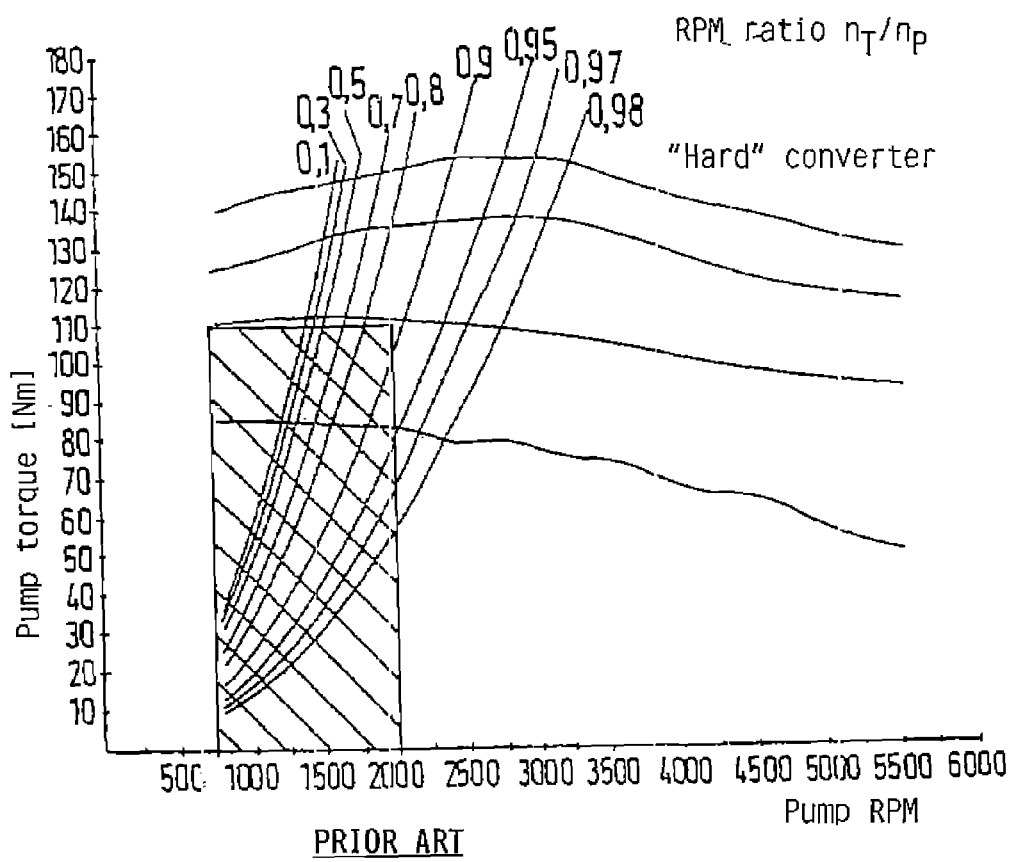
FIG. 13 is a diagram of the primary characteristic field of a "hard" torque-converter, with the curves showing the torque of the torque converter pump as a function of the pump RPM and a parameter denoting the ratio of the pump RPM to the RPM of the turbine of the torque converter.

In conventional torque transmitting apparatus, the lock-up clutch is fully disengaged in the lower drive ratios of the transmission and is engaged in the higher drive ratios of the transmission. In order to achieve a satisfactory overall efficiency and to maintain the magnitude of the developing heat at an acceptable value, such torque transmitting apparatus normally employ "hard" torque converters of the type identified by the curves shown in the diagram of FIG. 13. More specifically, the diagram of FIG. 13 shows the primary characteristic field of a "hard" converter with the pump torque Nm measured along the ordinate as a function of the pump RPM (measured along the abscissa). The parameter is constituted by the ratio $n_T/n_P$ of the turbine RPM to pump RPM. Still further, the diagram of FIG. 13 shows the characteristic field of a prime mover (such as a combustion engine) with the output torque of the prime mover measured along the ordinate as a function of the engine RPM which matches the turbine RPM. Still further, the hatched rectangle denotes in FIG. 13 the main driving range of the engine; such range is normally between about 750 RPM and 2000 RPM.

Figure 14:
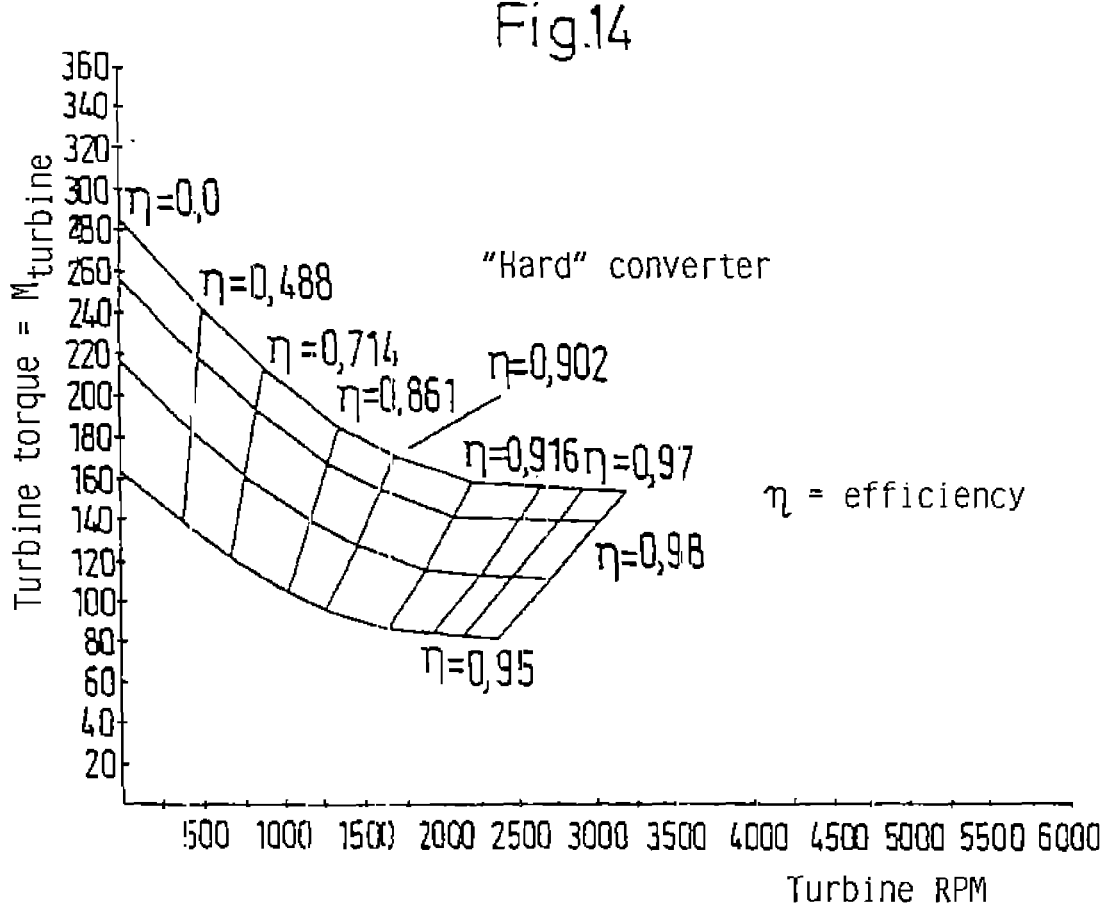
FIG. 14 is a diagram showing the secondary characteristic field of the "hard" torque converter with variations of the turbine torque as a function of the RPM of the turbine.
Figure 15:
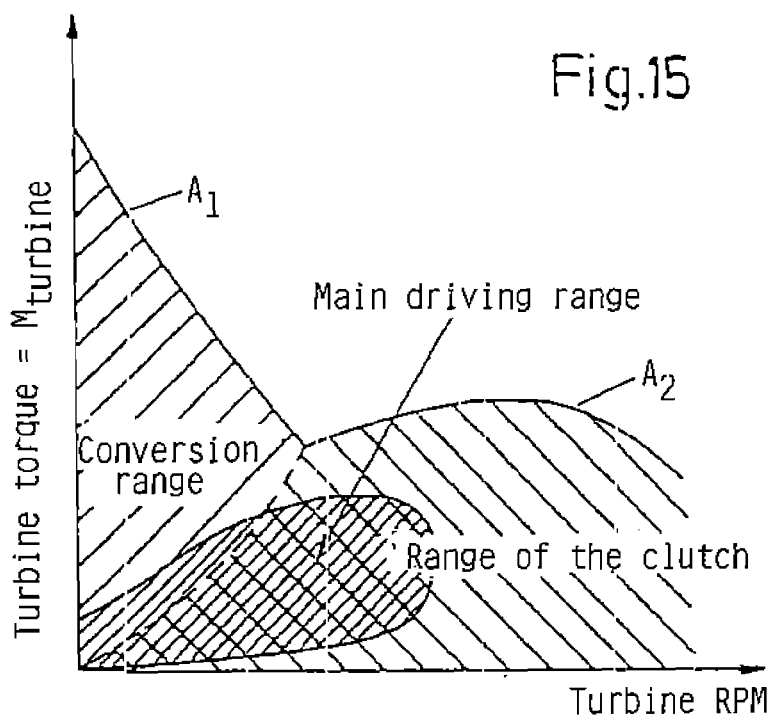
FIG. 15 is a diagram showing the characteristic field at the output of a conventional "hard" torque converter.

The diagram of FIG. 14 shows the secondary field with the turbine torque measured along the ordinate as a function of the turbine RPM which is measured along the abscissa. The efficiencies in various output ranges apply for a "hard" converter of the type to be discussed with reference to the diagram of FIG. 15. In FIG. 15, the turbine torque $M_{tur}$ is measured along the ordinate as a function of the turbine RPM (measured along the abscissa). The main driving range is denoted by criss-cross hatching. The converter range is indicated by hatching along the ordinate, and the clutch range is indicated by hatching along the abscissa. As can be seen by the curve $A_1$, the turbine torque decreases at a highly pronounced rate in response to increasing turbine RPM. The curve $A_2$ indicates that the turbine torque first increases at a gradual rate and thereupon decreases at a somewhat steeper rate within the clutch range of the turbine RPM.

In order to achieve a satisfactory or acceptable overall efficiency, as well as to reduce the development of heat, a conventional torque transmitting apparatus which employs a "hard" converter is operated in such a way that the increase of the magnitude of transmitted torque decreases rather drastically in response to increasing RPM. Therefore, when the operation takes place within the median RPM range, the increase of the magnitude of transmitted torque is rather minimal and the increase of torque ceases to develop within the upper or uppermost RPM range.

Figure 16:
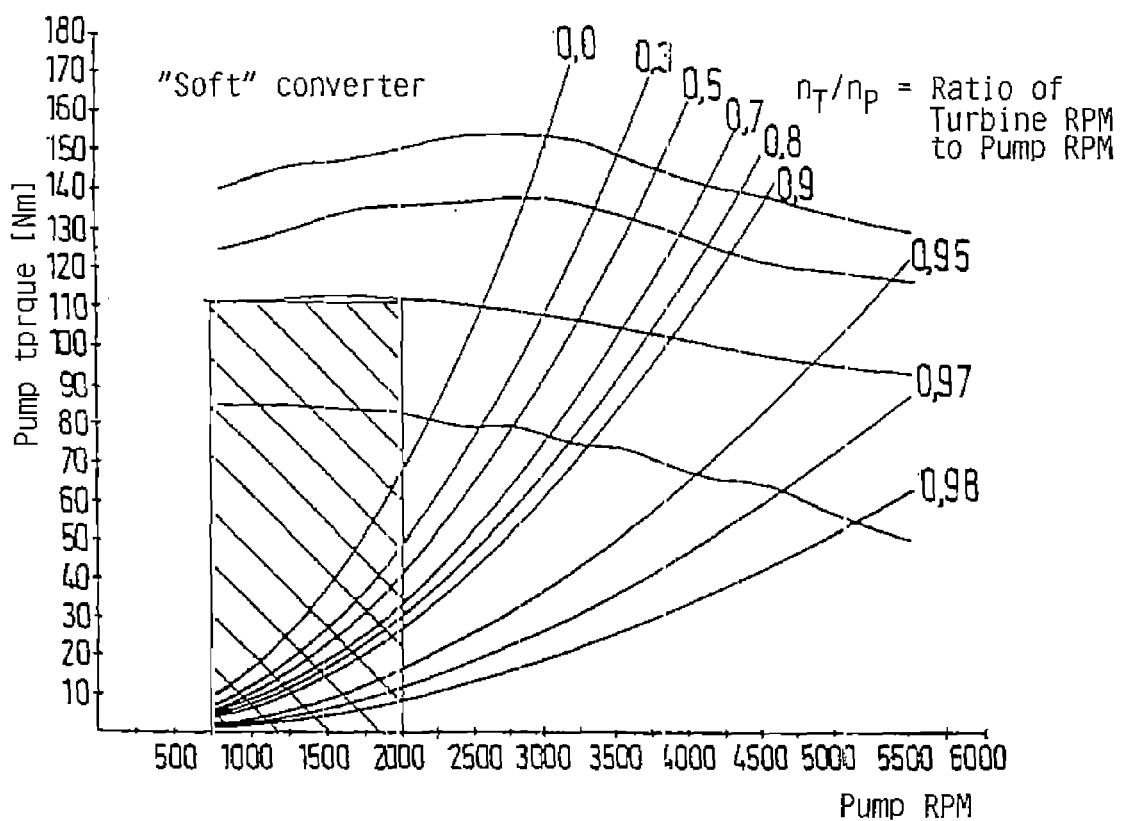
FIG. 16 is a diagram similar to that of FIG. 13 but showing the primary characteristic field of a "soft" torque converter.
Figure 17:
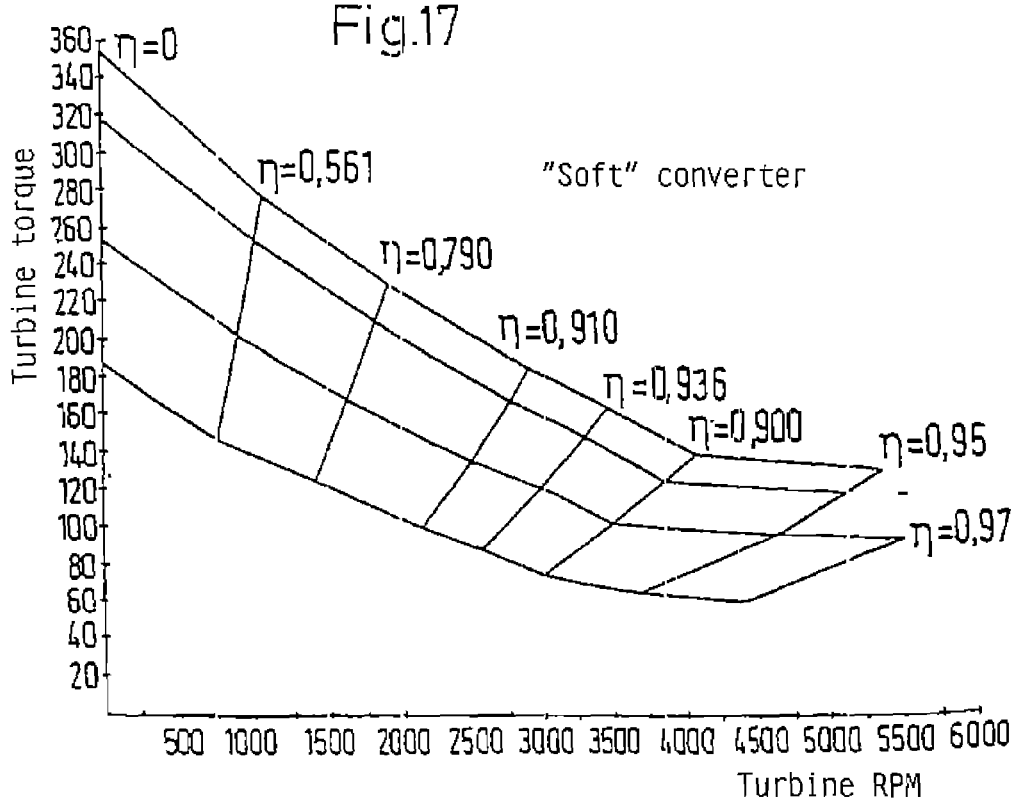
FIG. 17 is a diagram similar to that of FIG. 14 but showing the secondary characteristic field of a "soft" torque converter.

The diagram of FIG. 16 illustrates relationships which are analogous to those already described with reference to FIG. 13 except that the torque transmitting apparatus employs a "soft" converter in accordance with the present invention. In the primary characteristic field which is shown in FIG. 16, the pump torque Nm is measured along the ordinate as a function of pump RPM which is measured along the abscissa. The parameter is the ratio $n_t/n_p$ of turbine RPM to pump RPM. A comparison of FIGS. 13 and 16 indicates that the progress of the characteristic curves of the "soft" converter of FIG. 16 is much more gradual (flatter) than the progress of such curves of the "hard" converter (FIG. 13). The conversion range covers at least the major part of the median RPM range all the way to the upper RPM range. This results in the development of a secondary field (shown in the diagram of FIG. 17) which is much wider than the secondary field of the "hard" converter as represented in the diagram of FIG. 14. Thus, the available acceleration reserves (when the apparatus employs a "soft" converter) greatly exceed such reserves or spare acceleration achievable with conventional apparatus employing "hard" torque converters. In fact, the achievable spare acceleration is or can be so pronounced that, at least in many instances, it is not even necessary to shift into a lower gear ratio during acceleration of the prime mover.

The spare acceleration for apparatus with "hard" and "soft" torque converters is shown in FIG. 18. The secondary field (FIG. 14) pertaining to a "hard" converter is superimposed upon a secondary field (FIG. 17) pertaining to a "soft" converter. The hatched area indicates in FIG. 18 the gain which is achieved for an increase of torque with apparatus employing a "soft" torque converter; such hatched area is bounded by the curves denoting the maximum load for the conventional and improved converters.

The achievement of additional or spare acceleration is also shown in the diagram of FIG. 19 which is analogous to the aforediscussed diagram of FIG. 15 and shows the characteristic output field of a torque transmitting apparatus employing a "soft" converter. The increase of the useful conversion range is shown by hatching above the broken line $A_3$ of FIG. 19. The criss-cross hatched main operating range is fully confined within the minimal-slip range.

Referring again to FIG. 18, there are shown three operating points 1, 2 and 3. The efficiencies and slips which can be achieved with apparatus employing "hard" and "soft" torque converters at the operating points 1, 2 and 3 shown in FIG. 18 are listed in the following table:

|  | "hard" converter | | "soft" converter | |
| --- | --- | --- | --- | --- |
|  | Slip s (%) | Efficiency η | Slip s (%) | Efficiency η |
| Point 1 | 65 | 0.547 | 75 | 0.388 |
| Point 2 | 40 | 0.789 | 60 | 0.669 |
| Point 3 | 2 | 0.980 | 2 | 0.980 |

The table shows that, when the apparatus employs a "soft" converter, the efficiency is less than in the case of a "hard" converter during operation within the median RPM range. However, the slip is much more pronounced, i.e., the transmission of torque is much more satisfactory. On the other hand, the slip and the efficiency at the operating point 3 of FIG. 18 are the same regardless of whether the apparatus employs a "soft" or a "hard" converter.

Due to the dynamic behavior of mechanical systems as well as hydraulic systems, an overly rapid increase of the value of a parameter which influences the division of torque being transmitted by the torque transmitting apparatus into that transmitted by the converter and that transmitted by the clutch can give rise to vibrations at different frequencies which develop as a result of excessive bump or jolt or as a result of blocking or locking of the bypass clutch.

In accordance with a further desirable feature of the invention, the development of the aforediscussed vibrations is avoided by selecting a parameter which departs from the previously calculated and selected parameters for the division of transmitted torque into converter torque and clutch torque with a certain delay, e.g., as a function of time. The parameter can constitute the pressure differential between the bodies of fluid in the compartments at opposite sides of the piston of the clutch, such as the compartments 92, 93 at the opposite sides of the piston 74 in the clutch 62 of FIG. 11a.

Alternatively, the selection of a parameter which departs from the previously selected parameter denoting the ratio of torques being transmitted by the clutch and the converter can take place with a delay which, in lieu of being a function of time, is a function of the difference between the RPM at the input and the RPM at the output of the torque transmitting apparatus.

Still further, it is possible to delay the selection and utilization of a parameter departing from the previously selected and utilized parameter with a delay which is a function of the gradient of the engine RPM.

Figure 20:
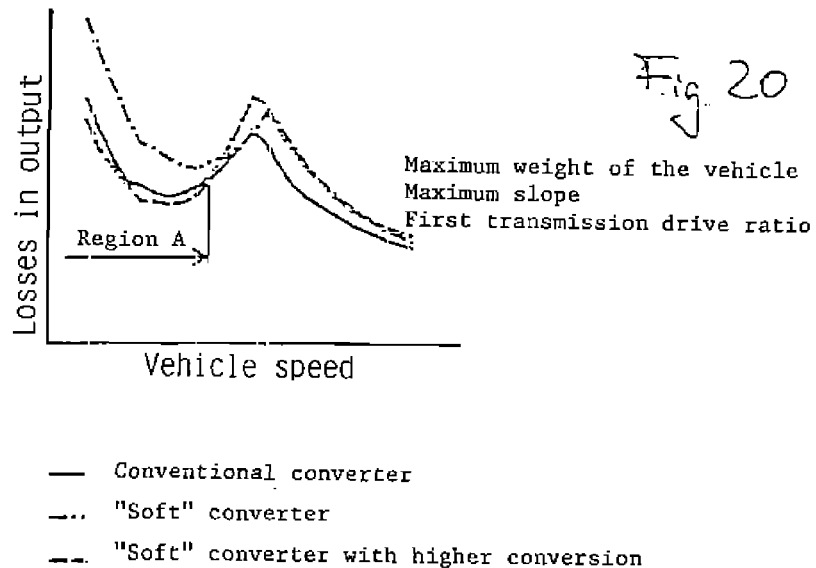
FIG. 20 is a diagram showing the influence of the design of the torque converter upon losses in output.

Losses of output during a particular stage of operation of a vehicle (taking into consideration the weight as well as the slope of the road surface) decrease with increasing conversion in comparison with a "soft" converter without pronounced conversion; nevertheless, such losses are generally higher than with a more rigid converter (see FIG. 20). However, if the slip is pronounced, losses with a "soft" converter are not higher than with a stiffer converter because the more pronounced torque conversion enhances the efficiency of torque transmission (note the region A in the diagram of FIG. 20).

In the absence of a bypass clutch, it is necessary to seek the establishment of a compromise between losses during stillstand and the ability for acceleration on the one hand (this would warrant the utilization of a relatively soft converter), and losses while the vehicle is in motion on the other hand (this would warrant the utilization of a relatively stiff converter). The limits are established by converter physics. Such limits were raised in recent years and the thus designed converters are relatively stiff.

The effect of the losses of output can be limited by resorting to a conventional lockup clutch which operates without slip and transmits torque to the turbine of the torque converter by way of a torsional damper. However, such combination of a clutch operating without a slip and a torsional damper can be adequately utilized only within certain limits. In order to avoid undue losses in comfort to the occupant or occupants of a motor vehicle, such combinations of lockup clutch and torsional damper can be utilized with a certain degree of success only under a few circumstances, particularly when the transmission is shifted into a relatively high drive ratio and when the RPM of the engine is relatively high. Otherwise, the torque transmitting apparatus is likely to generate excessive noise (such as booming and/or clatter) and to entail a change of load. In fact, the comfort to the occupants) of the vehicle is not satisfactory, or not sufficiently satisfactory, even under the aforementioned few circumstances (high drive ratio of the transmission and high RPM of the engine).

Figure 21:
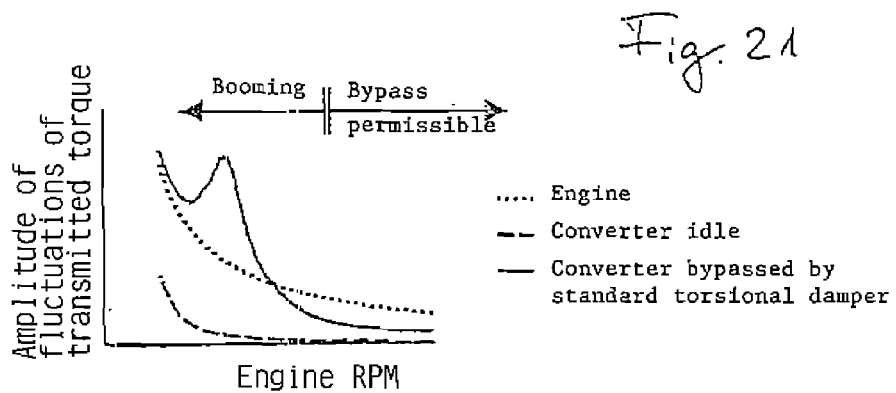
FIG. 21 is a diagram showing the fluctuations of engine torque and output torque of the torque converter as a function of the engine RPM.

The problems which develop as a result of booming and/or chattering will be appreciated by referring to the diagram of FIG. 21. The amplitude of vibrations of transmitted torque is measured along the ordinate as a function of the RPM of the engine (measured along the abscissa). The extent of noise is also dependent upon the type of the engine. Depending upon the engine torque impulse and the sensitivity of the vehicle to booming, it is possible to bypass only starting from a relatively high RPM. On the other hand, it is well known that, in most instances, the engine is operated at a relatively low RPM. This is the reason that the savings in fuel are rather low.

Figure 22:
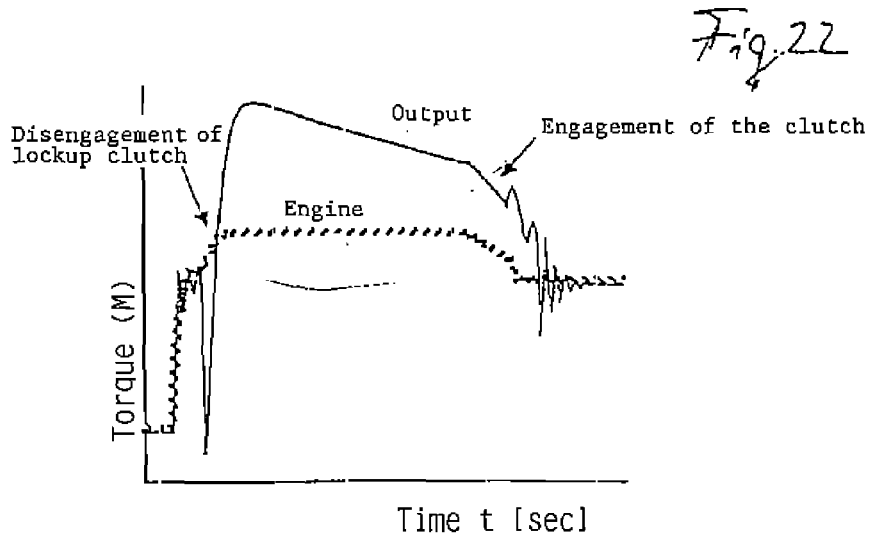
FIG. 22 is a diagram showing the fluctuations of load as a function of the engine RPM and by utilizing a standard torsional damper between the piston or pressure plate of the slip clutch and the output element of the torque converter.

Additional problems arise in connection with the driveability (load change) of a motor vehicle employing a torque transmitting apparatus with a torque converter and a bypass clutch as well as during initiation and/or termination of bypass of torque transmission. This will be appreciated with reference to the diagram of FIG. 22. If the operator of the vehicle steps on or further depresses the gas pedal while the clutch transmits torque from the housing to the turbine of the torque converter, the desired increase of pulling force is preceded by a jerky startup. The clutch is disengaged in the next step which, under unfavorable circumstances, can result in a short-lasting reduction of torque. The desired increase of the pulling force takes place only during the next-following phase. Engagement of the clutch can also entail fluctuations in the power train.

Shifting into different drive ratios can also affect the comfort of the occupant or occupants. Therefore, it is customary to disengage the clutch prior to shifting into a different drive ratio.

The just discussed undesirable phenomena develop with particular intensity when the transmission is operated in a lower drive ratio or in one of the lower drive ratios. Therefore, the conventional bypass clutches are designed to bypass only in the fourth or fifth drive ratio. Accordingly, dissipation of energy or friction performance which develops in the first drive ratio while the vehicle is being driven along a mountain road cannot be reduced or eliminated by establishing a bypass. Also, such dissipation of energy limits (at a selected cooling of the friction faces) the permissible softness of the converter. One of the reasons is that the development of the aforediscussed rubber band effect cannot be prevented within several ranges of operation of a vehicle and this prevents the selection of a relatively soft or softer torque converter.

To summarize: One feature of the present invention resides in the provision of a bypass which employs a slip clutch having frustoconical friction faces and cooperating with a miniature or mini torsional damper, an adaptive selection or regulation of the slip and a soft torque converter. The important or certain important advantages of the operation with slip rather than with a complete bypass (complete engagement of the clutch) are as follows:

The extent of booming is reduced.

The driveability is improved.

The quality of shifting into different drive ratios is significantly improved (full bypass i.A. is not acceptable).

The quality of the clutch actuation is improved.

The term "quality of clutch actuation" is intended to denote here that the clutch is engaged, even through not necessarily to a condition of total absence of slip, while the converter is open.

Figure 23:
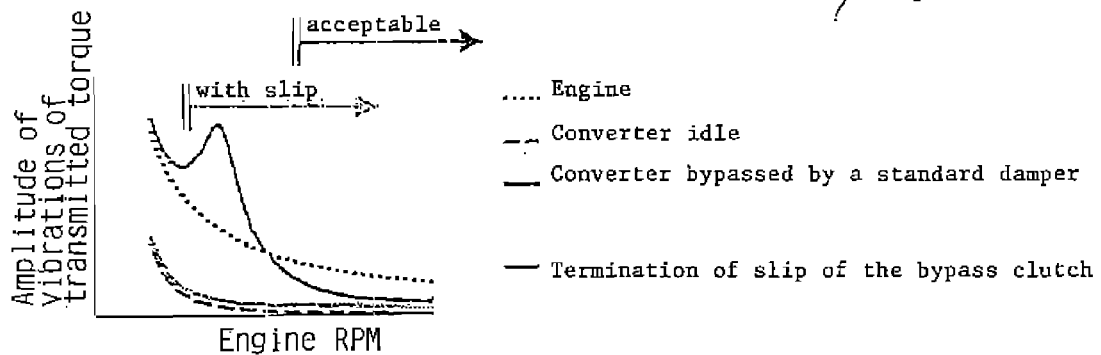
FIG. 23 is a diagram showing the influence of the slip upon fluctuations of the torque.

As shown in the diagram of FIG. 23, the reduction of tendency to booming or other noise generation renders it possible to begin with the bypassing of the converter at an earlier stage than with conventional torque transmitting apparatus.

Figure 24:
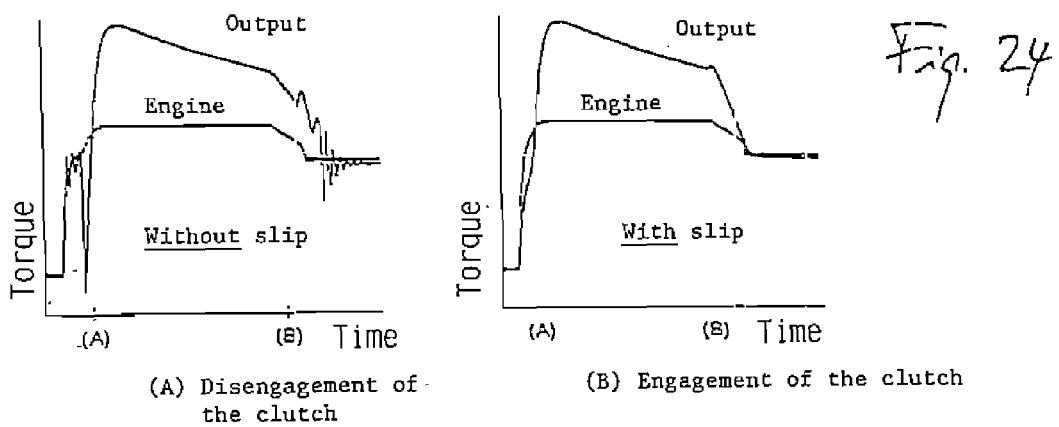
FIG. 24 comprises two diagrams one of which shows the variations of load without slip and the other of which shows the variations of load with the slip of the friction clutch.

The diagram of FIG. 24 shows that the driveability and the availability of pulling force of a power train which employs the improved torque transmitting apparatus are greatly superior to power trains employing conventional torque transmitting apparatus. If the operator of the vehicle embodying the improved power train steps on the gas pedal (or further depresses the gas pedal), the power train does not develop any surges of vibration because the clutch operates with slip. Thus, there develops an increasing slip and the torque which is being transmitted by the converter increases accordingly. Consequently, there is no downfall or breakdown of torque. Thus, the torque increases continuously above the engine torque due to increasing conversion, and it is possible to bypass at an earlier stage (also at the lower drive ratios of the transmission and at a lower RPM).

Figure 25:
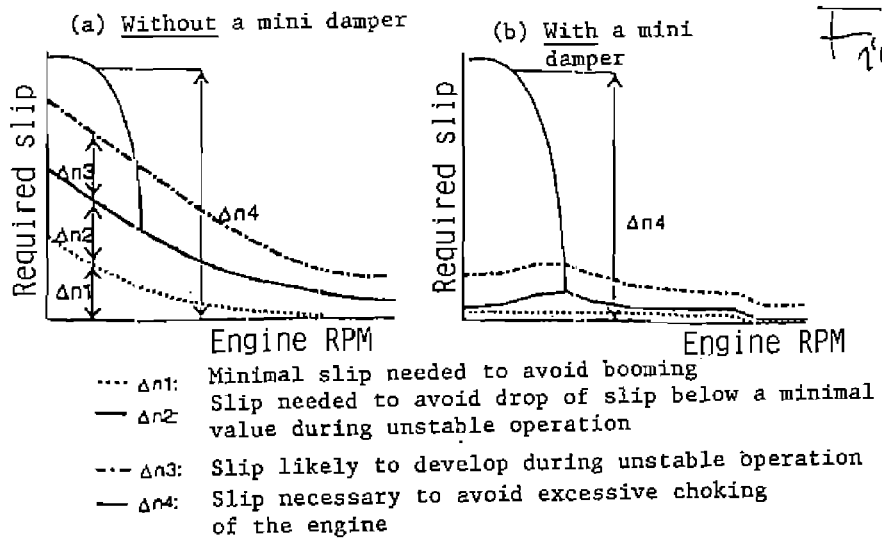
FIG. 25 also comprises two diagrams one of which shows the required slip without and the other of which shows the required slip with an improved torsional damper between the clutch and the torque converter.

As can be readily ascertained on the basis of the preceding description of the improved method and apparatus, the utilization of bypass or lockup clutches which operate with slip brings about a large number of desirable and highly pronounced advantages. Of course, the utilization of such clutches and of torque transmitting apparatus which employ such clutches necessitates the overcoming of certain problems or the avoidance or the reduction of the likelihood of development of certain problems which is likely to be the reason that torque transmitting apparatus employing hydrokinetic torque converters in conjunction with slip clutches are yet to gain universal acceptance in the automotive and certain other industries. Five problems which develop or are likely to develop when utilizing torque transmitting apparatus with slip will be discussed below (reference may also be had to the diagrams of FIG. 25):

(1) In many instances, the slip which is necessary to avoid the development of booming noise at a low RPM must be rather pronounced. This can result in relatively large dissipation of energy (friction performance). If the slip is reduced, the clutch is apt to block (become fully engaged) for a relatively short interval of time which, in turn, is likely to entail the development (in many instances) of a booming or droning noise (refer to $\Delta n_1$ in FIG. 25).

(2) Many engines should not be operated with a reduced output torque (suppressed RPM) when the vehicle is in the process of pulling a substantial load. If an engine belongs to such category of prime movers, the solution is as follows: (a) One increases the engine RPM by fully disengaging the clutch, or (b) the clutch is operated with a more pronounced (or highly pronounced) slip. The dissipation of energy (friction performance) increases if the slip of the clutch is increased (note $\Delta n_4$ in FIG. 25).

(3) It is rather difficult to regulate the slip when the slip is not pronounced. If the slip regulation parameters are "sharp" (i.e., if it is desired to regulate the slip with a high degree of accuracy), the regulation presents many problems. If the parameters are "loosened", the actual slip can greatly depart from the desired or required slip. The regulation of minimal or less pronounced slip is desirable but certain fluctuations of the thus regulated slip cannot be avoided under all operating conditions. Fluctuations can result in blocking (full engagement of the slip clutch) which is likely to entail the development of droning noise, or the slip of the clutch is likely to greatly exceed the desired value (which can entail the development of high or excessive losses).

(4) The regulation of slip cannot always be carried out with a desired degree of accuracy. As a rule, accurate regulation (selection) of slip is more difficult if the apparatus is to transmit relatively small torques.

(5) The velocity of regulation is a parameter which cannot be abbreviated at will. In other words, it takes a certain interval of time to complete a change of the slip. Of course, the actual slip departs from the desired or required slip during each such interval of shifting from a previously selected slip to a newly selected slip. Therefore, and in order to avoid the development of droning noise, it is desirable to establish and maintain a certain amount of slip during shifting from a previously selected value to the newly selected value of slip. As a rule, this involves the establishment of temporary slip which is higher than the desired slip ($\Delta n_2$ and $\Delta n_3$ in FIG. 25).

A sixth problem which also warrants consideration is attributable to losses developing as a result of bypass. Moreover, it is necessary to take into consideration the useful life of a slip clutch (as compared with that of a bypass clutch or lockup clutch which is operated without slip). In most instances, a slip clutch can stand the developing losses of output for a certain period of time. However, such clutches are likely to develop certain phenomena (such as chatter) which are attributable to wear after the mileage of the vehicle rises no n times ten thousand kilometers (n being a whole number including one). As a rule, the development of chatter is attributable to contamination and/or degeneration of and/or other damage to the hydraulic fluid in the housing of the torque converter. In many instances, the condition of friction lining(s) and/or of the friction faces on the respective parts of the slip clutch is still acceptable when the quality of hydraulic fluid has already undergone considerable deterioration. For example, the additives in the hydraulic fluid are likely to be adversely affected as a result of local overheating of the fluid in the chamber of the torque converter housing, and this entails gradual deterioration of the entire supply of fluid in the torque converter housing. The friction lining(s) and the friction face(s) of the slip clutch must be adequately cooled even if the losses due to slip of the clutch are relatively low. Otherwise stated, it is not only desirable but actually necessary to undertake all steps which must be carried out in order to reliably avoid local overheating of the hydraulic fluid. The dissipation of energy attributable to slip which is necessary to avoid the transmission of fluctuations of torque and necessary in order to attend to the problems discussed in the paragraphs numbered (2) and (3) above must be combined with dissipation of energy which develops during partial or full engagement and/or disengagement of the clutch. The dissipation of energy increases proportionally or nearly proportionally with the reduction of the RPM and with the magnitude of load at the time of causing the clutch to slip. The dissipation of energy at the time of initiating a slip of the clutch is particularly pronounced if the slip is to be initiated without affecting the comfort of the occupant or occupants of the vehicle wherein the transmission of torque from the engine to the automatic transmission is effected in accordance with the method of and by resorting to the apparatus of the present invention.

Figure 26:
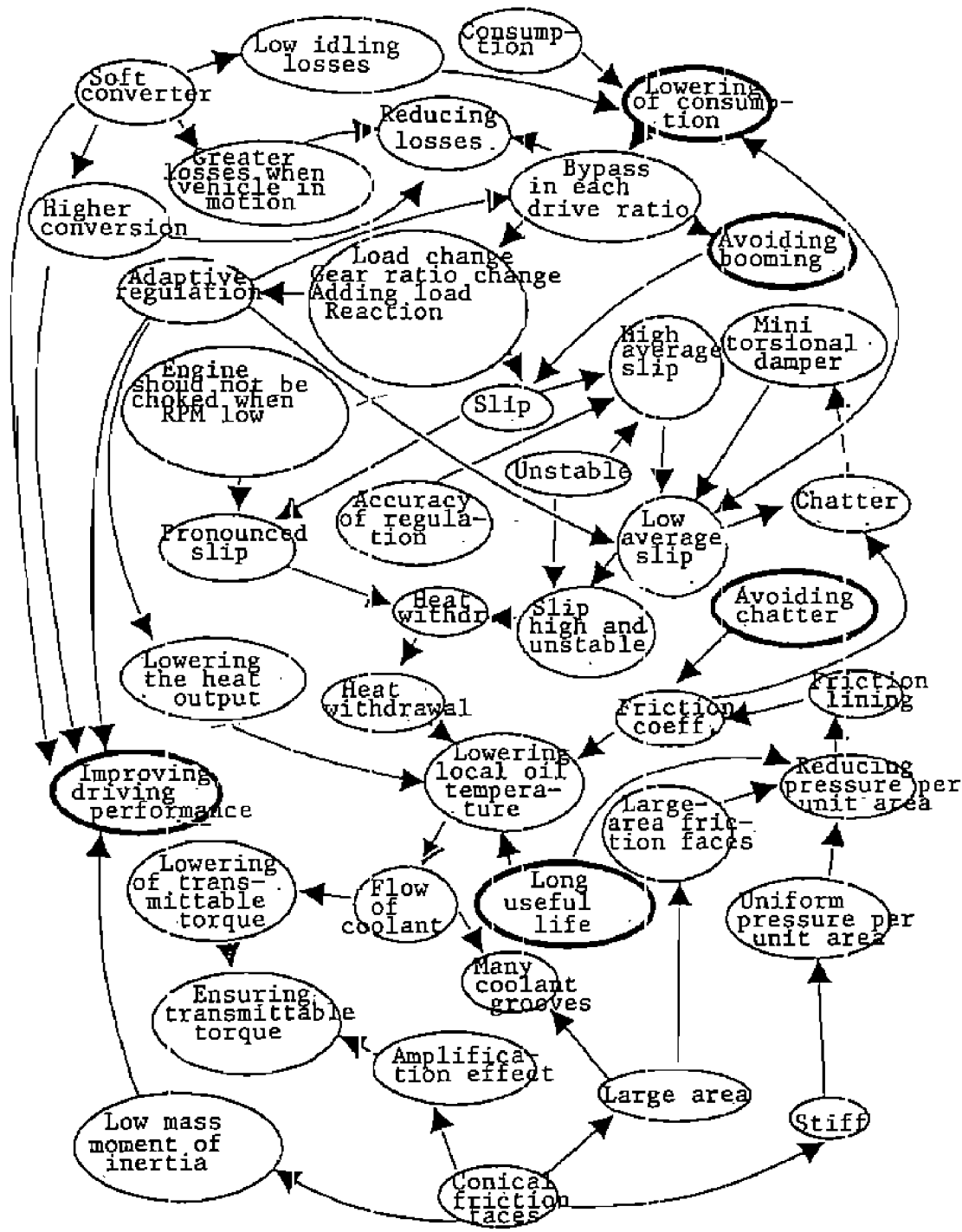
FIG. 26 is a so-called bubble chart indicating the relationship between the slip of the clutch, the improved damper, the design of the slip clutch and the adaptive regulation of slip.

The aforediscussed problems can be overcome by resorting to a surprisingly simple torsion damper (which can be designed for transmission of partial loads), by employing a slip clutch with conical friction faces and/or friction linings, and by resorting to an adaptive selection or regulation of the slip. The mode of cooperation of such constituents of the improved apparatus is shown in the bubble chart of FIG. 26. The information within the bubbles denoted by heavy lines denotes the advantages required or expected by the customers, and the remaining bubbles denote the characteristics of the individual constituents of the above-enumerated set of constituents as well as of combinations of such constituents.

The advantages of the (extremely simple) so-called miniature or mini torsion damper (see also the diagrams of FIG. 25) are as follows:

(a) Such damper can solve the aforediscussed problem od droning noise. Thus, the damper filters the fluctuations of transmitted torque which develop as a result of short-lasting full engagement of the clutch and this prevents the development of droning.

(b) The mini damper can at least partially solve the aforediscussed problem (3), namely the regulation of minimal or less pronounced slip of the clutch. Thus, the mini damper ensures that short-lasting complete engagement (blocking) of the clutch—if it develops at all—is not likely to adversely influence reasonably accurate regulation of relatively small or very small slips.

(c) The mini damper can contribute to the solution of the problem (4) namely the overall accuracy of the regulation of slip. If the engine torque is relatively small, the clutch can be operated with a less pronounced slip because the damper prevents the transmission of fluctuations of torque from the output element of the engine to the turbine of the torque converter, i.e., to the input element of the transmission.

(d) The mini damper renders it possible to reduce the slip of the clutch. The slip of the clutch prevents excitation in the resonance range of the damper. Therefore, it is possible to employ a damper which does not or need not embody any friction generating components. This, in turn, renders it possible to employ a mini damper which is simpler, lighter and less expensive than conventional torsional dampers between the pistons of slip clutches and the turbines of torque converters.

Referring again to FIG. 26, if the improved apparatus employs a "soft" torque converter, this entails a reduction of idling losses but contributes to losses when the vehicle is in motion. Additional advantages of such converter are:

The consumption of fuel can be reduced by operating the clutch with at least some slip in each drive ratio of the transmission and by increasing the conversion. This also entails an improvement of the output of the vehicle.

The droning noise can be reduced or its generation prevented by enhancing the accuracy of the regulation of slip and by operating with a relatively high average slip.

The combination of the improved mini damper and adaptive regulation of the slip brings about the following advantages:

It is possible to reduce the average value of the slip. Furthermore, it is possible to optimize the operation at changes of load, to improve the shifting of transmission into different drive ratios, to transmit torque from the transmission to one or more auxiliary torque receiving devices and to optimize the reaction of the apparatus. On the other hand, the stability is below an optimum value, it is necessary to operate (at certain times) with a rather pronounced slip, and it is necessary to ensure effective withdrawal of heat, i.e., to lower the local temperature of the hydraulic fluid.

The advantages of the clutch with conical friction lining(s) and/or friction faces are: The areas of conical faces are larger than those of radially extending faces, it is possible to provide a satisfactory network of channels for the flow of coolant along the friction faces, and it is also possible to establish large flows of coolant along the friction faces. In addition, the stability of the piston is highly satisfactory to thus ensure highly predictable transmission of torque. On the other hand, the maximum value of transmittable torque is reduced due to the cooling of the friction faces. Still further, such design of the clutch ensures predictable and uniform transmission of torque between the entire friction faces because the piston exhibits a pronounced stability, the wear upon the friction lining(s) and/or friction face(s) is uniform, the friction coefficient is constant, and the distribution (uniformity) of temperatures is highly satisfactory. All this contributes to longer useful life of the clutch and of the entire apparatus.

An additional advantage of the aforediscussed combination of constituents of the improved torque transmitting apparatus is that the mass moment of inertia of the apparatus is relatively low and that the overall operation of the vehicle embodying the apparatus is highly satisfactory.

The diagrams of FIG. 27 denote five examples of criteria for the determination of the $k_{me}$ factor or the $k_{me}$ characteristic field which can be memorized in a central processing unit (CPU). The positive signs are indicative of a good quality, and the negative signs are indicative of an unsatisfactory quality. The $k_{me}$ factor is applied along the abscissa and the trend of the effect of various criteria upon the $k_{me}$ factor is indicated along the ordinates of the illustrated diagrams. A comparison of idealized curves in the diagrams of FIG. 27 indicates that several criteria are contradictory, at least in part, i.e., the respective curves slope in opposite directions. Therefore, it is necessary to take into consideration and evaluate the numerous criteria in dependency upon their importance in general, in dependency upon their influence for achievement of certain important and/or desirable characteristics of the motor vehicle and/or in dependency upon the nature of the prime mover and/or the transmission of the power train which is to embody the improved torque transmitting apparatus.

The topmost diagram of FIG. 27 indicates that the acoustics (i.e., the suppression of droning and/or other undesirable noise) cannot be improved to any desired extent because, if the $k_{me}$ factor is small, the slip of the clutch is very pronounced (note the second topmost diagram in FIG. 27) and, therefore, the thermal stressing of the clutch and/or of the torque converter is extremely high. Thus, the noise can be reduced by increasing the thermal stressing of the clutch and/or converter, or vice versa. However, there is ample room to improve one or more desirable characteristics by appropriate selection of the $k_{me}$ factor between its extreme values.

The $k_{me}$ factor can be varied stepwise or gradually (continuously) between two extreme or threshold values which can greatly depart from each other. Such variations of the $k_{me}$ factor can take place in dependency upon changes of one or more parameters of the vehicle. These changes of the vehicle parameter(s) can be monitored by a processor so that the CPU can determine the required $k_{me}$ factor, i.e., that such factor can be changed and utilized in the torque transmitting apparatus in dependency upon the monitored changes of the selected parameter or parameters of the vehicle. For example, the $k_{me}$ factor can be read out of a characteristic field which is stored in the memory of the regulating means for the slip of the bypass clutch.

During many stages of operation of a vehicle, the bypass clutch is or should be regulated in such a way that it can transmit the entire net output torque which is being supplied by the engine at any particular time. Such mode of regulating the operation of the clutch is of particular advantage during or within the lower operating range of the engine; furthermore, the clutch is preferably combined with or employs a torsional damper which is specifically designed for operation within such range of the engine. Thus, the torque capacity or stop pin torque or bypass torque of the damper is smaller than the maximal or nominal output torque of the engine. The torque capacity of such damper can be between about 30% and about 60% of the nominal torque of the engine. The effect of the presence or absence of such damper upon the acoustics of the torque transmitting apparatus can be seen in the topmost diagram of FIG. 27. Thus, the utilization of such damper renders it possible to at least partially overcome the acoustics problems which develop when the $k_{me}$ factor is relatively large within the lower operational range of the engine.

Figure 28:
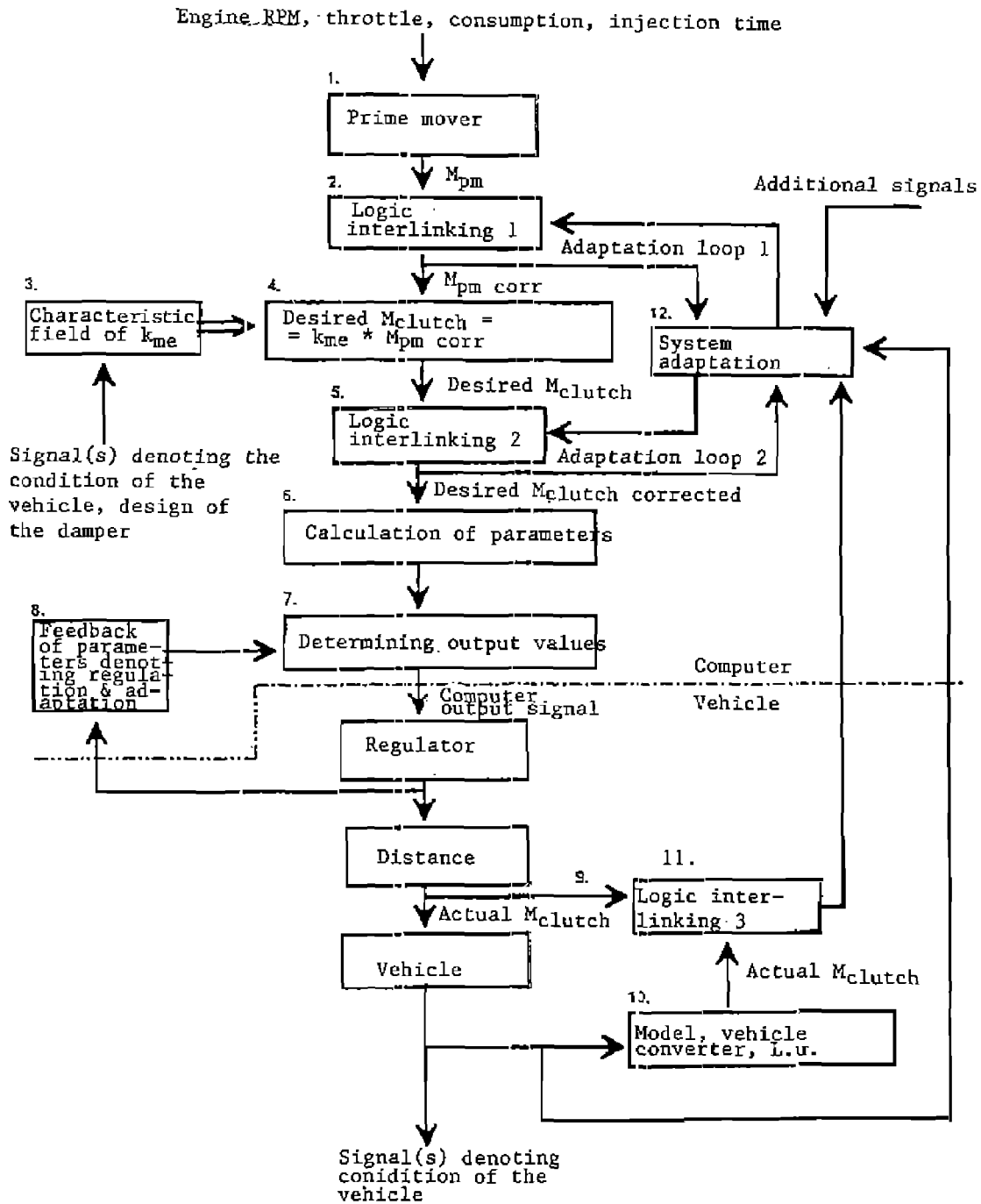
FIG. 28 is a flow chart denoting the steps of regulating the transmission of torque with a slip clutch acting as a lockup clutch or bypass clutch.

The flow chart of FIG. 28 shows the adaptive regulation of slip. It is assumed that the slip, the engagement and the disengagement of the clutch are regulated with an electrohydraulically operated selector. The topmost box 1 denotes a prime mover (particularly a combustion engine) the input torque of which is ascertained on the basis of several variable parameters including the input RPM, the position (such as inclination) of the throttle control lever (not specifically shown), the fuel consumption and the duration of fuel injection into the engine. As a rule, the input torque of the engine will be selected in dependency upon at least two of the just enumerated parameters, and such parameters can also include the rate of fuel admission into the engine, the RPM of the output element of the engine and the subatmospheric pressure in the suction pipe of the engine.

The box 2 in the flow chart of FIG. 28 denotes the logic interlinking 1 which entails a correction of the driving torque. Such correction is effected by resorting to correction factors supplied by an adaptation system denoted by the box 12 of FIG. 28. The correction factors can compensate for departures of actual condition of the system from an ideal or desired condition, and the compensation can constitute an additive, multiplicative and/or nonlinear adaptation.

The determination or selection of the appropriate $k_{me}$ factor for the then prevailing operating conditions takes place at 3, and the thus determined or selected factor constitutes the ratio of clutch torque ($M_{clutch}$) to the corrected prime mover output torque ($M_{pm\ corr}$), and such ratio is selected in advance as a fixed value for each operating point of a characteristic field determined on the basis of selected emphasizing of one or more criteria denoted by one or two or three or four or, if necessary, all five of the curves in the diagrams of FIG. 27. The design of the damper (if a damper is used at all) is of particular importance because the properly designed damper can ensure that the $k_{me}$ factor can remain at least substantially constant at least within a relatively wide range of operation of the combustion engine and/or of the hydrokinetic torque converter the housing of which is driven by such engine.

The box 4 denotes in the flow chart of FIG. 28 the step of calculation of the desired clutch torque ($M_{clutch\ des}$) with the corresponding factor $k_{me}$ and the value corresponding to the corrected input torque of the prime mover. The box 5 denotes the step of further correction of the desired clutch torque by the value obtained as a result of the logic interlinking step carried out at 2 (note the adaptation system denoted by the aforediscussed box 12). As already mentioned above, the compensation can constitute an additive, multiplicative and/or nonlinear adaptation.

In many instances, the interlinking described with reference to the box 1 or 2 shown in the flow chart of FIG. 28 alone suffices to achieve the desired selection of an adequate clutch slip. If only one of these interlinkings is to be relied upon, it is normally preferred to select the one denoted by the box 1.

The box 6 denotes in FIG. 28 the calculation of a parameter on the basis of the corrected desired clutch torque $M_{clutch\ des}$ and the inverse transfer function of the range denoted by the bypass clutch. The box 7 denotes the step of determining the output value to be supplied by the regulating unit as a function of information received on the basis of the step carried out at 6 and the inverse transfer function of the range denoted by the clutch. It is presently preferred to employ an electrohydraulically operated selector, e.g., a proportional valve or a pulse width modulating valve.

The box 8 denotes in FIG. 28 the feedback of parameters in the form of a regulation or adaptation. The step denoted by the box 8 is optional. The box 9 denotes a determination or monitoring of the actual clutch torque, e.g., by resorting to a torque sensor or a strain gauge. The step denoted by the box 9 can be dispensed with if the actual clutch torque is calculated on the basis of physical parameters as well as the corresponding parameters of the motor vehicle and/or the torque converter. For example, the characteristic field of the engine and/or the characteristic field of the torque converter (or the parameter(s) denoting such characteristic field(s)) can be stored in the memory of a processor or a central processor or computer unit. It is also possible to memorize the characteristic field or the corresponding parameter denoting the torque transmitting capacity of the bypass clutch in the improved torque transmitting apparatus.

If it is desired to carry out a determination of the actual clutch torque in accordance with the steps described with reference to the boxes 9 and 10 in the flow chart of FIG. 28, a further step can include completing a comparison of the ascertained actual clutch torque with the calculated clutch torque as determined by resorting to a model. The comparison can involve logical interlinking for the determination of minimum and maximum values or a probabilistic or stochastic comparison.

The system adaptation step denoted by the box 12 in the flow chart of FIG. 28 can involve (among others) the carrying out of the following comparisons and the corresponding correction steps:

(a) A comparison of the corrected desired or optimal clutch torque with the actual or monitored clutch torque. This step can involve a long-range comparison of departures of actual clutch torque from the desired torque, e.g., with a mobile window. The corrected input torque is compared with the calculated input torque and this comparison, too, can involve a long-range comparison in the same way (with a mobile window) as described with reference to the comparison of corrected and desired torques. The just described step or series of steps can further include an evaluation of additional signals or information, e.g., the attachment or detachment of auxiliary aggregates such as the air conditioning system, a compressor, the transmission operating system and/or others.

(b) Detection of the additive, multiplicative and/or nonlinear shares of the engine torque ($M_{pm}$) and clutch torque ($M_{clutch}$) in the system departures ascertained in a manner as outlined in the paragraph (a) above, and the resulting breaking up or division into the corresponding adaptation loops (boxes 1 and 2) or into the interlinkings denoted at 1 and 2.

The detection or determination of corresponding shares of $M_{pm}$ and/or $M_{clutch}$ can proceed, by way of example, in a manner as represented by the diagrams shown in FIG. 29. The upper curve in the topmost diagram of FIG. 29 denotes the actual torque, and the lower curve denotes the desired torque. The torque M is measured along the ordinate as a function of time (t) which is measured along the abscissa. It will be seen that the actual torque (upper curve) undergoes an abrupt change; this can result from the attachment of an auxiliary aggregate-(such as a compressor). The thus obtained change of the actual torque which is available for the torque converter can be taken into consideration by an additive share or factor which can be resorted to in order to effect an appropriate change of the engine torque.

The upper curve in the middle diagram of FIG. 29 again denotes the actual torque and the lower curve denotes the desired torque. It will be seen that the ratio of the actual and desired torques at any specific instant remains substantially constant even though the difference between the actual and desired torques changes. The just described departures of the actual torque from the desired torque can take place as a result of a multiplicative factor (such as the friction coefficient). Thus, the relationship of the actual and desired torques as denoted by the curves in the median diagram of FIG. 29 can develop, for example, as a result of engagement between the two friction faces of the slip clutch and/or as a result of the relationship between the friction coefficients of materials along the two friction faces. Reference is being made to a multiplicative torque transmission share.

The variations of actual and desired torques as denoted by the curves in the lowermost diagram of FIG. 29 are more gradual. The difference between the actual and desired torques remains at least substantially unchanged. Such departures between the actual and desired torques can be compensated for with an additive component. A typical example of the relationship of actual and desired torques as shown in the lowermost diagram of FIG. 29 can develop as a result of departure of the magnitude for selection of clutch torque from the actual value.

Figure 30:
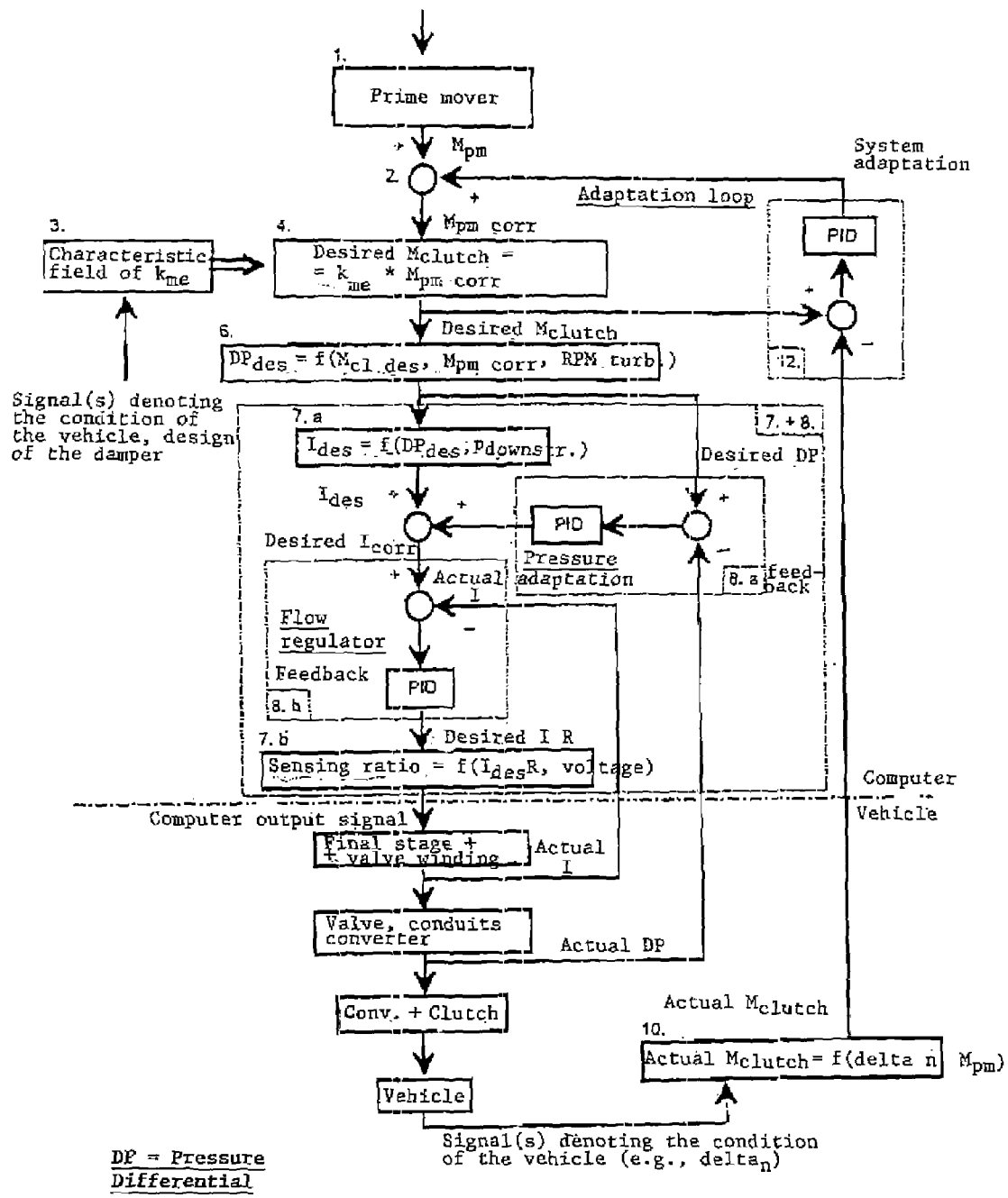
FIG. 30 is a flow chart denoting the steps of one presently preferred method of selecting and regulating the slip of a clutch in the improved torque transmitting apparatus.

The flow chart of FIG. 30 is indicative of a very simple adaptation of torque regulation. The slip of the clutch is selected by an electrohydraulic system employing a proportional valve or a pulse width modulating valve. The signal at the output of the computer (i.e., the value denoted by such signal) is a slip selecting flow which is proportional to the ratio indicated at the output (e.g., a pulse width modulated output) of the computer. The clutch torque is determined on the basis of the thus achieved pressure differential at the clutch, such as the pressure differential between the bodies of hydraulic fluid in the compartments 92 and 93 shown in FIG. 11a. The only system adaptation is an adaptive correction of the input torque; the departure of such torque from the desired or optimal torque is denoted by the difference between the desired and actual torques of the clutch.

A comparison of the flow charts shown in FIGS. 28 and 30 indicates that the method denoted by the flow chart of FIG. 30 omits the step denoted by the box 2 in the flow chart of FIG. 28 as well as the utilization of the corrected input torque ($M_{pm\ corr}$).

The box 6 denotes in FIG. 30 the step of determining the desired pressure differential DP, namely as a function of desired clutch torque (which constitutes the primary parameter) and, if desired or necessary, as a function of the corrected input torque ($M_{pm\ corr}$) as well as the turbine RPM (as a secondary or auxiliary parameter).

In the method denoted by the flow chart of FIG. 30, the step denoted by the box 7 in the flow chart of FIG. 28 is replaced by the steps 7a and 7b. Each of the steps shown at 7a and 7b includes a feedback (as respectively shown at 8a and 8b). The input value of the inverse transfer fuction of the step denoted by the box 7 in FIG. 28 or the steps denoted by the boxes 7a, 7b of FIG. 30 is the ascertained or calculated pressure differential DP (as determined in the step denoted by the box 6). The output value is obtained as a result of the corresponding monitoring ratio (which constututes the output signal of the regulator). The selector or regulator includes an electrical component (such as a power stage and the valve winding) and a hydraulic component which determines the establishment of the required pressure differential between the bodies of hydraulic fluid at the opposite sides of the piston forming part of the bypass clutch. The input parameter of the electrical component is the pulse duty factor, and this component converts the pulse duty factor into an electric actual value or output signal. Such output signal (e.g., a current signal) controls hydraulic component so that the latter can establish the fluid pressure differential which is necessary to select an appropriate slip of the bypass clutch.

The step which is denoted by the box 7a in the flow chart of FIG. 30 determines the inverse function of the hydraulic component of the aforediscussed selector or regulator, i.e., the step denoted by the box 7a results in the generation of an electric signal on the basis of the desired pressure DP, and such electric signal is used for the determination of the corresponding desired output (current) signal. Such part of the electric component comprises a feedback for the ascertained actual pressure DP in the form of a pressure adaptation (carried out in the step denoted by the box 8a shown in FIG. 30). The pressure adaptation ensures the establishment of a corrected desired current.

The box 7b in the flow chart of FIG. 30 denotes a step which is carried out by the electrical component; the latter calculates the pulse duty factor on the basis of the corrected desired current. It is presently preferred to rely on a PID regulator algorithm. The PID regulator determines the input value for the inverse transmission function of the electrical component on the basis of the repetitive error.

The numbering of blocks shown in FIG. 28 at 1 to 12 is analogous to that of the similarly identified blocks in the flow chart of FIG. 30. In other words, the various symbols shown in the blocks 1 to 12 forming part of the flow chart of FIG. 28 correspond to the symbols used in the similarly referenced blocks of the flow chart shown in FIG. 30.

The symbols which are used in the flow chart of FIG. 30 indicate the following:

$DP_{des}$ denotes the desired pressure differential between the bodies of hydraulic fluid at the opposite sides of the piston forming part of the slip clutch.

$DP_{act}$ denotes the actually prevailing differential between the pressures of fluid bodies in the compartments at opposite sides of the piston (such as the compartments 92, 93 shown in FIG. 11a).

The symbol $p_{past}$ denotes the fluid pressure in the downstream compartment, such as the compartment 93 in FIG. 11a or the compartment 25 and conduit 34 shown in FIG. 2.

$I_{des}$ is the desired current for the electrohydraulic valve.

$Delta_n$ denotes the difference between the RPM of the pump and the RPM of the turbine in the torque converter of the improved torque transmitting apparatus. Otherwise stated, $delta_n$ equals the pump RPM minus the turbine RPM.

The symbols "$*_{corr}$" denote the adaptively corrected values.

The parameters of the vehicle denoted in the flow chart of FIG. 30 ahead of the box 10 are indicative of the slip of the bypass clutch and/or of the slip of the torque converter.

FIG. 30 further shows that the symbol $delta_n$ (i.e., the pump RPM minus the turbine RPM) does not constitute a parameter which is comparable to those known from conventional regulation of slip of a bypass clutch. In accordance with the novel torque regulation, the value of $delta_n$ is utilized as a parameter denoting the condition of the range to be regulated in order to detect eventual departures of actual torque from the desired torque; the parameter is thereupon utilized for adaptive regulation to correct, by appropriate processing, the actual torque. For example, the actual values of the torque can be ascertained by resorting to a mobile window and the thus ascertained values are memorized for a given interval of time in order to ascertain the ratio of torque deviations at the clutch and at the engine. This is carried out in the step denoted by the box 12.

The novel regulating method exhibits the additional advantage that the adaptation or compensation for the undesirable parts of the driving torque can take place also when the slip clutch or bypass clutch is completely disengaged, i.e., when $k_{me}=0$. To this end, the nominal input torque $M_{pm}$ is compared with the converter torque (this is carried out by the step denoted by the box 1 in the flow chart of FIG. 28 or by the step denoted by the boxes 2 in the flow charts of FIGS. 28 and 30). Such adaptation renders it possible to take into consideration eventual departures of the nominal torque ($M_{pm}$) while the clutch is disengaged and prior to subsequent engagement of such clutch. This involves the step denoted by the box 12, namely a determination of the converter torque, preferably by relying upon a memorized or stored characteristic field of the torque converter. This renders it possible to ascertain the prevailing converter torque on the basis of $delta_n$. The converter torque is thereupon compared with the nominal input torque ($M_{pm}$) of the engine, and the torque $M_{pm}$ can be ascertained by resorting to a characteristic field of the engine which is memorized and is monitored in the step denoted by the boxes 1 in the flow charts of FIGS. 28 and 30. The characteristic field of the engine can be established on the basis of several monitored parameters, especially the RPM of the engine, the position of the aforediscussed throttle control lever, fuel consumption, the quantity of injected fuel (e.g., the duration of fuel injection) and/or others. The difference $delta_n$ between the RPM of the pump and the RPM of the turbine in the torque converter can be ascertained in the step denoted by the boxes 10 in FIGS. 28 and 30.

It is also possible to utilize the step denoted by the box 10 for determination of the converter torque. The characteristic field of the converter is then stored in a memory which is available for the carrying out of the step denoted by the box 10.

Figure 31:
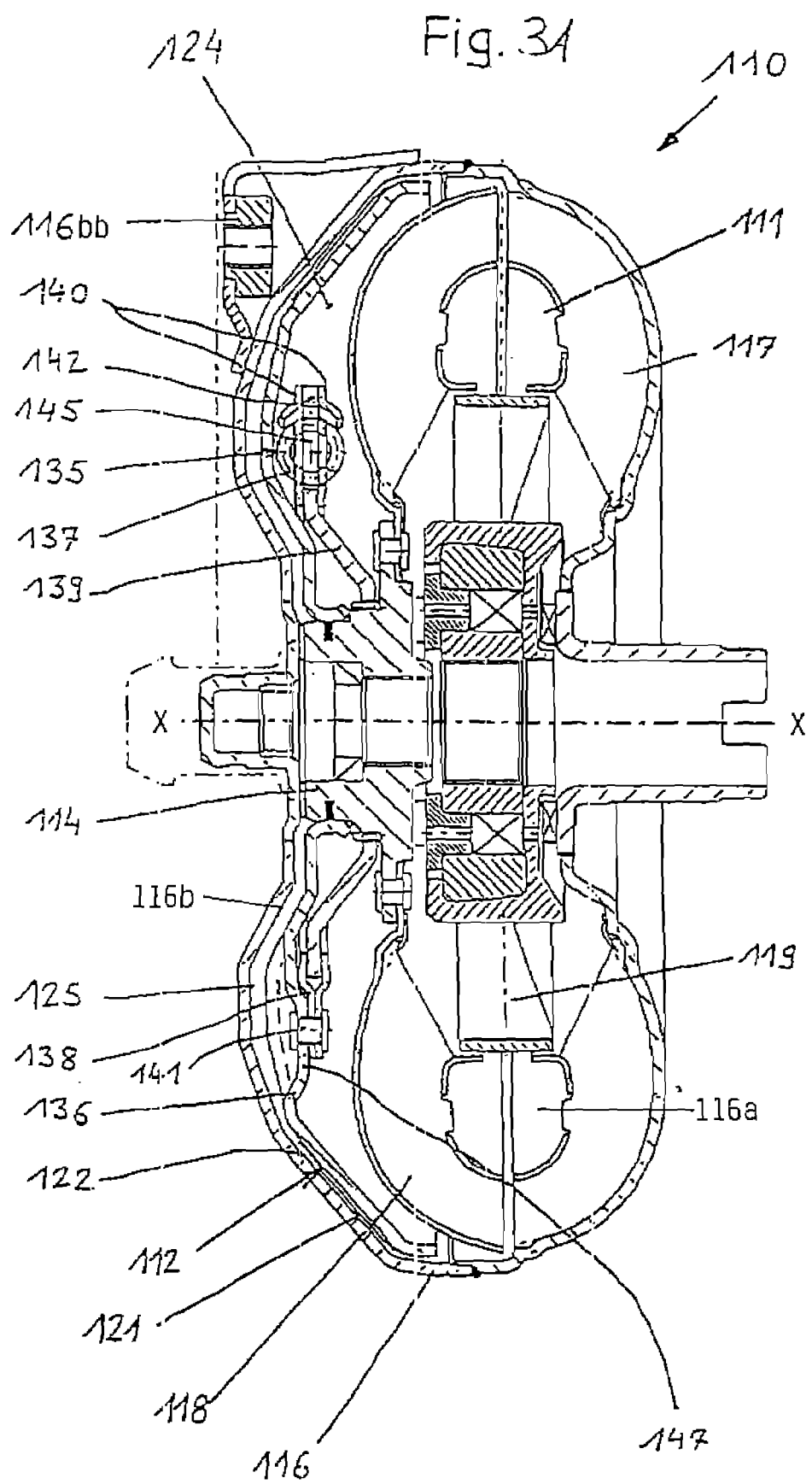
FIG. 31 is an axial sectional view of the hydrokinetic torque converter and the slip clutch in another torque transmitting apparatus which embodies the invention.

FIG. 31 shows a portion of a further torque transmitting apparatus 110 which embodies the present invention and includes a hydrokinetic torque converter 111 and a lockup clutch or bypass clutch 112. The character 135 denotes a damper which can transmit torque from the pressure plate 136 (e.g., a sheet metal piston) of the clutch 112 to the turbine 118 of the converter 111. The shell of a pump 117 forming part of the converter 111 is of one piece with or is welded and/or otherwise affixed to the housing 116 which also forms part of the converter 111. The radially extending wall 116b of the housing 116 carries nuts (one shown at 116bb) which can be affixed to a rotary output element of a prime mover (not shown in FIG. 31), e.g., to a flywheel on the camshaft or crankshaft of a combustion engine in a motor vehicle. The turbine 118 of the converter 111 is installed in a chamber 116a which is defined by the housing 116 and further receives a stator 119 disposed between the turbine and the pump 117, as seen in the direction of the common axis of the converter 111 and clutch 112.

The piston 136 is movable in the axial direction of the converter 111 and has a radially inner portion which is non-rotatably but axially movably affixed to a hub 114 driven by the turbine 118 and serving to transmit torque to the input element of an automatic transmission (such as the input element 14 of the transmission 14A shown in FIG. 1a). The frustoconical radially outer portion of the piston 136 carries a friction lining 121 having a friction face which contacts a complementary friction face 122 on the adjacent portion of the housing wall 116b when the clutch 112 is at least partially engaged.

The piston 136 divides the chamber 116a into a first compartment 124 for the turbine 118, the vanes of the pump 117 and the stator 119, and a second compartment 125 which is adjacent the inner side of the wall 116b. The clutch 112 can be engaged by raising the pressure of the body of fluid in the compartment 124 above that of the body of fluid in the compartment 125. The extent of engagement of the clutch 112 (i.e., the extent of slip between the friction face of the friction lining 121 and the friction face 122) is determined by the magnitude of the pressure differential between the bodies of hydraulic fluid in the compartments 124 and 125.

The torsional damper 135 is designed in such a way that the torque which it can transmit is smaller than the nominal torque, i.e., smaller than the maximum torque transmittable by the combustion engine to the housing 116 of the converter 111. Otherwise stated, the characteristics of the resilient energy storing elements 137 forming part of the torsional damper 135 are selected in such a way that these elements cannot yieldably absorb the entire torque which can be furnished by the combustion engine. The damper 135 includes an input member 138 which is non-rotatably affixed to the piston 136 and can transmit torque to the energy storing elements 137, and a substantially flange-like output member 139 which receives torque from the elements 137 to transmit torque to the turbine 118, i.e., to the hub 114. The damper 135 ceases to absorb fluctuations of torque which is being transmitted from the prime mover to the hub 114 by way of the clutch 112 when the elements 137 undergo maximum compression, i.e., when they act as solid bodies which transmit to the output member 139 the entire torque received from the input member 138. In many or most instances, the energy storing elements 137 are or can constitute coil springs which cease to absorb fluctuations of torque when the neighboring convolutions of each such spring are caused to lie flush against each other. It is also possible to prevent full compression of the energy storing elements 138 when the damper 135 is called upon to transmit torque from the piston 136 to the hub 114, e.g., by providing the input member 138 and/or the output member 139 with suitable extensions (e.g., circumferentially extending lugs, not shown) which prevent further angular movements of the piston 136 and the turbine 118 relative to each other (during transmission of torque by the at least partially engaged clutch 112) prior to complete compression of the energy storing elements.

A presently preferred torque transmitting connection between the output member 139 of the damper 135 and the turbine 118 (i.e., with the input element of the transmission, not shown in FIG. 31) includes an internal gear on the output member 139 and a complementary external gear (e.g., a spur gear) on the adjacent portion of the hub 114.

FIGS. 32 and 33 illustrate certain presently preferred details of the torsional damper 135 in the torque transmitting apparatus 110 of FIG. 31. The input member 138 of the damper 135 comprises arcuate portions or sections 140. FIG. 32 illustrates two arcuate sections 140 which are disposed diametrically opposite each other with reference to the axis X-X (shown in FIG. 31). Each section 140 includes or can include two halves which are mirror images of each other, which are disposed back-to-back, and which are non-rotatably affixed to the piston 136 by rivets 141 (see also FIG. 31).

FIG. 33 shows the flange-like output member 139 of the damper 135. This output member includes a washer-like central portion or main portion 139a and two arms or lugs 142 which are disposed diametrically opposite each other (with reference to the axis X-X of the piston 136) and extend radially outwardly from the central portion 139a. The arms or lugs 142 are provided with windows 143 for portions of the energy storing elements 137. The damper 135 of FIGS. 31 to 33 comprises two energy storing elements 137 in the form of relatively short straight or slightly arcuate coil springs. Each of the arms 142 is flanked by the two halves of the respective composite section 140 of the input member 138. Each half of each section 140 of the input member 138 has a pocket 145 provided with a window 148 for a portion of the respective energy storing element 137. Each pocket 145 is flanked by two fastening portions 144 which are secured to the piston 136 by the respective pairs of rivets 141.

The halves of the sections 140 forming part of the input member 138 are further provided with extensions 146 (e.g., in the form of suitably bent parts of the sections 140) which flank (with requisite angular clearance) the corresponding arms or lugs 142 so that the arms 142 cooperate with the extensions 146 to limit the extent of angular movability of the input and output members 138, 139 relative to each other, i.e., to limit the extent of compression of the energy storing elements 137. The positions of the extensions 146 relative to the respective arms 142 are indicated in FIG. 33 by phantom lines.

As can be seen in FIG. 31, that side of the piston 136 which confronts the compartment 125 is provided with circumferentially spaced apart depressions or recesses 147 (only one shown in FIG. 31) which cause the other side of the piston (namely the side confronting the compartment 124) to develop platforms abutting the pairs of fastening portions 144 on the sections 140 of the input member 138 of the damper 135.

The windows 148 in the pockets 145 forming part of the sections 140 are aligned with the windows 143 in the arms 142 of the output member 139 (as seen in the direction of the axis X-X). Each energy storing element 137 is received in the respective window 143 and in the respective pairs of windows 148 without any play (as seen in the circumferential direction of the piston 136). However, it is equally within the purview of the invention to select the dimensions and/or the initial stressing of one or more energy storing elements 137 and/or the dimensions of the windows 143 and/or the dimensions of the windows 148 in such a way that at least one of the energy storing elements is received in the respective group of windows 143, 148 with at least some clearance (again, as seen in the circumferential direction of the piston 136). Moreover, the damper 135 can be assembled in such a way that at least one of the energy storing elements 137 is installed in prestressed (i.e., initially stressed) condition or that one of the energy storing elements is prestressed while the other energy storing element is installed with at least some play in the circumferential direction of the piston when the damper is not called upon to transmit torque from the piston to the turbine 118. Initial stressing of one or both energy storing elements 137 can be such that the respective element or elements are stressed only by the edge faces in one of the respective windows 143 or in only one pair 148 of the respective windows. All such modifications are available or can be resorted to in order to accurately select the optimum operation of the damper 135 and the optimum range of those angular positions of the input and output members 138, 139 relative to each other when the damper is to transmit torque between the piston 136 of the clutch 112 and the turbine 118 of the converter 111.

An advantage of the damper 135 is that it is called upon to transmit torque only within a selected portion of the entire range of torque transmission values. This renders it possible to employ a simple, compact and inexpensive damper. The damper transmits certain torques, i.e., such damper compensates for certain fluctuations of torque which is being transmitted from the engine to the transmission. The fluctuations of torque which cannot be intercepted by the damper are taken up by the slip clutch 112, i.e., the clutch operates with a necessary slip when the input and output members 138, 139 are prevented from carrying out further angular displacements relative to each other, e.g., because all convolutions of both energy storing elements 137 are in full abutment with each other.

Figure 34:
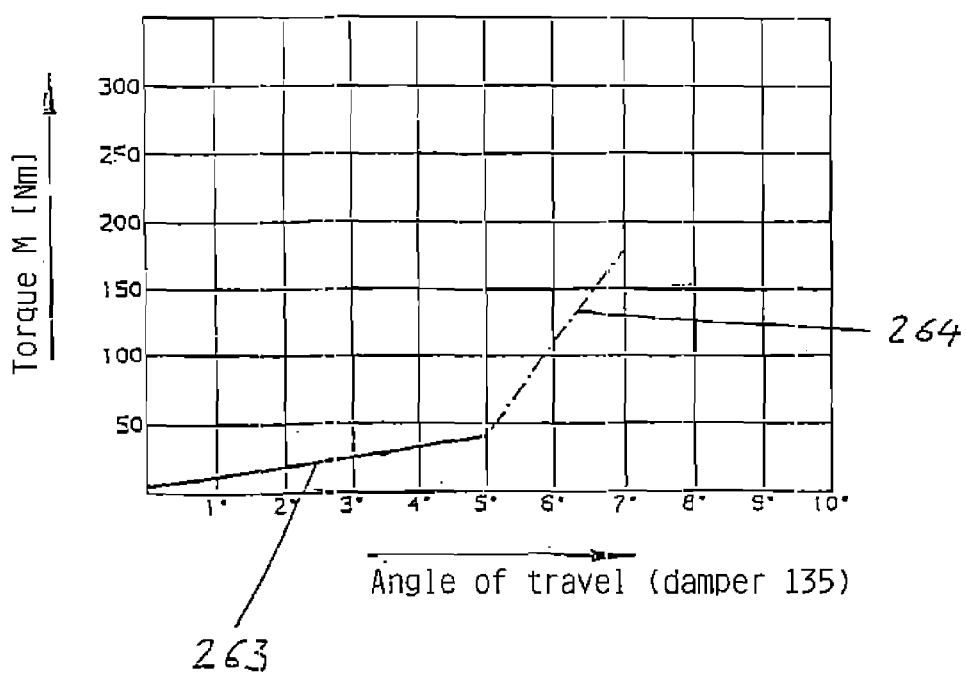
FIG. 34 is a diagram showing a characteristic curve of torques which can be achieved with the damper for a slip clutch in the improved torque transmitting apparatus.

By way of example only, the damper 135 can be designed in such a way that its energy storing elements 137 can transmit between about 40% and about 50% of maximum (nominal) torque of the combustion engine. As can be seen in FIG. 33, the maximum angular movability of the input and output members 138, 139 is about 5°. Reference may also be had to FIG. 34 wherein the angular displacement of the input and output members of a damper which can be utilized with advantage in the torque transmitting apparatus of the present invention is indicated by the solid-line curve 263. This curve is indicative of the angular displaceability of the input and output members of an acceptable damper relative to each other when the vehicle embodying a torque transmitting apparatus which utilizes the damper is in the process of pulling a load. The angle denoted by the curve 263 in the diagram of FIG. 34 can be the same or can be different (e.g., larger) when the engine of the vehicle is coasting. Still further, the parameters of the damper 135 or an equivalent damper can be selected in such a way that the maximum possible angular displacement of the input and output members of the damper relative to each other can assume a first maximum value when the vehicle is pulling a load but a different (e.g., appreciably different) second maximum value when the vehicle is coasting. This can be readily accomplished by appropriate dimensioning of the windows 143 and/or 148 and/or by appropriate selection of the characteristics of the energy storing elements 137. Furthermore, the damper 135 or an equivalent damper can exhibit a stepped (i.e., disconitinuously changing) characteristic curve. Moreover, the characteristic curve of the damper 135 or an equivalent damper can have a first outline when the vehicle is pulling a load and a different outline when the vehicle is coasting.

FIG. 34 further shows that the damper is bypassed when the extent of angular displacement of its input and output members (such as the members 138, 139 shown in FIGS. 31 to 33) reaches a predetermined value, such as an angle matching or approximating 5°. The torque which is being transmitted by the damper when its input and output members can no longer turn relative to each other can be in the range of about 45 Nm. At such time, the energy storing elements (such as 137) cannot undergo any additional deformation. A damper exhibiting the just outlined characteristics can be utilized with advantage in combination with a hydrokinetic torque converter which, in turn, cooperates with a slip-regulated bypass or lockup clutch. Furthermore, a damper which can transmit the aforementioned torque in the range of 45 Nm can be utilized for transmission of torque from prime movers (such as combustion engines in motor vehicles) having a nominal (maximum) torque of between 80 and 200 Nm.

The bypass torque of the damper 135 or an equivalent acceptable damper is preferably selected in such a way that the damper is effective to prevent the transmission of torque fluctuations from the prime mover to the input element of a transmission (such as an automatic transmission) within the entire or nearly entire main or primary operating range of the vehicle. The main or primary operating range of a motor vehicle is intended to embrace that portion of the entire operating range which is most frequently effective (i.e., in use) during the life of the torque transmitting apparatus. As a rule, such primary operating range covers at least those regions of the characteristic field of the engine which are relevant for the cycle known as the FTP75 cycle and/or for the so-called ECE cycle (city, 90 km per hour, 120 km per hour). Expressed otherwise, the main or primary operating range can be said to constitute that range within which the vehicle operates at least during 50 percent of its useful life, i.e., within which the vehicle is used more frequently than (or at least as frequently as) within all other operating ranges combined. The main or primary operating range of a motor vehicle can vary from country to country or from one group of countries to another group of countries, depending upon the speed limits and/or other regulations and/or restrictions imposed upon the operation of motor vehicles in such different countries or groups of countries.

Figure 35:
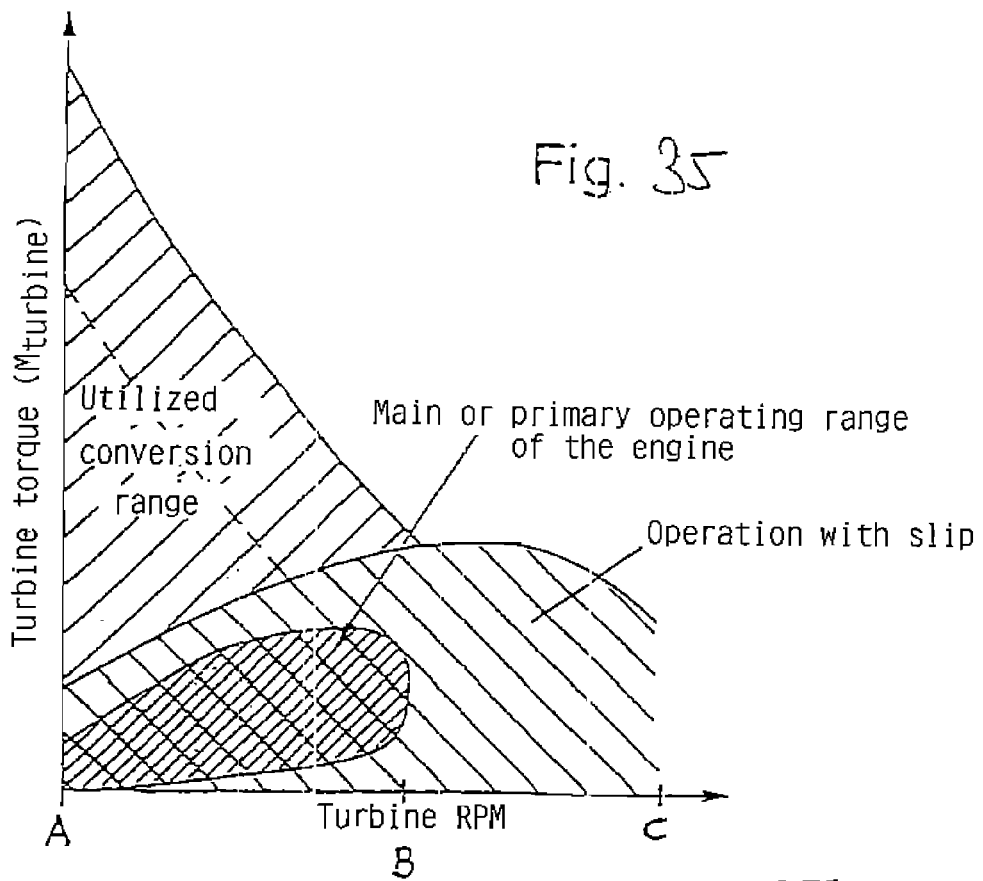
FIG. 35 is a diagram similar to those shown in FIGS. 15 and 19, and illustrates the characteristic field at the torque transmitting output of a "soft" torque converter.

The diagram of FIG. 35 is similar to those shown in FIGS. 15 and 19. The main operating range of the vehicle is again indicated by criss-cross hatching. The actually utilized conversion range is adjacent the ordinate and the range of operation with slip is adjacent the abscissa. The ranges shown in FIG. 35 are or can be those in a torque transmitting apparatus 110, i.e., in an apparatus employing a slip clutch of the type shown at 112 in FIG. 31. The slip clutch is open (disengaged) within the actually utilized conversion range.

FIG. 35 further shows that the main or primary operating range is surrounded by or confined within the range in which the clutch 112 operates with at least some slip, preferably with minimal or nearly minimal slip. The illustrated operating range extends between the RPM denoted by the letter A and the RPM denoted by the letter B. The lower RPM (at A) equals or at least approximates the idling RPM of the engines normally between about 700 RPM and about 800 RPM. The upper RPM limit (at B) of the main or primary operating range is or can be between about 2000 RPM and about 3000 RPM, particularly about 2200 RPM.

The upper limit (at C) of RPM within the range of operation with at least some slip of the bypass clutch can match or at least approximate the maximum RPM of the engine. However, it is equally possible to select the RPM denoted by the letter C in such a way that it is less than the maximum RPM of the engine, e.g., that the letter C of FIG. 35 denotes an RPM within the range of between about 3000 and about 4000 RPM.

The novel design of the damper 135 renders it possible to completely bypass the torque converter 111 within the main operating range of the engine. In other words, the clutch 112 can be operated without any slip so that the $k_{me}$ factor exceeds one (e.g., it can equal or approximate 1.1). Within such main or primary operating range of the engine, the means for preventing the transmission of torque fluctuations from the output element of the engine to the transmission in the power train of the vehicle is constituted practically exclusively by the torsional damper 135. The slip of the clutch 112 is relied upon only to prevent the transmission of peak fluctuations of torque from the housing 116 of the torque converter 111 to the hub 114, i.e., to the input element of the transmission. This is achieved by regulating the slip of the clutch 112 within the main or primary operating range of the engine in such a way that the clutch can only transmit torques which are relatively small in comparison with the maximum or nominal torque of the engine but exceed the momentary (actual) engine torque.

The operation with slip involves the existence of certain angular movements of the friction face of the friction lining 121 on the radially outer portion of the piston 136 relative to the friction face 122 of the radially or substantially radially extending wall 116b of the converter housing 116 shown in FIG. 31. Such slip entails the establishment of certain angular movements between the pump 117 (which rotates with the housing 116) and the turbine 118 of the torque converter 111.

When the clutch 112 operates with slip (the $k_{me}$ factor is then less than 1, e.g., about 0.9), the still existing undesirable fluctuations of transmitted torque are counteracted (primarily or exclusively) as a result of angular displacement of the friction lining 121 and the friction face 122 relative to each other.

Pronounced fluctuations of torque which is being transmitted by the engine can develop under certain specific circumstances, e.g., in the event of resonance, abrupt changes of load and/or certain others. The transmission of such pronounced fluctuations to the hub 114 can be prevented or at least minimized or greatly reduced by reducing the magnitude of the torque which can be transmitted by the clutch 112. This can be accomplished, for example, by altering, the $k_{me}$ factor.

Referring again to FIG. 34, it is also possible to design the torsional damper 135 for the clutch 112 in such a way that its energy storing elements 137 offer a relatively low resistance to deformation within a first angle of rotation of the input member 138 and the output member 139 relative to each other but that such energy storing elements offer a much more pronounced resistance to deformation within a second angle which follows and is or can be smaller than the first angle. Such more pronounced resistance of the energy storing elements 137 is indicated in FIG. 34 by a straight-line curve 264 which immediately follows and is much steeper than the curve 263. For example, the first angle (curve 263) can be somewhere between 0° and 5°, and the second angle (curve 264) can be between 0° and 2°, i.e., an angle denoting the sum of the first and second angles can be as large as about 7°. The resistance which the energy storing elements 137 offer to further deformation within the second angle (curve 264 in FIG. 34) can be many times (e.g., between 7 and 15 times) the resistance offered within the first angle. In the embodiment of the damper 135 which is shown in FIGS. 31 to 33, the resistance of the energy storing elements 137 to angular movements of the input and output members 138, 139 relative to each other within the first angle can match or approximate 8 Nm/°, and the resistance within the second angle can be in the range of about 70 Nm/°.

Within the main or primary operating range of the engine as shown in FIG. 35, the $k_{me}$ factor denoting the magnitude of torque transmittable by the clutch 112 can be between about 1.1 and 1.2 times the actual (then prevailing) engine torque. The regulation of torque which is transmittable by the clutch 112 within the main operating range of the engine can be carried out in such a way that the magnitude of such torque never descends below a predetermined minimum value. It is presently preferred to select the predetermined minimum value in such a way it is not less than 1% of the nominal torque of the engine. For example, the torque which the clutch 112 can transmit within the main operating range of the engine can equal or approximate 5 Nm. However, such lower limit can be raised or further reduced, depending on the nature of the engine, the nature of the vehicle and/or certain other controlling factors. For example, the minimum torque which the clutch 112 should be able to transmit within the main operating range of the engine can be selected to match or at least very closely approximate but not to exceed the maximum torque transmittable by the engine within the main operating range shown in the diagram of FIG. 35.

The range identified in the diagram of FIG. 35 as "operation with slip" can be indicative of a range of operation of the clutch 112 with a $k_{me}$ factor which enables the clutch to transmit between about 0.8 and about 0.95 times the momentarily prevailing torque of the combustion engine. Thus, the torque transmitting ability of the clutch 112 is dependent upon the momentary torque of the combustion engine, i.e., of that engine torque which is to be transmitted to the transmission (that is to say to the hub 114 shown in FIG. 31). It follows that, as the engine-torque increases, the magnitude of torque being transmittable by the clutch 112 also increases and vice versa. Thus, the differential between the pressures of fluid bodies in the compartments 124, 125 at opposite sides of the piston 136 shown in FIG. 31 must be varied to ensure that the magnitude of torque being transmitted by the clutch 112 respectively increases and decreases in response to increasing and decreasing torque of the combustion engine.

A further important advantage of the improved method and apparatus (and particularly of the aforediscussed regulation of torque transmission by the bypass clutch or lockup clutch) is that the operation of the vehicle can be optimized with the expenditure of minimal amounts of energy. Thus, and since the clutch need not operate with slip within the main or primary operating range of the engine, it is now possible to run the engine with surprisingly large savings in fuel (as compared with vehicles wherein the torque transmitting apparatus does not embody a bypass clutch or employs a bypass clutch which operates with slip within the main operating range of the engine). As already mentioned above, the RPM of the engine within the main operating range is normally between about 600 (lower limit as indicated at A in FIG. 35) and about 2200 and 3000 (upper limit indicated at B in FIG. 35). The average RPM within the main operating range is approximately 1800. The clutch 112 operates without any slip or with a minimum of slip, i.e., only (or primarily) the clutch 112 serves as a means for transmitting torque from the output element of the engine to the hub 114 within the entire operating range of the engine. Since the clutch 112 operates without slip or with a minimum of slip, prevention of transfer of undesirable fluctuations of torque from the engine to the transmission is effected (either entirely or primarily) by the selected damper 135. As already mentioned above, the damper is or can be designed in such a way that it permits relatively small angular displacements of its input and output members relative to each other, and such angular displacements are terminated when the main operating range of the engine reaches the upper limit. The upper limit of the torque being transmittable by the damper is or can be between about 15% and about 50% of the maximum engine torque (depending upon the weight of the motor vehicle, upon the nature of the engine and/or upon certain other parameters). An advantage of such dampers is that they can prevent or greatly reduce the likelihood of the development of droning and/or other noises even when the engine transmits relatively small torques. Moreover, such dampers can suppress or completely eliminate undesirable or excessive reactions to changes of the load upon the power train, again due to the selection of relatively small maximum angular displacement of the input and output members of the damper relative to each other. Excessive reactions to shifting of the load are counteracted in that, when the angular movability of the input and output members of the damper reaches its upper limit, continued or additional abrupt changes of the effect of shifting of the load are compensated for in that the friction faces of the bypass clutch then begin to turn relative to each other, i.e., the clutch begins to operate with the necessary slip. This limits the magnitude of the engine torque which can be transmitted by the combination of the clutch 112 and damper 135. Other abrupt increases of engine torque are also damped in that the clutch begins to operate with the necessary slip. When the engine is operated above the main operating range (i.e., when the turbine RPM exceeds the value denoted at B in the diagram of FIG. 35 and the magnitude of engine torque exceeds the maximum torque transmittable by the damper 135), the clutch 112 is regulated in such a way that its friction faces can slip relative to each other. Such slip counteracts the undesirable effects of shifting of the load upon the power train. If the transmission of engine torque above the main operating range takes place without any appreciable undesirable fluctuations, the clutch need not operate with slip if the maximum torque transmittable by the non-slipping clutch at least matches the then prevailing engine torque. If the operation thereupon proceeds within one or more ranges within which the engine torque is likely to undergo undesirable fluctuations, the clutch is again adjusted for operation with the necessary slip. Such undertaking is or can be desirable when the prevailing RPM matches a resonance RPM.

If resonances develop within the main operating range of the engine (including the range of transmission of relatively small engine torques), the clutch 112 is preferably caused to operate with the requisite slip, i.e., the clutch is adjusted so that its ability to transmit torque is reduced accordingly, normally to a considerable degree. The above outlined modes of regulation of the slip of the clutch 112 prevent or at least reduce the likelihood of the development of booming and other noises which cannot be eliminated when the clutch is operated with slip. The reason is that, when the clutch is operated with slip, its friction faces alternately slide relative to and turn with each other. Alternating-rotation of the friction faces with and relative to each other will result in the generation of noise.

In addition to the already described advantages of the improved method, of the improved apparatus and of certain constituents of the improved apparatus, the invention exhibits a number of further advantages many of which will be pointed out below, partly in conjunction with the description of additional modes of operation and additional designs of the improved apparatus.

The basic concept underlying the invention is that the improved method and apparatus render it possible to avoid post mortem regulation of the operation of the torque converter and lockup or bypass clutch. This is a serious drawback of heretofore known proposals according to which the slip of the clutch and/or the operation of the converter must depart from the desired slip and/or the desired operation of the converter prior to attempted remedial undertakings because the extent of departure from the desired slip and/or from the desired operation of the converter must be monitored and the thus obtained results must be compared with signals denoting the optimum or intended slip and/or the optimum or intended converter operation. This, in turn, renders it possible to undertake those steps which are available or necessary to eliminate the differences between the actual (prevailing) slip and the optimum slip and/or the differences between the actual converter operation and the desired operation.

Another drawback of heretofore known proposals is that the remedial action which is contemplated in order to avoid unsatisfactory transmission of engine torque cannot be achieved at all. For example, regardless of the prescribed or previously selected slip for the purposes of overcoming certain undesirable phenomena during transmission of engine torque, such prescribed or previously selected slip cannot be achieved if it exceeds the slip existing while the lockup clutch is fully disengaged. Otherwise stated, certain prior proposals involve the suggestion of remedial undertakings which are beyond the capabilities of the components or units designed to carry out such remedial undertakings.

Further problems which cannot be overcome by resorting to heretofore known proposals include untimely carrying out of remedial actions. For example, the regulating means for selection of a corrected slip should not be actuated during certain stages of shifting of the transmission into a different drive ratio. It has been ascertained that, if the slip of the lockup clutch is relatively low during shifting of the transmission into a higher gear ratio, the clutch is likely to block toward the end of the shifting step and this affects the comfort of the occupant or occupants of the vehicle. Last but not least, the remedial undertakings to overcome one or more first problems often conflict with remedial undertakings which should be resorted to in order to overcome one or more second problems. Thus, even though one could conceive a complete or reasonably acceptable solution of a first problem, such solution cannot be resorted to because its carrying out would create other problems or would prevent the overcoming of certain additional problems.

Applicants propose to regulate the slip of the lockup clutch and/or the operation of the torque converter as a function of the monitored engine torque and to resort to adaptive compensation. In accordance with the method of the present invention, the bypass torque ($M_{bypass}$) is ascertained on the basis of engine torque ($M_{pm}$) in accordance with the equation $$M_{bypass}=M_{pm}*\text{bypass factor.}$$

Figure 36:
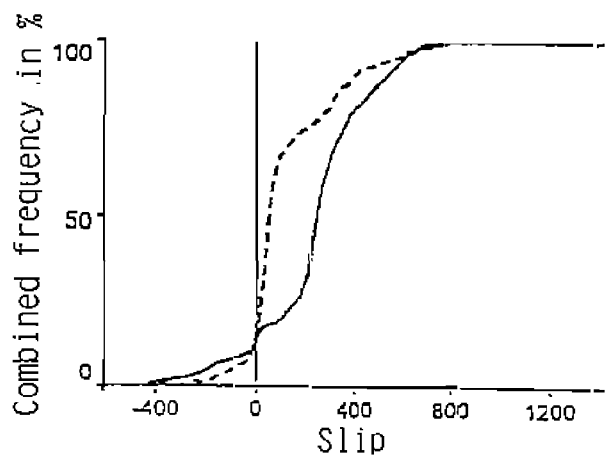
FIG. 36 is a diagram showing the possibility of totalizing the slip of the clutch.

Otherwise stated, it is not proposed to invariably operate with a slip. This can be ascertained by referring to the cumulative frequency diagram of FIG. 36. The solid-line curve in the diagram of FIG. 36 denotes the cumulative frequency (in percent) of different slips in accordance with the prior art proposals and the broken-line curve is indicative of the cumulative frequency of various slips in accordance with the teachings of the present invention.

The extent to which the clutch is engaged or disengaged (to operate without slip or with partial slip (engaged) or with maximum slip (disengaged)) is determined primarily or at least to a certain extent from the standpoint of energy.

EXAMPLE

Figure 37:
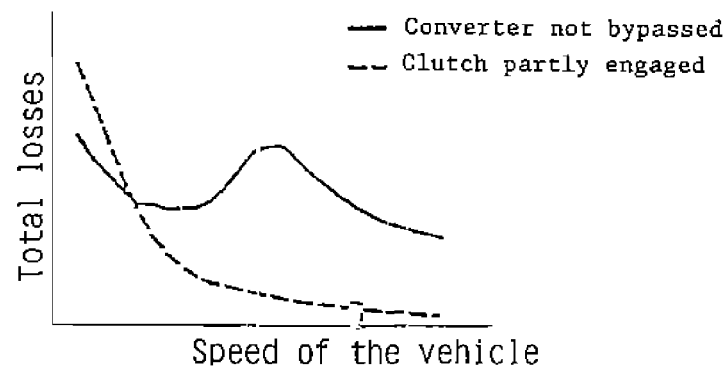
FIG. 37 is a diagram wherein the curves indicate losses developing while a vehicle embodying the improved torque transmitting apparatus is driven along a sloping (such as mountain) road.

It is assumed that the vehicle employing a torque transmitting apparatus which embodies the invention weighs 3600 kg and is driven along a mountain road having a highly pronounced slope (such as 12%). When the vehicle is driven at a low speed, the bypass clutch cannot be fully engaged. The reason is that the vehicle must be operated in such a way that a certain additional or spare pulling force is available to the operator or because the nature of the engine is such that its RPM cannot be suppressed or reduced beyond a particular value. The computerized regulating system carries out a continuous determination whether or not the overall losses are less pronounced if the clutch operates with slip or is completely disengaged (see the diagram of FIG. 37).

If the operator of the vehicle desires to raise the pulling force, she or he changes the position of the throttle control lever, namely the lever is depressed or further depressed. This causes a rise of the engine torque. If the torque rise is insufficient, the operator depresses the lever again in order to "indicate" to the power train that an additional acceleration of the RPM of the engine is desired. In conventionally designed vehicles, the operator is normally compelled to shift into a lower drive ratio in order to enable the vehicle to increase the pulling force by an appropriate adjustment of the transmission. In accordance with the present invention, the computerized unit continuously ascertains whether or not a higher pulling force can be expected in response to disengagement of the bypass clutch. This is the case if a disengagement of the clutch entails that the torque converter is capable of converting torque. Thus, if the unit determines that a disengagement of the clutch will entail an operation with torque conversion, the clutch is disengaged in a fully automatic way. If the unit determines that disengagement of the clutch will not entail torque conversion, the transmission is shifted into a lower drive ratio. The just described ascertainment by the computerized unit is carried on without interruptions.

Figure 38:
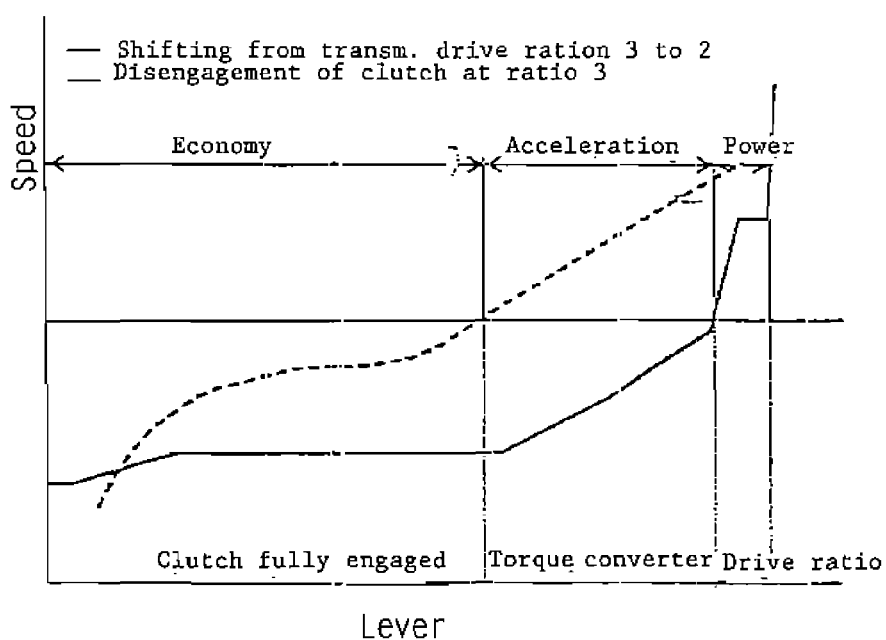
FIG. 38 is a diagram showing the performance of the torque transmitting apparatus during different stages of operation of the vehicle.

In order to enhance the cooperation, it is advisable to cause the characteristic shifting curves of the transmission to also conform to the aforediscussed concept. It is particularly effective if such conformance is carried out in a power train wherein the torque transmitting apparatus employs a "soft" converter. The reasons will be explained below. The underlying reasoning can be represented to a certain extent in the form of a diagram of the type shown in FIG. 38.

The aforedescribed undertakings of employing a slip clutch, of employing a clutch having a conical piston and two complementary conical friction faces, of employing a so-called mini damper and of relying upon adaptive regulation bring about a considerable reduction of fuel consumption because it is possible to operate with slip in each drive ratio of the transmission. Further substantial improvements can be achieved by utilizing a "soft" converter.

The design of the torque converter also influences the quality of the torque transmitting operation, the comfort to the occupants, the fuel consumption and/or other desirable features of the power train. In heretofore known power trains employing torque transmitting apparatus with a torque converter in combination with a bypass clutch, the bypass cannot be relied upon under all operating conditions. Therefore, it is necessary to employ a relatively "stiff" torque converter. On the other hand, the improved method and apparatus render it possible to rely on the advantages of a "soft" converter, i.e., to avoid the drawbacks of a "stiff" or "hard" converter. The advantages involve the establishment of a more satisfactory pulling force and a reduction of losses at a standstill. The drawbacks (such as higher losses in certain instances when the vehicle is pulling a large load, and the aforediscussed rubber band effect) are avoided or their adverse influence can be reduced in that the bypass clutch can be put to use whenever necessary.

Additional advantages of the improved method and apparatus are highly improved driving performance combined with a reduced consumption of fuel. Moreover, the combustion of fuel is much more satisfactory; in fact the improvement of fuel combustion is unexpectedly high. The test-cycles start with a cold phase. When the bypass clutch is disengaged and the improved torque transmitting apparatus employs a "soft" torque converter, the operating temperature of the engine is reached much sooner than when the engine transmits torque to the transmission of a motor vehicle by way of a conventional torque transmitting apparatus. This, in turn, is desirable because it enhances the acceptability of combustion products to the environmental protection agencies.

Acceleration of a motor vehicle by an engine from 0 km to 100 km by way of a four drive ratio transmission is not appreciably different from that with a five drive ratio transmission. The reason is that the transmissions in the first drive ratios are practically identical. On the other hand, if a vehicle which embodies the improved torque transmitting apparatus employs a four drive ratio transmission, the acceleration of such vehicle is greatly superior to that of a vehicle utilizing a conventional torque transmitting apparatus and a five drive ratio transmission. The reason is believed to be that the improved apparatus employs a more satisfactory torque converter. Further pronounced improvements were discovered in connection with the fuel consumption regardless of whether the improved apparatus was used to transmit torque by way of a four drive or five drive ratio transmission. The improvements in the quality of combustion products were pointed out hereinbefore.

It has been discovered that the improved torque transmitting apparatus can be utilized with particular advantage in combination with a four speed transmission if it employs the aforediscussed bypass clutch whose operation is regulated in accordance with the method of the present invention. As regards the driving performance, the combination of the novel torque transmitting apparatus (including the improved bypass clutch) with a four-speed transmission is just as satisfactory as or even superior to that of a five-speed transmission with a conventional bypass clutch. The same applies for the fuel consumption. On the other hand, the cost and weight of the novel combination are much more satisfactory than those of the combination of a five-speed transmission and a conventional bypass clutch. Moreover, the research and development costs for the improved combination are expected and likely to be well below those of a conventional combination including a five-speed transmission and a standard bypass clutch.

FIG. 39 shows that the combination of a "soft" torque converter with a widely spread-out four-speed transmission can furnish a more satisfactory pulling force than the combination of a conventional converter with a five-speed transmission, at least within several ranges of operation. Thus, the diagram of FIG. 39 shows that, when the load is small, it is necessary to shift a five-speed transmission by two drive ratios in contrast to a four-speed transmission which receives torque from the improved torque converter-bypass clutch combination. Otherwise stated, a transmission which cooperates with the improved converter-clutch combination need not be shifted as frequently as a transmission which cooperates with a standard converter-clutch combination. The greater differences or steps between successive drive ratios are compensated for by the softer torque converter which is utilized in the apparatus of the present invention.

Adaptive selection of the torque to be transmitted to the transmission can be achieved by comparing the desired clutch torque with the actually transmitted clutch torque. One mode of accomplishing such comparison is to ascertain the output torque of the engine and the torque being transmitted by the converter. The torque which is being transmitted by the converter can be ascertained directly by determining the input and output torques of the converter. The output torque of the converter can also be ascertained on the basis of the output torque of the transmission and the transmission ratio. To this end, the memory of the central computer unit can store information pertaining to the characteristic field of the converter.

The torque which is to be transmitted by the clutch is normally selected in such a way that, at the very least, it bears a relationship to the $k_{me}$ factor which, in turn, is determined in dependency upon at least some operating conditions including the permissible noise level in the vehicle, permissible thermal stressing of the converter and/or of the clutch, pulling force and/or acceleration of the vehicle, reaction of the vehicle to the application of additional load and/or to shifting of the applied load (this influences the comfort of the occupant(s) of the vehicle), and fuel consumption.

As already discussed hereinbefore, certain of the aforeenumerated criteria which can or which should be taken into consideration for the determination of the $k_{me}$ factor are contradictory, at least to a certain extent. Consequently, if the $k_{me}$ factor is to be selected as a function of two or more criteria, it is normally necessary to classify the selected criteria in dependency upon their importance or priority for the application of the improved method in connection with the operation of a torque transmitting apparatus in a particular vehicle or in a vehicle which is to be put to a specific use. Thus, and as also mentioned hereinbefore, the acoustics cannot be improved at will by selecting a low or very low $k_{me}$ factor because this would entail a pronounced slip of the clutch and hence an undesirably pronounced thermal stressing of the converter. Thus, the $k_{me}$ factor can be selected or varied within certain upper and lower limits which should not be exceeded in order to avoid undesirable or excessively undesirable influencing of one or more desiderata such as comfort, fuel consumption, noise and/or others. In spite of such limitations in connection with the selection of the $k_{me}$ factor, the still available or permissible changes of such factor can cover a range which renders it possible to greatly enhance one or more desirable features of the vehicle without exerting an undue or impermissibly pronounced influence on one or more other features. The selected $k_{me}$ factor can remain constant or it can be varied in dependency upon the prevailing or changing circumstances of operation of the vehicle. The variation of the $k_{me}$ factor can be stepwise or continuous all the way or at least partly between the aforementioned upper and lower limits. The presently preferred lower and upper limits of the $k_{me}$ factor are about 0.4 and about 1.1, most preferably between about 0.7 and 0.95.

In accordance with a further feature of the improved method and apparatus, the $k_{me}$ factor can be selected (at least within certain operating ranges of the engine, particularly within the lower range and, if necessary, also within the upper range) in such a way that the clutch is called upon to transmit the full net torque being transmitted by the engine. If one resorts to such method, it is desirable to combine the clutch with a damper which is designed for interception or reduction of fluctuations of transmitted torque within the partial load range. Thus, the magnitude of the maximum torque transmittable by such damper should be less than the net torque being transmitted by the engine. One presently preferred range of torque transmissions by the damper is between about 30% and about 60% of the net torque being transmitted by the engine. Such selection of the torque which can be transmitted by the damper ensures that problems pertaining to the acoustics can be overcome, at least in part, even within the lower operating range of the engine and with a relatively large $k_{km}$ factor. This factor can be determined mathematically in dependency upon certain prevailing operating conditions or parameter values or, preferably, on the basis of a characteristic field or map which is stored in the memory of a central computer unit (CPU) or processor.

An important difference between the aforediscussed novel method and apparatus on the one hand and the known slip regulation proposals on the other hand is that the known proposals involve monitoring of the prevailing slip and carrying out adjustments of slip when the actual slip departs from the desired or optimum slip. In contrast to such prior proposals, it is now provided to monitor the torque or a parameter which is representative of torque (such as the pressure differential between fluid bodies at opposite sides of the piston of the slip clutch and/or the magnitude of the force which is being applied to effect at least partial engagement of the clutch). Basically, the novel adaptive regulation of the parameter or parameters denoting the torque to be transmitted by the clutch can be said to constitute a correction of such parameters on the basis of the monitoring of disturbances or departures from desired values. Thus, departures of the actually transmitted torque from the desired torque are ascertained by resorting to a model and are thereupon eliminated upon completion of the necessary calculations being carried out with the model. By way of example, the correction can be carried out with a PID share or only with an I share, e.g., additively. However, it is also possible to carry out the necessary correction with a multiplicative factor or to carry out such correction with an additive as well as with a multiplicative factor.

One feature of the novel method and apparatus resides in the division of torque furnished by the prime mover into a first partial torque which is being transmitted by the hydrokinetic torque converter and a second partial torque which is being transmitted mechanically by way of the bypass clutch. If the regulation of such partial torques is to be carried out continuously (i.e., in contrast to a stepwise fashion), the piston of the clutch is being acted upon with a varying force, namely a force which is varied by an intelligent regulator in such a way that it ensures an optimal subdivision of the torque being transmitted by the engine into clutch torque and converter torque for each circumstance of use of the vehicle and its prime mover.

The method of the present invention can be practiced in such a way the clutch operates with a certain slip within each and every range of operation of the engine and that such slip is not regulated upon ascertainment of the momentarily prevailing slip but rather in dependency upon the magnitude of the transmitted torque. The desired or optimal slip develops in automatic response to correction of the magnitude of transmitted torque, preferably with a gradual adaptive regulation. The clutch is not disengaged (opened) for the purpose of or during shifting of the transmission into a different drive ratio but continues to be regulated in dependency on the magnitude of transmitted torque. It is desirable and advantageous to regulate the magnitude of the torque by resorting to a rising or upwardly sloping characteristic friction curve so that the friction coefficient at the friction faces of the clutch preferably increases in response to increasing slip and the magnitude of the friction coefficient in fully engaged condition of the clutch is less than that of the friction coefficient which develops when the friction faces are free to slide relative to each other.

In accordance with a further embodiment or development of the improved method and apparatus, the torque to be transmitted by the slip clutch can be selected as a function of the magnitude of the torque being transmitted by the engine in accordance with the equation $$M_{clutch} = k_{me} \cdot k_{corr} \cdot (M_{engine} + M_{corr\ eng}) + M_{corr\ wu}$$

wherein $k_{me}$ is the torque dividing or proportioning factor ($0 \leq k_{me} \leq 2$), $k_{corr}$ is a factor for correction of multiplicative errors, $M_{corr}$ is correction torque for compensation of errors additive to engine torque, and $M_{corr\ wu}$ is correction torque for compensation of errors additive to the clutch torque. This ensures automatic establishment of a minimal slip between the input and the output of the torque transmitting apparatus in dependency upon the magnitude of the $k_{me}$ factor which remains constant within the entire operating range of the torque transmitting apparatus. Furthermore, the $k_{corr}$ factor and the correction torques $M_{corr\ eng}$, $M_{corr\ wu}$ ensure automatic long-range compensation for deviations from ideal conditions.

The just outlined method and apparatus render it possible to establish and maintain a slip which is small as a result of the selection of factors $k_{me}$ and $k_{corr}$. Within certain operating ranges, e.g., when the RPM is low and the load is high (these are circumstances under which the performance of combinations of engines and conventional torque transmitting apparatus is unsatisfactory, particularly as far as the transmission of torque is concerned), the factors $k_{me}$ and $k_{corr}$ should be selected in such a way that the torque being transmitted by the clutch is as small as possible in order to establish a relatively high RPM differential. Such selection of the factors $k_{me}$ and $k_{corr}$ is especially advantageous when the apparatus employs a "soft" torque converter having a high conversion ratio because this renders it possible to raise the output torque within several particularly important ranges of operation and to make it appear that the engine transmits a torque higher than the actually transmitted torque.

The improved method and apparatus exhibit the advantage that they reliably prevent the transmission of fluctuations of torque even though or even if the slip is small or very small. Furthermore, such method and apparatus ensure a more satisfactory reaction of the power train during shifting of the transmission into a different drive ratio and the power train is capable of establishing and maintaining surprisingly high acceleration reserves. Still further, the improved method and apparatus render it possible to employ smaller and/or flatter torque converters which is particularly important in vehicles with front wheel drive and an engine extending transversely of the direction of forward or rearward movement of the vehicle. Still further, the reliance on such method and apparatus renders it possible to achieve a pronounced reduction of fuel consumption because the method can be practiced in such a way that the converter can be bypassed by the clutch within each drive ratio of the transmission.

The torque proportioning factor $k_{me}$ in the last mentioned equation can be selected as a function of the output RPM, solely or exclusively as a function of the engine RPM, as a function of the RPM and torque of the prime mover, and/or as a function of the output RPM and the torque of the prime mover. Thus, the RPM of the prime mover is an important parameter which influences the value of the $k_{me}$ factor, not only by itself but also in conjunction with one or more other parameters, particularly in combination with the torque being transmitted by the prime mover.

Though it is possible to employ slip clutches which are not adjustable by resorting to a hydraulic fluid, it is presently preferred to construct the torque transmitting apparatus in such a way that it can utilize a clutch with a piston which can be displaced by a hydraulic fluid and that such fluid fill two compartments at opposite sides of the piston. One of the compartments is disposed between that part (wall) of the torque converter housing which can be engaged by the piston and the other compartment is adjacent that side of the piston which faces away from the one compartment. As already explained before, the axial position of the piston (and hence the extent of the slip of the bypass clutch) is determined by the selected pressure differential between the bodies of hydraulic fluid in the two compartments.

As can be seen in FIG. 2, the improved torque transmitting apparatus can be constructed in such a way that (especially if the prime mover is a combustion engine) the circumstances of its operation or utilization can be controlled as a function of the engine RPM, as a function of the engine RPM and the position of the throttle control lever, as a function of the engine RPM and the subatmospheric pressure in the suction pipe of the engine, and/or as a function of the engine RPM and the duration of fuel injection. As a rule, the indicator for the operating condition of the apparatus is the RPM of the engine, either alone or in combination with the position of the throttle control lever or with the rate of fuel admission into the engine or with the pressure in the suction pipe or with the duration of fuel injection.

In view of the dynamic behavior of hydraulic and mechanical torque transmitting systems, an overly rapid increase of a parameter which influences the division or proportioning of torque being transmitted from the prime mover to an automatic transmission and/or another driven unit is apt to initiate the development of higher- or lower-frequency fluctuations of transmitted torque. This, in turn, can entail untimely and hence undesirable full engagement (blocking) of the clutch and/or the transmission of insufficient torque by way of the clutch, all as a result of recurrent excessive departures of the actually transmitted torque from the torque the transmission of which by the converter or clutch alone or in combination with one another is most satisfactory under the prevailing circumstances.

Such undesirable fluctuations of torque being transmitted by the torque converter and/or by the clutch can be avoided or at least greatly reduced by the aforediscussed expedient of selection of one or more parameters which influence the division of engine torque into clutch torque and converter torque in accordance with a function in dependency on time. It is particularly desirable and advantageous to delay the change of the pressure differential between the bodies of fluid at the opposite sides of the piston of the clutch as a function of time. Alternatively, a different relationship between the transmissions of torque by way of the clutch and by way of the converter can be selected with a delay in dependency upon the differential between the input RPM and the output RPM of the torque transmitting apparatus. Still further, it is possible to delay such changes of partitioning of the engine torque into clutch torque and converter torque in accordance with a function in dependency upon the gradient of engine RPM.

As already described with reference to and as shown in the aforediscussed flow charts, the desired pressure differential between the bodies of hydraulic fluid in the compartments at opposite sides of the piston of the slip clutch can be varied by resorting to a PID regulator or a PI regulator. The variation of pressure differential with a PI or PID regulator cannot be unequivocally defined by an analytical technique.

Still further, the desired pressure differential can be established by scanning a characteristic curve and utilizing the thus obtained signals to determine or select the differences between the actual and desired pressure differentials. The regulating step of such method then comprises eliminating the aforediscussed differences by establishing an I return flow from one of the compartments into the other compartment. Again, the variation of pressure differential by resorting to such expedient cannot be unequivocally defined by an analytic technique.

It is also within the purview of the invention to regulate the pressure differential by a PI regulator, by a PID regulator or by an I regulator. Signals for the actuation of the selected regulator can be generated as a result of variable flow of hydraulic fluid between the two compartments in the housing of the torque converter, as a function of a duty factor or a fluid flow through an adjustable valve.

Another embodiment of the invention is based on the recognition that a superior proportioning of engine torque into converter torque and clutch torque can be achieved by resorting to a compensating step which includes monitoring the actual torques being transmitted by the clutch and comparing the monitored actual torques with reference values. This is considered to be tantamount to comparing the input torque being transmitted to the improved apparatus with output torque the apparatus transmits to an automatic transmission and/or another driven unit.

Alternatively, one can compute the torque being transmitted by the torque converter on the basis of the characteristics of the torque converter and determine the actual ratio of torques being transmitted by the torque converter and the clutch. In other words, one can monitor the actual ratio of converter torque to clutch torque.

Still further, the differences between the actual and predetermined torques being transmitted by the clutch can be attributable to at least one of (a) multiplicative errors, (b) errors additive to prime mover torque, (c) errors additive to clutch torque, (d) multiplicative errors and additive errors to prime mover torque, errors multiplicative and additive to prime mover torque, and (f) errors multiplicative of and additive to prime mover torque and clutch torque. The step of carrying out compensation then preferably takes place with a time constant of several seconds in order to thus impart to the step of carrying out compensation a purely adaptive character.

If the prime mover can be operated at a plurality of speeds, the method can further comprise the step of utilizing signals which are generated by the operator of the vehicle to denote a desired acceleration of the vehicle as a means for increasing the slip of the clutch as a result of a reduction of the factor $k_{me}$, i.e., of a factor denoting the division of torque being transmitted by the rotary output element of the engine into first and second torques, namely into torques which are respectively transmitted by the converter and the clutch of the torque transmitting apparatus. This results in the establishment of additional spare torque which is transmittable by the torque converter. The signals which are generated by the operator of the vehicle to denote a desired acceleration of the vehicle can be generated as a function of the speed at which the operator changes (or causes a change of) the angle of the throttle valve.

If the transmission which receives torque from the converter of the improved torque transmitting apparatus (regardless of whether such torque is being transmitted by the converter alone, by the clutch alone (but by way of the turbine of the converter) or in part by the converter and in part by the clutch, again by way of the turbine of the torque converter) has a plurality of speed ratios, the regulating step of the improved method can comprise utilizing the slip of the clutch at each of the plurality of drive ratios as a primary factor, and the efficiency of the torque converter as a secondary factor, for the transmission of torque from the rotary output element of the engine to the rotary input element of the transmission to thus permit the utilization of a torque converter operating with a high stall speed and having a wide torque conversion range. In other words, the slip of the clutch is a parameter which is more important than the efficiency of the torque converter, and such selection of the parameters renders it possible to employ a torque converter having a high stall speed and a wide torque conversion range. This renders it possible to achieve a pronounced increase of the available spare torque as a result of selective increase of the slip of the torque transmitting apparatus.

Analogous results can be achieved if the method and apparatus of the invention are modified in such a way that the regulating step and the regulating means serve to ensure that the clutch is caused to slip during each shifting into a different speed or drive ratio or at least during shifting into certain speed or drive ratios.

As concerns the design of the improved torque transmitting apparatus, the operation, the compactness and/or certain other desirable features (such as low cost) of the clutch in such apparatus can be enhanced by the novel expedient of providing the clutch with a piston which is movable in the direction of the axis of the torque converter, whose axis coincides with the converter axis, a radially outer portion of which constitutes a cone (such as a conical frustum) which is provided with a friction lining having a first friction face which is caused to bear against and to receive torque from a second friction face on an adjacent portion of the engine-driven housing of the torque converter when the clutch is at least partially engaged (the first friction face can be provided directly on the radially outer-portion of the piston and the second friction face can be provided on a friction lining affixed to the aforementioned housing), and a radially inner portion which is non-rotatably and preferably sealingly coupled with the turbine of the torque converter. For example, the radially inner portion of the piston can constitute or include a first hub, the turbine of the torque converter or the input element of the transmission can include or constitute a second hub, and one of these hubs can be sealingly and non-rotatably telescoped into the other hub.

If the magnitude of the torque being transmitted by the clutch is variable by a monitoring unit in conjunction with a central computer unit and if the application of force to (and hence the magnitude of torque being transmitted by) the clutch is selectively regulatable by the computer unit, the improved method can comprise the steps of ascertaining the magnitude of the torque to be transmitted by the clutch in dependency upon the operating condition of the power train and selecting the axial position of the movable friction face of the slip clutch by resorting to a hydraulic system which regulates the pressure differential between the two compartments at opposite sides of the axially movable piston of the clutch. Thus, the clutch is indirectly responsive to signals from the computer unit, namely by way of the hydraulic system which is selected to initiate movements of the piston to any one of a finite or infinite number of different axial positions and to thereupon maintain the piston in the selected axial position for the required interval or intervals of time.

Proposals which are disclosed in the aforementioned published German patent application No. 31 30 871, in the aforementioned U.S. Pat. No. 5,029,087 and in the aforementioned U.S. Pat. No. 4,577,737 all exhibit the drawback that they necessitate a determination of the difference between the output RPM of the prime mover and the input RPM of the driven unit (such as a transmission in the power train of a motor vehicle) or a parameter which is indicative of the input RPM of the driven unit, that the thus ascertained difference (s) must be compared with reference values, and that it is necessary to undertake steps to counteract the departure of the monitored or ascertained output RPM and/or input RPM from the reference value(s). The reason that such proposals failed to gain acceptance in the automotive industries is that the difference between the output RPM of the engine and the input RPM of the transmission entails automatic changes in the magnitude of the transmitted torque as a result of shifting of the transmission into different drive or speed ratios. Thus, any undertakings to counteract an unsatisfactory difference between the output RPM and the input RPM necessarily take place with a considerable delay which, in turn, brings about the drawback that the magnitude of the torque being transmitted to the transmission is likely to undergo highly pronounced and highly undesirable fluctuations. Furthermore, and as already pointed out hereinbefore, such considerable delays in the eliumination of undesirable differences between the output RPM of the engine and the input RPM of the transmission are likely to cause blocking (full engagement) of the clutch upon completion of shifting into a different drive ratio. This can be avoided by disengaging the clutch prior to each shifting of the transmission. Moreover, regulation of slip during shifting into a different drive ratio causes the conventional torque transmitting apparatus to exhibit a tendency to maintain the difference between the output RPM of the engine and the input RPM of the transmission at a predetermined or desired value, i.e., such regulation is not beneficial to the transmission which receives torque from torque transmitting apparatus of the type disclosed in the aforementioned prior publications.

Applicants have discovered that it is possible to overcome the above-enumerated and other drawbacks of the prior proposals by designing a torque transmitting apparatus which can be utilized for the practice of the improved method and embodies a novel torque converter as well as an improved lockup or bypass clutch for the novel torque converter. Still further, applicants propose to use, if needed, one or more further novel and improved mechanical components, such as the aforediscussed torsional damper or dampers.

The torque transmitting apparatus which embodies the novel and/or improved mechanical components can be utilized for the practice of a method according to which the magnitude of the torque to be transmitted by the clutch is to be varied as a function of the operating condition of the prime mover (such as a combustion engine) in accordance with the equation $M_{clutch} = k_e \cdot M_{corr} \cdot M_{pm}$ wherein $k_e = k_{me}$ is the torque dividing or proportioning factor (determining the ratio of torque being transmitted by the clutch to torque being transmitted by the converter), and $k_{corr}$ is a correction factor. To this end, the method includes the step of ascertaining and applying the force which is needed to ensure that the clutch transmits the required torque $M_{clutch}$ and this automatically entails the establishment of the optimum slip between the input and the output of the torque transmitting apparatus in dependency upon the magnitude of the torque dividing or proportioning factor $k_e$. The correction factor $k_{corr}$ compensates for eventual departures of the operation of any particular power train from the desired or optimal operation.

The feature that, in accordance with one of the numerous embodiments of the novel method, the clutch can be operated with slip within each and every stage of transmission of torque from the output element of the prime mover to the input element of the transmission and/or one or more other driven units renders it possible to regulate the operation of the clutch in dependency upon the magnitude of transmitted torque rather than in dependency upon the extent of slip. Thus, the desired or optimal slip is established in automatic response to proper selection of the transmitted torque and any changes of the slip are or can be gradual. The clutch need not be fully disengaged during shifting into different drive ratios; on the contrary, the regulation of the slip can proceed in the course of shifting from a first drive ratio to a different second drive ratio. The regulation of transmitted torque is preferably carried out by relying upon an upwardly sloping or rising characteristic friction curve. The friction coefficient preferably increases in response to increasing slip of the clutch and such coefficient is preferably smaller when the clutch is fully engaged but larger when the clutch is operated with slip.

The method is preferably practiced in such a way that the slip of the bypass clutch is relatively small as a result of appropriate selection of the factors $k_e$ and $k_{corr}$. This is particularly desirable and advantageous within certain ranges of operation of the power train, for example, when the RPM of the output element of the engine is low and the vehicle employing the engine is called upon to pull a relatively large load. Under the just outlined circumstances, the torque which is being transmitted by many types of combustion engines in motor vehicles is far from satisfactory. In accordance with the improved method, the factor $k_e$ and/or the factor $k_{corr}$ is or can be selected in such a way that the torque being transmitted by the clutch is relatively small, namely the magnitude of such torque is selected with a view to ensure the establishment of a larger RPM differential. This is particularly advantageous when the torque transmitting apparatus employs a "soft" torque converter having a large conversion factor because one can achieve an increased driving torque within certain important stages of operation of the vehicle. As already mentioned before, this makes it appear that the engine transmits a higher torque.

The method of the present invention renders it possible to prevent the transmission of fluctuations or to adequately damp the fluctuations of transmitted torque when the slip of the bypass clutch is small. Moreover, one can achieve a highly satisfactory reaction of the power train during shifting of the transmission into different drive ratios and/or during changes of load. Still further, the torque transmitting apparatus can establish larger supplies or amounts of spare acceleration and can utilize smaller and/or flatter torque converters which, as already mentioned above, renders the improved power train particularly suitable for use in vehicles with front wheel drive and transversely extending combustion engine. Still further, and as also pointed out hereinbefore, one can achieve substantial savings in fuel consumption because the clutch can bypass the torque converter in each drive ratio of the transmission.

The operating condition of a prime mover which includes or constitutes a combustion engine in a motor vehicle can be ascertained as a function of the engine RPM and the position of the throttle control lever, as a function of the engine RPM (i.e., the RPM of the output element of the engine) and the subatmospheric pressure in the suction pipe of the engine, or as a function of the engine RPM and a parameter (such as the duration) of fuel injection into the engine.

The factor $k_e$ can be selected in such a way that it remains at least substantially constant within the entire operating range of the power train and is dependent exclusively upon the RPM of the prime mover or upon such RPM and the torque being transmitted by the prime mover. Thus, here again, an important parameter for the selection of the factor $k_e$ is the RPM of the prime mover, either alone or in conjunction with one or more additional parameters, particularly the torque which is being transmitted by the prime mover.

The method of the present invention can further comprise the step of selecting in the central computer unit of the improved torque transmitting apparatus that torque which is to be transmitted by the clutch in response to changes of the torque being transmitted by the power train in accordance with the following undertakings: (A) advance determination of a parameter X which is indicative of the torque being transmitted by the clutch at the instant $t_{n+1}$ (reference should be had again to FIG. 10) after the elapse of a monitoring interval and which is ascertained in accordance with a function excluding at least one undesirable phenomenon, such as blocking of the clutch, (B) determination of a gradient $\Delta X$ which is required to arrive at a desired value of the parameter X after the elapse of an interval $\Delta t$, (C) applying the thus determined gradient $\Delta X$ with a hydraulic system including a proportionality regulation wherein a parameter includes a pressure differential $\Delta P$ established in advance between the bodies of a hydraulic fluid at opposite sides of the pressure plate of the clutch in the housing of the torque converter in accordance with the equation $$\Delta P_{n+1} = (1-\beta) \cdot \Delta P_{desired} + \beta \cdot P_n.$$

In this, equation, $\beta = f(T_v, t)$, and the steps (A), (B) and (C) are repeated until the parameter X at least closely approximates the desired parameter.

Alternatively, that torque which is to be transmitted by the clutch in response to changes of the torque being transmitted by the power train can be selected in accordance with the following undertakings: (A) determining a gradient $\Delta X$ of a parameter X which is indicative of the torque being transmitted by the clutch and is ascertained in accordance with a function excluding at least one undesirable phenomenon (such as short-lasting blocking of the clutch), (B) applying the gradient $\Delta X$ with a hydraulic system wherein the gradient is indicative of a pressure differential $\Delta P$ between two bodies of oil or another suitable hydraulic fluid at opposite sides of the axially movable pressure plate of the clutch in the housing of the torque converter and is arrived at in accordance with the equation $$\Delta \Delta P = C_1 \cdot (\Delta P_{desired} - \Delta P_n)$$

wherein $C_1$ is a proportionality factor, and (C) repeating the steps (A) and (B) until the parameter X matches or at least closely approximates a desired value.

In accordance with the just outlined method, the value of $\Delta \Delta P$ can also be defined as being equal to $C_1 \cdot \Delta P_{desired} - \Delta P_{actual}$). Reference may be had again to the diagram of FIG. 10. In the above equations, $\Delta P$ . . . denotes the change of the pressure differential $\Delta P$ during a next-following interval of time, $\Delta P_{desired}$ denotes the desired pressure differential, $\Delta P_n$ . . . denotes the actual pressure differential at the instant $t_n$, and $C_1$ denotes a proportionality or amplification factor and $0 \leq C_1 \leq 1$.

The amplification factor $C_1$ determines the speed of compensation for (i.e., the speed of the elimination of) differences between $\Delta P_{desired}$ and $\Delta P_n$. The lower limit of $C_1$ is zero and the upper limit of $C_1$ equals one.

No compensation will take place if $C_1=0$ because the pressure increase $\Delta \Delta P$ would equal zero during the next interval of calculation.

$C_1=1$ amounts to an abrupt change of the desired value of $\Delta P$ because the compensation for the entire difference between the desired and starting values (note $\Delta P_{desired}$ and $\Delta P_{start}$ in the diagram of FIG. 10) would have to be completed within a single interval of time. Otherwise stated, the upper and lower limits $C_1=1$ and $C_1=0$ are or can be said to be theoretical values of the proportionality factor. Thus, the important range is that which can be defined as follows: $0<C_1<1$. The selected factor $C_1$ determines the length of the interval which is required to compensate for the differences between the actual value of $\Delta P$ and the desired value of $\Delta P$. The interval of compensation is longer if $C_1$ is smaller and vice versa.

An advantage of the just described compensation for departures of the actual pressure differential from the desired pressure differential is that the calculated value of $\Delta \Delta P$ is large if the departure of the actual pressure differential $\Delta P$ from the desired pressure differential $\Delta P$ is rather pronounced. The value of $\Delta \Delta P$ decreases when the actual pressure differential $\Delta P$ proceeds to come closer to the desired pressure differential $\Delta P$, i.e., one can achieve a "soft-" or gradual merger of the actual pressure differential $\Delta P$ into the desired pressure differential $\Delta P$. This greatly reduces the likelihood of the development of fluctuations of transmitted torque as well as of prolonged existence of fluctuations (if any).

If the prevailing operating conditions are such that one can expect a reduction of the torque being transmitted to the improved apparatus (e.g., in the course of or as a result of a change of the drive ratio of the transmission and/or as a result of transmission of torque to one or more auxiliary aggregates, such as a compressor), potential short-lasting complete engagement (blocking) of the clutch can be prevented by a reduction of the torque being transmitted by the clutch. This can be accomplished by reducing the correction factor $k_{corr}$ and/or the proportionality factor $k_e$ by a predetermined value and by thereupon increasing such factor or factors as a function of time to a value which is most satisfactory to achieve desirable absorption of fluctuations of transmitted torque as well as to achieve maximum economies in fuel consumption.

The just outlined method can be resorted to with particular advantage if a reduction of the torque being transmitted is expected to develop during shifting from a higher to a lower drive ratio of the transmission.

It is also possible to select the factor $k_{corr}$ (i.e., the factor which is to compensate for eventual departures of the characteristics of the selected power train from desired characteristics) by monitoring that slip of the clutch (such as the clutch 62 or 112) which develops within a predetermined quasi stationary range of operation of the torque transmitting apparatus with a time delay which is sufficient to prevent the transmission of fluctuations of transmitted torque; by comparing the monitored slip with a reference value which is selected to ensure (a) optimal insulation of the transmission from fluctuations of torque being transmitted by the clutch and/or by the torque converter, and (b) economical fuel consumption by the prime mover; and by altering the slip of the clutch when the monitored slip departs from the reference value.

As already explained hereinbefore, the improved method can include the step of reducing at least one of the factors $k_e$ and $k_{corr}$ in response to detected indication of intended acceleration of the prime mover (such as by a change by the operator of the position of the throttle control lever of the vehicle), with attendant automatic increase of slip of the bypass clutch and the establishment of additional spare torque which can be transmitted by the torque converter.

The regulating step can include utilizing the slip of the clutch as a primary (i.e., as the most important or more important) factor for the transmission of proper torque from the rotary output element of the prime mover to the input element of the transmission in each and every drive ratio of the transmission (or at least in each forward drive ratio), and utilizing the efficiency of the torque converter as a secondary (i.e., less important) factor for transmission of torque from the prime mover to the transmission. This renders it possible to employ a torque converter having a wide conversion range. The utilization of a torque converter having a wide conversion range renders it possible to greatly increase the spare torque which is available with predetermined (i.e., controlled) increase of the slip of the bypass clutch.

The overall slip of the torque transmitting apparatus can be determined by the slip of the bypass clutch in each drive ratio of the transmission. Again, the efficiency of the transmission of torque by the converter can constitute a secondary factor, i.e., a factor which is less important, to thus ensure the possibility of utilizing a converter having a wide conversion range.

The torque transmitting apparatus which are disclosed in the published German patent application No. 31 30 871, in U.S. Pat. No. 5,029,087 and in U.S. Pat. No. 4,577,737 are designed and operated in such a way that the bypass clutch (which operates in parallel with the torque converter) is fully disengaged (open) in the lower drive ratios of the transmission and is engaged in the higher drive ratios. The torque converters of such conventional apparatus are "hard" in order to achieve an acceptable overall efficiency and to limit the development of heat. This, in turn, causes a pronounced reduction of the magnitude of transmitted torque in response to increasing RPM which results in an undesirably low increase of the transmitted torque within the median RPM range and no increase at all within the higher RPM range.

On the other hand, the improved torque transmitting apparatus can be constructed and operated in such a way that highly effective and readily detectable increases of the transmitted torque can be achieved within the median as well as within the higher RPM range in order to thus provide room for the establishment of substantial spare or reserve acceleration as well as to achieve a substantial reduction of fuel consumption. This can be accomplished, in one embodiment of the improved torque transmitting apparatus, by the provision of means for selecting the pressure differentials between the fluid-containing compartments at the opposite sides of the axially movable piston or pressure plate of the bypass clutch—for all drive or speed ratios of the transmission—as a function of at least one of a plurality of variable parameters. The selecting means comprises means for monitoring the at least one parameter, and the torque converter is selected in such a way that its conversion ratio or factor exceeds 2.5. It is particularly desirable and advantageous if the conversion ratio is between about 2.5 and about 3.5.

Such conversion ratio of not less than 2.5 can be selected in many embodiments of the improved apparatus including those apparatus in which the slip of the clutch is regulated-within each and every drive ratio of the transmission.

If the prime movers of vehicles which employ power trains with torque transmitting apparatus of the present invention constitute certain types of combustion engines, it is often desirable to employ torque converters having relatively small capacity factors i.e., factors which are smaller than those of converters in conventional torque transmitting apparatus receiving torque from the same (certain) types of combustion engines. In other words, if the progress of torque transmission is characteristic of any one of such certain types of combustion engines, the so-called locking or fixed RPM of the converter in the improved torque transmitting apparatus is higher than such locking RPM of the converters which are utilized in conventional torque transmitting apparatus. The locking or fixed RPM of a torque converter is that rotational speed at which a curve denoting the torque being transmitted to the converter intersects or crosses the characteristic curve of the torque being transmitted by the combustion engine. Such locking RPM can be ascertained by blocking the turbine of the torque converter while the pump of the converter continues to be driven by the housing of the turbine, i.e., by the output element (such as a camshaft, a crankshaft or a flywheel) of the combustion engine. In heretofore known types of torque converters in apparatus for the transmission of torque from the engine to the transmission of a motor vehicle, the locking RPM of the converter is between about 1800 and about 3000. In torque converters which can be utilized in the apparatus of the present invention, the locking RPM can be above (including well above) 3000. The converter is "softer" if the capacity factor is lower. A "soft" or "softer" converter ensures that the slope of the curves denoting the pump torque and the turbine torque as a function of the turbine RPM and pump RPM, respectively, is less pronounced than the curves denoting such relationships in torque transmitting apparatus utilizing conventional torque converters. In other words, the curves denoting the relationships in the improved torque converters are flatter than those denoting the same relationships in standard converters.

The secondary characteristic field of a "soft" torque converter which can be utilized in the apparatus of the present invention is or can be wider or even much wider than the secondary characteristics fields of conventional torque converters. This results in the establishment of room for higher reserves of spare acceleration, namely acceleration which can be resorted to with particular advantage while the vehicle is about to overtake or is in the process of overtaking another vehicle and/or during any other acceleration phase of the vehicle. Moreover, it is often not even necessary to shift into a lower drive ratio.

In most instances, the additionally available or utilizable range of the secondary field of the improved torque converter is put to use under unstable or non-stationary circumstances. The quantity of heat which develops during the respective time interval is not higher than in conventional torque converters, i.e., it is not critical. Nevertheless, a further embodiment of the invention contemplates the utilization of a central computer unit which comprises means for totalizing the heat developing when the vehicle is in motion and the thus obtained signal is compared with signal(s) denoting the maximum heat which is permissible for the particular power train(s). Furthermore, the computer unit can include or can be combined with means for monitoring the temperature of hydraulic fluid (such as oil) in the housing of the torque converter and/or elsewhere in the hydraulic circuit of the apparatus in order to facilitate the generation of signals which ensure that the calculations carried out by the computer unit can proceed from the actual (prevailing) temperature level.

The above undertakings render it possible to detect, in good time, the generation of unexpectedly and undesirably high temperatures and, hence, to carry out the necessary remedial steps immediately after the undesirably high temperatures develop. This can be carried out in such a way that the slip of the bypass clutch is reduced in immediate or rapid response to the development of undesirably high or excessive thermal stressing of the torque transmitting apparatus, and the magnitude of the slip is changed in a direction and to the extent deemed necessary by the operator of the vehicle. If the operator wishes to initiate an acceleration of the vehicle while continuing to rely on the converter as a means for transmitting some of the torque supplied by the output element of the engine, the torque being supplied by the clutch is reduced, i.e., the slip of the clutch is increased. Under certain other circumstances, the operator can decide to increase the torque which is being transmitted by the clutch, i.e., to reduce the slip between the friction face of or on the piston of the clutch and the friction face of or on the adjacent portion of the housing of the torque converter.

If the apparatus employs a torsional damper between the piston of the bypass clutch and the turbine of the torque converter, the damper is or can be constructed and installed in such a way that it can be effective during that stage or those stages of operation of the apparatus when the transmission of torque takes place from the housing to the turbine of the torque converter solely by way of the clutch and/or by way of the damper, i.e., not from the pump to the turbine of the torque converter. As explained before, this permits the establishment of much more satisfactory damping of fluctuations of torque than in apparatus using conventional dampers which are designed to furnish a damping action during transmission of maximum torques. The improved damper cooperates with the clutch in such a way that the clutch operates with at least some slip when the transmission of torque is to take place by the damper jointly with the slip clutch or only by the slip clutch.

The improved damper serves to reduce or filter, at least to an acceptable value, those fluctuations and/or other irregularities of torque which is being transmitted by way of the clutch (the damper operates between the piston of the clutch and the turbine of the converter, i.e., between the clutch and the input element of the driven unit). The capacity of torque which can be transmitted by the damper is preferably selected in such a way that such capacity at most matches (i.e., it does not exceed) the nominal torque transmittable by the output element of the prime mover, namely the maximum torque transmittable by such prime mover. Otherwise stated, and in contrast to heretofore known proposals, the improved damper is not designed to transmit the maximum torque which can be transmitted by the output element of the prime mover. When the transmission of maximum torque by the damper is reached, the clutch and/or the damper acts not unlike a rigid body (as seen in the direction of transmission of torque from the output element of the prime mover to the input element of the transmission and/or another driven unit). Due to the feature that the damper is not set up to transmit the nominal engine output torque, the improved torque transmitting apparatus can employ a simple, compact and inexpensive damper. Moreover, the energy storing elements of the damper (such as the coil-springs 137 in the apparatus 110 shown in FIGS. 31 to 33) need not be designed and dimensioned to transmit pronounced torques, i.e., the damper can employ small, simple, compact and inexpensive energy storing elements which also contributes to compactness and lower cost of the damper and of the entire torque transmitting apparatus. Still further, the weight of the improved damper is less than that of dampers in conventional apparatus. As already described with reference to FIGS. 11a and 31 to 33, the strength and hence the dimensions and space requirements of the energy storing elements, of the damper and of the entire improved torque transmitting apparatus can be reduced still further without affecting the useful life and/or the reliability of the damper by providing the damper with means which can prevent full compression (or other maximum deformation) of the selected energy storing elements. Reference may be had again to the pockets 145 and the extensions 148 which are shown in FIGS. 32 and 33.

It is also possible to select the construction and the mode of operation of the damper and of the entire torque transmitting apparatus in such a way that at least some of the torque is being transmitted by the slip clutch (with or without transmission of torque by way of the damper) in all forward drive ratios or speed ratios or gears of the transmission, at least during certain parts of intervals of the respective settings of the transmission.

The maximum torque which is transmittable by the damper is or can be between about 10% and about 60% of the maximum or nominal torque of the engine, particularly between about 25% and about 50%. However, it is equally possible (under certain operating conditions) to select a damper which can operate within a different range having an even lower limit (below about 10%) and/or an upper limit of about 60% of the nominal torque.

The damper in the present invention need not employ any friction generating means or any special friction generating means. Otherwise stated, the damper can be designed in such a way that it comprises an input member driven by the piston of the clutch, an output member for transmission of torque to the turbine of the torque converter, and one or more springs (energy storing elements) operating between the input and output members to oppose rotation of the input member relative to the output member in a direction to rotate the turbine. There is no need to establish a direct or indirect frictional engagement between the input member and the output member, between the input member and the energy storing element(s) and/or between the energy storing, element(s) and the output member.

It has been found that the just discussed damper which is designed to preferably transmit between about 10% and about 60% of nominal torque of the engine is capable of ensuring highly satisfactory damping of fluctuations of the torque being transmitted from the piston of the clutch to the turbine of the torque converter, i.e., to the input element of the transmission.

The extent to which the input and output members of the improved damper are turnable relative to each other is or can be between about ±2° and about ±8°, preferably between about ±3° and about ±6°. Otherwise stated, the maximum angular displacement of the input and output members of the damper in both directions is preferably between about 4° and about 16°, most preferably between about 6° and 12°. Such relatively small extent of angular displaceability of the input and output members relative to each other can ensure that, during changes of load (particularly during shifting from operation of the vehicle with pull to coasting or vice versa), the swinging of the damper remains within an acceptable range to thus prevent or at least greatly reduce the likelihood of rocking of the power train. In accordance with a further feature of the invention, such rocking (or at least those stages of rocking which would involve the transmission of torque greater than that transmittable by the damper) is damped or filtered as a result of slip of the clutch so that the undesirable portions of rocking of the power train cannot be transmitted to the input element of the transmission.

In many or most instances, the rigidity of the damper is or can be between about 7 Nm/° and about 30 Nm/°, preferably between about 8 Nm/° and about 15 Nm/°. However, the utilization of the damper under certain specific circumstances might render it advisable or necessary to reduce the lower limit of rigidity of the damper below about 7 Nm/° and/or to raise the upper limit to above about 30 Nm/°. For example, the rigidity can be between about 30 Nm/° and about 90 Nm/°, preferably between about 40 Nm/° and about 70 Nm/°. As a rule, the rigidity range can be relatively low or at least the lower limit of the rigidity can be relatively low if the vehicle employs a relatively weak prime mover. On the other hand, the rigidity range or at least the upper limit of such range can be higher or much higher if the vehicle is heavy and/or is called upon to pull one or more loads in addition to its own weight and, therefore, embodies a larger and more powerful engine.

If the method and apparatus of the invention are utilized to regulate the transmission of torque from a prime mover to a transmission having a plurality of speed or drive ratios and being shiftable into a plurality of forward ratios, the slip of the clutch is or can be selected—for at least two forward drive ratios—as a function of at least one of two variable parameters including the energy requirements and the output of the torque transmitting apparatus which employs the clutch in combination with a torque converter. It is preferred to make such selection for each forward-drive ratio of the transmission or at least for each forward drive ratio. However, the novel method and apparatus are also susceptible of use for the transmission of torque to transmissions having a plurality of forward drive ratios in such a way that the clutch is fully disengaged when the transmission is shifted into the first drive ratio and/or into the second drive ratio.

Still further, the method and apparatus of the present invention can be utilized to regulate the operation of a driving unit wherein a rotary output element of a combustion engine transmits torque to a hydrokinetic torque converter and to a slip clutch. The method can comprise the step of selecting the slip of the clutch in a plurality of stages (such as two stages) including a first stage while the output element transmits between about 10% and about 60% of a maximum torque capable of being transmitted by the engine and a second stage while the output element of the engine transmits torque exceeding the torque being transmitted during the first stage. The maximum torque which can be transmitted by the slip clutch during the first stage is or can be between about at least 1 and 1.2 times the torque being transmitted by the output element of the engine. The maximum torque which is transmitted by the clutch during the first stage can at least match (and can at least slightly exceed) the torque being transmitted by the engine. The first stage can involve the transmission of between about 15% and about 50% of the maximum torque which can be transmitted by the engine.

At least one of the factors $k_e = k_{me}$ (i.e., the factor pertaining to the proportioning of torques being transmitted by the clutch and by the converter), $k_{corr}$ (which serves to compensate for multiplicative errors) $M_{pm\ corr}$ (to compensate for errors other than unsatisfactory engine torque), and $M_{corr\ wu}$ (correction torque serving to compensate for unsatisfactory turbine torque) can be emphasized or relied upon to a first extent during the aforementioned first stage of selection of the slip of the bypass clutch and to a different second extent during the aforementioned second stage of selection of the slip of the bypass clutch. Otherwise stated, the value of at least one of the enumerated four factors (for example and preferably the $k_{e=me}$ factor) and hence the influence of such value of the at least one factor upon the torque which can be transmitted by the clutch is different within the first and second stages of selecting the slip of the bypass clutch.

If the maximum torque which can be transmitted by the clutch during the aforementioned first stage of selection of such slip matches or at least closely or very closely approximates the maximum torque transmittable by the torsional damper of the torque transmitting apparatus, the small- or smaller-amplitude fluctuations of torque are absorbed or weakened or filtered by the torsional damper. On the other hand, any larger-amplitude fluctuations (such as those peaks of torque transmission exceeding that transmittable by the damper) are damped or filtered or at least weakened as a result of slip of the bypass clutch.

The magnitude of torque being transmitted by the clutch within the first stage of selection of the slip can be such (at least under certain circumstances) that the torque being transmitted by the clutch exceeds the momentary or then prevailing torque being transmitted by the engine, at least substantially and at least within the major part of (preferably within the entire) first stage. The magnitude of the torque being transmitted by the engine depends, at least to a considerable degree, upon the quantity of fuel being supplied by the engine. The torque which the clutch can transmit during the first stage can be selected with a view to ensure that it varies (at least within-a major part of the first stage) at least substantially synchronously with variations of the torque which is being transmitted by the engine (during the first stage). In other words, the magnitude of the torque which can be transmitted by the clutch during the first stage then decreases in response to a reduction of the magnitude of torque being then transmitted by the output element of the engine but the magnitude of the torque being transmitted by the clutch exceeds the magnitude of torque being simultaneously transmitted by the engine. If the engine torque increases, the magnitude of the clutch torque also increases. As mentioned above, the magnitude of the torque being transmitted by the clutch during the first stage is or can be between 1 and 1.2 times the magnitude of the then prevailing torque being transmitted by the engine.

If the magnitude of the torque being transmitted by the clutch during the first stage is constant or nearly constant, it is preferably maintained within the range of between about 25% and about 60%, most preferably between about 30% and 50%, of the maximum engine torque. It is presently preferred to ensure that the magnitude of the torque being transmitted by the clutch during the first stage matches or at least approximates the maximum torque which can be transmitted by the damper; for example, the magnitude of the clutch torque can be between about 1.05 times and about 1.2 times the maximum torque adapted to be transmitted by the damper.

Still further, it is possible to regulate the transmission of torque by the clutch during the first stage in such a way that the clutch torque is at least substantially constant during a first portion of the first stage, preferably a portion which immediately follows the operation of the engine with idling RPM, and that the magnitude of the torque during the following second portion of the first stage varies as a function of variations of the torque being simultaneously transmitted by the output element of the engine. Thus, if the output torque of the engine increases during the second portion of the first stage, the magnitude of the torque which the clutch can transmit also increases. Analogously, the torque which the clutch can transmit during the second portion of the first stage decreases if the magnitude of the torque being then transmitted by the engine also decreases. It is presently preferred to ensure that the magnitude of the torque being transmitted by the clutch during the second portion of the first stage at least matches but preferably somewhat (e.g., slightly) exceeds the then transmitted torque from the output element of the engine.

Accurate regulation of the torque being transmitted by the clutch during the first stage can be achieved in a particularly advantageous manner if the magnitude of the clutch torque during the first stage does not decrease below about 1% of the nominal-engine torque and preferably exceeds 1% of such nominal torque. This establishes a desirable minimum fluid pressure for the clutch, namely a minimum pressure which suffices to ensure reliable and predictable adjustments of presently known and/or available valves for regulation of the pressure differential between the bodies of hydraulic fluid at the opposite sides of the axially movable piston or pressure plate of the bypass clutch. Moreover, adherence to a pressure not less than the aforementioned minimum pressure renders it possible to maintain such minimum pressure within a relatively narrow range.

In many or most instances, the first stage can cover the range between the idling RPM of the engine and a maximum RPM of not more than 3000 revolutions per minute, preferably not more than between about 2000 and 2500 revolutions. However, here again, certain operating conditions can render it necessary or advisable to increase the upper limit of the above range above 3000 RPM or to lower it below 2000 RPM.

In accordance with still another feature of the invention, the magnitude of the torque being transmitted by the clutch within the entire operating range of the engine can be regulated in such a way that the damping of fluctuations of torque is effected exclusively (or practically exclusively) by the damper during a first or lower stage of the operating range of the engine, and that such damping is effected (exclusively or practically exclusively) by the clutch during the next following higher or second stage of operation of the engine. The damper may be utilized during the higher second stage in addition to (i.e., to assist the torque transmitting action of) the bypass clutch during one or more parts of the higher second stage. Thus, the energy storing element or elements of the damper do or can undergo repeated changes of compression which is desirable and advantageous for the reproducibility of the operation and for longer useful life of the damper. However, if the timing of transmission of torque by the clutch and the damper is selected in the above outlined manner, the damper plays a secondary role during the second stage of operation of the engine.

Since the just described mode of regulating the magnitude of the slip of the bypass clutch involves the reliance upon the damper during the first stage of the range of operation of the engine (either exclusively or more or much more than upon the clutch), the damper is preferably designed and mounted to ensure the establishment of a highly satisfactory or optimal damping action during the first stage. As already mentioned above, this can be accomplished by selecting the maximum torque being transmittable by the damper with a view to ensure that it is within a range of between about 10% and about 60% (preferably between about 15% and about 50%) of the maximum output torque of the engine. However, it is also within the purview of the invention to select the construction, installation and mode of operation of the damper in such a way that its input member can turn relative to the output member through a first angle (e.g., up to 5° as described with reference to and as shown in the diagram of FIG. 34) during the first stage of the operating range of the engine (namely when the maximum torque which the damper can transmit is between about 10% and about 60% of maximum engine torque). The input member is capable of thereupon turning relative to the output member through a preferably or normally smaller second angle (such as the angle of about 2° shown in FIG. 34) during which the spring gradient of the energy storing element(s) is several times the spring gradient during angular movement of the input member through the first angle. Such construction of the damper reduces the likelihood of abrupt termination of angular movement of the first input member relative to the second input member upon completion of the first stage of the operating range of the engine. Therefore, the damper is less likely to be damaged and the compression of the energy storing element(s) upon completion of the first stage can be below (e.g., even considerably below) the maximum compression. This not only reduces the likelihood of the generation of detectable noise upon completion of the first stage of operation of the engine but also reduces the likelihood of damage or premature damage to the energy storing element(s) and/or other components of the damper.

A presently preferred first angle of turning of the input member relative to the output member of the damper in a direction to stress the energy storing element(s) is between about 1° and about 5°, more preferably between about 1° and about 2°. Still more preferably, such first angle is or can be between about 1° and 2.5°. Furthermore, the stiffness of the energy storing element(s) during turning of the input member relative to the output member through the second angle is preferably between about 4 and 10 times the stiffness during angular movement of the input member through the first angle. A presently preferred ratio of stiffnesses is between about 2 times and about 5 times. In each instance, the maximum torque which can be transmitted by the damper is smaller than the maximum engine torque.

The magnitude of that angle during which the energy storing element(s) of the damper can oppose angular movements of the input and output members relative to each other is or can be within the range of between about 0.5° and 3°, particularly between about 1° and about 2°.

It is further within the purview of the invention to select the spring or springs and/or other energy storing means of the damper in such a way that each energy storing element is effective only when the engine is in the process of pulling a load.

The aforediscussed dampers render it possible to eliminate or to at least weaken the undesirable influence of one or more problems which develop in actual use of conventional torque transmitting apparatus. One of the problems which can be eliminated or whose adverse effect(s) can be at least weakened is the aforediscussed acoustic problem, particularly the generation of booming noise. Such noise is particularly likely to develop when the damper is called upon to transmit relatively small torques, i.e., when the major percentage of torque is being transmitted by the clutch. The reason is that, in the improved apparatus, the damper can operate when the clutch is fully engaged (blocking) because repeated full engagement and partial engagement of the clutch are believed to be the main cause or the sole cause of booming and/or similar noises.

In accordance with still another proposal, the torque which can be transmitted by the clutch at least within the first stage of the operating range of the engine can be reduced in response to the development of certain circumstances such as high-amplitude fluctuations of torque in the power train (e.g., in response to the development of resonance), abrupt shifting of the load (e.g., during changeover from the operation with pull to coasting of the vehicle or vice versa) and/or certain others. This results in a more pronounced slip of the clutch. For example, if the condition of the vehicle is shifted from the pulling of a load to coasting, the ability of the clutch to transmit torque can be reduced to zero or close to zero. It is also possible to reduce the torque transmitting capacity of the clutch during the next-following (second, third, etc.) stage or stages of operation of the engine.

The torque transmitting apparatus can be designed, assembled and operated in such a way that at least the major part of that characteristic field of the combustion engine which is utilized within the main or primary operating range belongs to the first stage of the overall range of operation of the engine. The main or primary range preferably embraces those regions of the characteristic field of the engine which are relevant for the aforementioned FTP75 cycle and/or for the aforementioned ECE cycle (city roads, country roads and interstate roads (city, 90 km per hour, 120 km per hour)). Such design of the torque transmitting apparatus ensures that the damper constitutes the exclusive or at least the primary means for damping fluctuations of transmitted torque within the main operating range of the engine, i.e., the torque converter is bypassed which, in turn, contributes to operation with substantial savings in fuel and energy. The just outlined construction, mode of operation and advantages cannot be achieved with conventional torque transmitting apparatus because the bypass clutches of the conventional apparatus then operate with slip. In other words, the clutch in a conventional apparatus operates with slip within the first RPM range. Reference may be had the preceding descriptions of the construction and modes of operation of conventional apparatus. The just described aspect of the present invention is attributable to applicants' discovery that the damper as well as the clutch of the improved apparatus should be designed to absorb fluctuations of transmitted torque within the main or primary operating range of the vehicle. In other words, highly satisfactory absorption of such fluctuations (by the clutch and/or by the damper) takes place within that range or within those ranges of operation which are most likely to most frequently develop (and which actually develop most frequently) when the vehicle embodying the torque transmitting-apparatus is in actual use. An additional advantage of the just outlined improvement is that the fluctuation suppressing or filtering or damping action is necessarily more satisfactory when the clutch as well as the damper is designed to operate (primarily or exclusively) only within a certain part of the full operating range of the vehicle (the operation of the damper and of the clutch within the full operating range is suggested in certain prior publications). Still further, the improved apparatus can employ a simpler, more effective and more compact torque converter because such torque converter is called upon to absorb fluctuations of transmitted torque only within certain (namely other than main or primary) operating ranges of the vehicle.

The torque which is to be transmitted by the converter of the improved apparatus within the second (other than main or primary) operating range or ranges can be selected in such a way that it amounts to between about 0.6 and about 1 times the then prevailing engine torque (preferably between about 0.8 times and about 0.9 times). It has been found to be desirable and advantageous if the torque which can be transmitted by the converter within the second RPM range is invariably or practically invariably less than the then prevailing engine torque. This can ensure that the clutch invariably operates with some slip within the second operating range so that the clutch can absorb or intercept or damp the then developing fluctuations of RPM which, in the absence of any undertaking to the contrary, are apt to cause the development of torsional vibrations.

If the improved apparatus is put to use in so-called uncritical or non-critical vehicles (including, among others, those which do not develop pronounced irregularities in the transmission of torque within the second RPM and operating ranges), the bypass clutch can be practically engaged (closed) so that the torque which the clutch can transmit at least matches (but can at least slightly exceed) the then prevailing output torque of the engine. For example, the clutch torque can be (and preferably is) between about 1 and 1.2 times the then prevailing engine torque.

The preceding passages of this specification refer primarily to two operating ranges, namely to ranges following the range when the output element of the engine is driven at the idling RPM. However, it is equally within the purview of the invention to divide the range above the idling RPM into more than two ranges. For example, it is often desirable and advantageous to provide a third or uppermost range. The torque converter is preferably bypassed, in its entirety, within the third operating range. Thus, the third operating range covers a series of rotational speeds exceeding those within the second range, and the lower threshold limit of the third range is selected in such a way that the engine cannot generate any undesirable disturbances or impulses which would necessitate damping or filtering by the clutch.

In accordance with still another embodiment of the invention, a torque transmitting apparatus which is driven by a combustion engine can be equipped with an instrument or implement or unit or device which can detect, at least during acceleration of the engine, whether or not the disengagement of the bypass clutch (while the drive ratio or the torque transmitting action of the transmission remains unchanged) would result in a higher pulling force as a result of torque conversion. If such is the case, the bypass clutch is disengaged and the condition of the transmission is left unchanged. Otherwise, the transmission is shifted at least into the immediately lower drive ratio or gear and the clutch can be disengaged, at least in part, to thus develop a more pronounced slip. The aforementioned instrument, implement, unit or device can constitute an electronic computer or processor having inputs for reception (from suitable sensors or monitoring devices) of signals denoting the values of relevant parameters. In lieu of resorting to sensors or monitoring devices, relevant information can be stored in the memory of the electronic computer or processor in the form of maps, characteristic fields and/or others. For example, the memory of the electronic computer or processor can store information denoting the characteristic field of the engine, of the torque converter and/or of the bypass clutch. Still further, the operating condition of the engine can be ascertained by monitoring its RPM, the inclination of the flap of the throttle (i.e., the quantity of fuel being supplied to the engine), the subatmospheric pressure in the suction pipe and, if necessary, the duration of fuel injection.

The method and apparatus of the present invention can be utilized for transmission of torque to many kinds of transmissions including automatic transmissions. An automatic transmission which receives torque from the torque converter of the improved apparatus (such as from the turbine which, in turn, can receive torque from the pump of the converter and/or from the piston of the clutch, either directly or by way of one or more dampers) can be a multi-step transmission, a continuously variable transmission, an infinitely variable change speed gear, an infinitely variable transmission including sheaves and one or more endless flexible elements trained over the sheaves (reference may be had again to the commonly owned U.S. Pat. No. 5,169,365 granted Dec. 8, 1992 to Oswald Friedmann for "Power Train"), or a transmission which is shiftable into a finite or infinite number of drive ratios.

One of the aforediscussed advantages of the improved method and apparatus resides in that, once the engine RPM exceeds a given value or the speed of the vehicle rises above a given value, it is possible to completely bypass the torque converter. The reason is that, once the engine exceeds the given RPM or the vehicle exceeds the given speed, the driving unit becomes sufficiently rigid to be at least substantially insensitive to eventually developing torsional vibrations. Thus, once the aforementioned given engine RPM or vehicle speed is exceeded, the bypass torque of the clutch can be caused to assume a value which approximates or exceeds the engine torque.

The novel design of the torsional damper, in conjunction with the regulating strategy for the torque adapted to be transmitted by the clutch, can at least reduce the fluctuations of torque which are likely to cause the development of booming and/or other noises and which develop at the friction faces of the clutch within the partial load range of the engine and are attributable to recurrent alternating slippage of the friction faces relative to each other and their adherence to one another. Moreover, no fluctuations which are likely to generate chatter are likely to develop within the partial load range because the clutch is then set to transmit relatively small torques. The "softness" of the utilized damper must be selected to conform to the torque transmitting apparatus, i.e., to the vehicle. If the damper exhibits a resonance range which is traversed or which becomes effective when the vehicle is in use, the clutch should or can be caused to develop a certain amount of slip and to thus prevent the development of booming, rattling and/or other noises.

In order to limit shifting of the load within the first stage of the operating range of the engine, the damper is designed to permit relatively small angular displacements of its input and output members relative to each other and the clutch is regulated to transmit torque which is relatively small in comparison with the maximum torque of the engine. As already mentioned above, the clutch can be regulated in such a way that, at least within the first stage of the operating range of the engine, the ability of the clutch to transmit torque only slightly exceeds the then prevailing engine torque. The just outlined mode of operation and regulation greatly reduces and can totally eliminate the likelihood of fluctuation (as a result of shifting of the load) of the torque being transmitted by the power train. Within the second RPM range (which corresponds to a higher load upon the engine), the torque of the clutch is smaller than the then prevailing engine torque, i.e., the clutch then operates with slip. Such slip also reduces the likelihood of the generation of noise, at least within certain ranges of transmitted torques, particularly in combination with the torsional damper because the latter takes up fluctuations of transmitted torque during the recurrent intervals of short-lasting blocking (full engagement) of the clutch. In the absence of any remedial action (such as the filtering or absorbing action of the damper), repeated short-lasting full engagement of the clutch would be likely to cause acoustical problems.

As a rule, it is preferred to put the bypass clutch to use only when such utilization is desirable or warranted for the purposes of saving energy. This holds true for the entire operational range of the prime mover, especially if the prime mover is a combustion engine. The reason is that it is often more satisfactory to operate without any slip of the clutch, i.e., in lieu of partial or full engagement of the clutch. Moreover, it is often desirable to disengage the clutch in response to a signal denoting the desire of the operator to accelerate the vehicle; such disengagement of the clutch renders it possible to resort to torque conversion.

As also mentioned hereinbefore, the improved torque transmitting apparatus and/or the novel method of regulating the operation of the bypass clutch can be put to use, often with particular advantage, in conjunction with a relatively "soft" torque converter. The utilization of a "soft" converter renders it possible to improve the acceleration of the vehicle because such converter furnishes a greater conversion and renders it possible to resort to a wider conversion range. Moreover, the "soft" converter can be put to use in lieu of conventional "hard" converters to thus furnish a much more satisfactory efficiency within wide ranges of conversion which, in turn, renders it possible to reduce operational losses and to thus achieve savings in fuel consumption and a reduction of the temperature of hydraulic fluid. The lower-efficiency range of the "soft" converter is bypassed (i.e., the utilization of such range can be avoided) by the expedient of engaging the clutch to an extent such that it operates with a certain amount of slip but can transmit torque which exhibits a certain relationship to the engine torque but is also selected with a view to ensure that the slip is not eliminated in its entirety, at least within the aforementioned low-efficiency range of the operation of a "soft" converter. Such regulations of the operation of the converter and of the bypass clutch therefor render it possible to ensure that the vehicle can be operated with a higher degree of efficiency and with reduced losses. Since the improved method and apparatus further permit bypassing within each drive or speed range or selected gear of the transmission, the fuel consumption of the vehicle (which evidently employs a torque converter) does not or need not exceed that of a vehicle employing a conventional power train without a converter for transmission of torque to the input element of a change-speed or any other suitable transmission.

The above undertakings render it possible to employ a highly compact torque converter the efficiency of which is of secondary importance in view of the construction and the novel mode of utilization of the bypass clutch therefor.

All or at least numerous ones of the aforediscussed embodiments of the improved method can be put to use by resorting to a torque transmitting apparatus wherein the axially movable piston of the bypass clutch has a frustoconical radially outer portion which is provided with a friction face or carries a conical friction lining provided with a friction face. The radially inner portion of such piston can be provided with the aforementioned and fully illustrated hub which is telescoped into or telescopically receives a second hub (such as the hub of the turbine forming part of the torque converter or the hub forming part of the input element of the transmission). If the just described apparatus employs a damper between the piston of the clutch and the turbine of the converter, the input member of the damper receives torque from the piston, the output member of the damper transmits torque to the turbine, and the energy storing element or elements of the damper preferably forms or form at least one annular body properly engaged by the input member and properly engaging the output member for transmission (when necessary) of torque from the piston to the turbine.

The provision of space for installation of the damper at the same radial distance from the axis as the friction faces of the clutch (or at least close to such radial distance) renders it possible to employ an energy storing element or a set of energy storing elements capable of permitting extensive angular movements of the input and output members elative to each other.

If the radially outer portion of the piston diverges outwardly and in a direction toward the radially outer portion of the turbine, such radially outer portion occupies a readily available part of the internal chamber of the housing of the torque converter. Thus, such piston does not contribute to the space requirements of the converter housing as seen in the direction of the common axis of the converter and the bypass clutch. The just discussed design of the damper (such as the damper 63 of FIG. 11a) renders it possible to assemble the torque transmitting apparatus in a simple and time saving manner.

Irrespective of whether the radially outer portion of the piston is a hollow cone which diverges axially toward or away from the turbine, it is capable of resisting pronounced deforming stresses and shield the friction lining(s) from such stresses.

As already described before, the input member of the damper can be welded, riveted and/or otherwise affixed to the adjacent (radially inner or radially outer or median) portion of the piston of the bypass clutch, and the output member can be affixed to the turbine in a similar fashion and/or in any other suitable way.

The invention is susceptible of numerous additional modifications. For example, the steps of various embodiments of the improved method can be combined in a number of ways, some of these steps can be omitted, and some of these steps can be altered without departing from the spirit of the invention. The same holds true for the components the several described and illustrated embodiments of the improved torque transmitting apparatus as well as for the prime movers which are selected to apply input torque and for the transmissions and/or other driven units which receive torque from the turbine of the torque converter, either by way of the pump or by way of the bypass clutch or by way of the damper.

Additional inventions are believed to reside in numerous combinations of less than all of the steps of one or more disclosed embodiments of the improved method as well as in numerous combinations of certain selected components of the improved apparatus.

Further inventions are believed to reside in numerous combinations of the steps of the improved method with the steps of methods disclosed in the aforeenumerated commonly owned copending patent applications as well as in numerous combinations of components forming part of the apparatus disclosed in the present application with components forming part of apparatus disclosed in the aforementioned commonly owned copending patent applications.

Numerous other inventions (for which protection is sought in the present application as well as in divisions, continuations, continuations-in-part, reissues and/or reexaminations, if any) are believed to reside in combinations of certain steps forming part of the improved method with one or more steps of conventional methods as well as in combinations of components forming part of the improved apparatus with components forming part of conventional apparatus.

Last but not least, applicants reserve the right to present numerous additional method and/or apparatus claims for inventions already covered, at least in part, by the appended claims, as well as to present product-by-process claims, product claims and/or other types of claims which are or which will be deemed necessary for achievement of adequate protection for all aspects of the improved method and apparatus as well as all reasonable equivalents thereof.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A method of operating a torque transmitting apparatus which receives torque from a rotary output element of a prime mover and transmits torque to a rotary input element of an automatic transmission in a power train of a vehicle, wherein the torque transmitting apparatus comprises a hydrokinetic torque converter and a slip clutch arranged in parallel to transmit torque between the output and input elements and wherein the amount of torque being transmitted by the clutch is controlled by a computerized regulating unit, the method comprising the steps of:

regulating the amount of torque to be transmitted by the clutch as a function of the magnitude of torque being transmitted by the output element of the prime mover;

calculating what amount of force will have to be applied to the clutch, so that the clutch will transmit said predetermined amount of torque, wherein the amount of torque is determined and the amount of force is calculated so that the clutch operates with a desired minimum amount of slip, and carrying out a compensation for long-term departures of the torque actually transmitted by the clutch from the predetermined torque.

2. The method of claim 1, wherein the amount of torque to be transmitted by the clutch as a function of the torque $M_{pm}$ being generated at the output element of the prime mover is calculated by the regulating unit in accordance with the equation $$M_{clutch} = k_{me} \cdot k_{corr} \cdot (M_{pm} + M_{corr\ pm}) + M_{corr\ wu}, \text{ wherein}$$

$M_{clutch}$ is the torque to be transmitted by the clutch, $k_{me}$ is a torque dividing factor for apportioning respective amounts of torque being transmitted by the slip clutch and the hydrokinetic torque converter, $k_{corr}$ is a correction factor that is determined based on a current operating point of the power train, $M_{corr\ pm}$ is a correction torque to compensate for additive errors of $M_{pm}$, and $M_{corr\ wu}$ is a correction torque compensating for additive errors of the clutch torque $M_{clutch}$;

wherein said desired minimum amount of slip occurs automatically as a function of said torque dividing factor $k_{me}$, and long-term departures of actual from theoretical values for $M_{pm}$ and $M_{clutch}$ are compensated by the correction factor $k_{corr}$ and correction torques $M_{corr\ pm}$ and $M_{corr\ wu}$.

3. The method of claim 2, wherein the torque dividing factor $k_{me}$ is a function of the RPM of the rotary output element.

4. The method of claim 2, wherein the torque dividing factor $k_{me}$ is a function exclusively of the RPM of the rotary output element.

5. The method of claim 2, wherein the torque dividing factor $k_{me}$ is a function of the RPM and of the torque being transmitted by the rotary output element.

6. The method of claim 2, wherein the torque dividing factor $k_{me}$ is a function of the RPM and torque being transmitted by the prime mover.

7. The method of claim 2, wherein the torque-apportioning factor $k_{me}$ is a preselected substantially constant factor.

8. The method of claim 1, wherein the magnitude of the torque being transmitted by the clutch is variable by a pressure differential between two bodies of a hydraulic fluid one of which is confined in a first compartment between a housing of the torque converter and the clutch and the other of which is confined in a second compartment between the housing and the clutch.

9. The method of claim 1, wherein the prime mover is a combustion engine and the operating condition of the power train is a function of at least one of a plurality of variable parameters including (a) the RPM of the rotary output element and the position of a throttle control lever of the vehicle, (b) the RPM of the rotary output element and the rate of admission of fuel to the engine, (c) the RPM of the rotary output element and the subatmospheric pressure in a suction pipe of the engine, and (d) the RPM of the rotary output element and the duration of fuel injection into the engine.

10. The method of claim 1, wherein a variable parameter affecting the division of torque into a first torque being transmitted by the torque converter and a second torque being transmitted by the clutch is changed from a current value to a new value with a time delay.

11. The method of claim 10, wherein the variable parameter is a pressure differential between two bodies of fluid in the torque converter at opposite sides of a pressure plate of the clutch.

12. The method of claim 10, wherein the variable parameter is variable as a function of a difference between the RPM of the rotary output element and the RPM of the rotary input element.

13. The method of claim 10, wherein the variable parameter is variable as a function of a gradient of the RPM of the rotary output element.

14. The method of claim 10, wherein the variable parameter is a pressure differential between two bodies of hydraulic fluid in the torque converter at opposite sides of a pressure plate of the clutch, the pressure differential being variable by one of (a) a PI regulator and (b) a PID regulator.

15. The method of claim 14, wherein the variation of the pressure differential by the one regulator cannot be unequivocally defined by an analytical technique.

16. The method of claim 1, wherein the magnitude of torque being transmitted by the clutch is variable by a pressure differential between two bodies of hydraulic fluid confined in a housing of the torque converter at opposite sides of a pressure plate of the clutch and the pressure differential is variable as a result of scanning a characteristic curve and utilizing the thus obtained signals to determine differences between actual and desired pressure differentials, said regulating step further comprising eliminating said differences by establishing an integrating feedback loop, the variation of pressure differential not being unequivocally definable by an analytical technique.

17. The method of claim 16, wherein the signals are generated as a result of variable flow of fluid between the two bodies of fluid through an adjustable valve.

18. The method of claim 1, wherein the magnitude of torque being transmitted by the clutch is variable by a pressure differential between two bodies of hydraulic fluid confined in the torque converter at opposite sides of a pressure plate of the clutch and the pressure differential is variable by one of (a) a PI regulator, (b) an I regulator and (c) a PID regulator.

19. The method of claim 18, wherein signals are generated as a result of variable flow of hydraulic fluid between the two bodies of fluid as a function of one of (a) a duty factor and (b) a fluid flow through an adjustable valve, the variation of pressure differential being unequivocally definable by a non-analytical technique.

20. The method of claim 1, wherein the step of carrying out compensation includes monitoring the actual torques being transmitted by the clutch and comparing the monitored actual torques with reference values.

21. The method of claim 1, wherein the step of carrying out compensation includes computing the torque being transmitted by the torque converter on the basis of the characteristics of the torque converter and determining the actual ratio of torques being transmitted by the torque converter and the clutch.

22. The method of claim 1, wherein the amount of torque to be transmitted by the clutch as a function of the torque being generated at the output element of the prime mover is calculated by the regulating unit in accordance with the equation $$M_{clutch} = k_{me} \cdot k_{corr} \cdot (M_{pm} + M_{corr\ pm}) + M_{corr\ wu}, \text{ wherein}$$

$M_{clutch}$ is the torque to be transmitted by the clutch, $k_{me}$ is a torque dividing factor for apportioning respective amounts of torque being transmitted by the slip clutch and the hydrokinetic torque converter, $k_{corr}$ is a correction factor that is determined based on a current operating point of the power train, $M_{corr\ pm}$ is a correction torque to compensate for additive errors of $M_{pm}$, and $M_{corr\ wu}$ is a correction torque compensating for additive errors of the clutch torque $M_{clutch}$, wherein said desired minimum amount of slip occurs automatically as a function of said torque dividing factor $k_{me}$, and long-term departures of actual from theoretical values for $M_{pm}$ and $M_{clutch}$ are compensated by the correction factor $k_{corr}$ and correction torques $M_{corr\ pm}$ and $M_{corr\ wu}$, the differences between the actual and predetermined torque being transmitted by the clutch being attributable to at least one of (a) multiplicative errors ($k_{corr} \neq 0$, $M_{corr\ pm} = 0$, $M_{corr\ wu} = 0$), (b) errors additive to prime mover torque ($k_{corr} = 0$, $M_{corr\ pm} \neq 0$, $M_{corr\ wu} = 0$), (c) errors additive to the clutch torque ($k_{corr} \neq 0$, $M_{corr\ wu} \neq 0$), (d) multiplicative errors and additive errors to prime mover torque ($k_{corr} \neq 0$, $M_{corr\ pm} \neq 0$, $M_{corr\ pm} = 0$), (e) errors multiplicative and additive to prime mover torque ($k_{corr} \neq 0$, $M_{corr\ pm} = 0$, $M_{corr\ wu} \neq 0$) and (f) errors multiplicative of and additive to prime mover torque and clutch torque ($k_{corr} \neq 0$, $M_{corr\ pm} \neq 0$, $M_{corr\ wu} \neq 0$), said step of carrying out compensation taking place with a time constant of several seconds to thus impart to the step of carrying out compensation a purely adaptive character.

23. The method of claim 1, wherein when a desired acceleration of the prime mover is signaled by an operator of the vehicle the slip of the clutch is increased through a reduction of a factor $k_{me}$ denoting the division of torque being transmitted by the rotary output element into first and second torques respectively transmitted by the torque converter and the clutch, so that the torque boost offered by the torque converter is available as an additional torque reserve.

24. The method of claim 1, wherein the transmission has a plurality of drive ratios and the torque-transmitting apparatus has a combined slip resulting from the slip of the clutch and from a less than perfect torque-transmitting efficiency of the torque converter, and wherein at each of said drive ratios said combined slip is determined primarily by the slip of the clutch, so that the efficiency of the torque converter becomes a less important factor for the transmission of torque from the rotary output element to the rotary input element so that the torque converter can be optimized for a high stall speed and a wide torque conversion range.

25. A method of operating a torque transmitting apparatus which receives torque from a rotary output element of a prime mover and transmits torque to a rotary input element of an automatic transmission in a power train of a vehicle, wherein a hydrokinetic torque converter is arranged to transmit torque between the output and input elements in parallel with a slip clutch, wherein the magnitude of torque being transmitted by the clutch is detectable by a monitoring unit in conjunction with a central computer unit, and wherein the application of force to, and hence the magnitude of torque being transmitted by, the clutch is controllable by the computer unit, comprising the steps of:

ascertaining the magnitude of torque to be transmitted by the clutch in dependency upon the operating condition of the power train in accordance with the equation $$M_{clutch} = k_e \cdot k_{corr} \cdot M_{pm}, \text{ wherein}$$

$k_e = k_{me}$ is a torque dividing factor for apportioning respective amounts of torque being transmitted by the slip clutch and the torque converter, $K_{corr}$ is a correction factor that is dependent on a current operating point of the power train, $M_{clutch}$ is the torque being transmitted by the clutch and $M_{pm}$ is the torque being transmitted by the rotary output element of the prime mover, (b) ascertaining the magnitude of the force to be applied to the clutch for the transmission of a predetermined torque, and (c) applying the thus ascertained force to the clutch, wherein the slip between the output and input elements adjusts itself automatically as a function of the torque dividing factor $k_e$ and possible deviations of an individual power train from an ideal behavior are corrected by the correction factor $k_{corr}$.

26. A method of operating a torque transmitting apparatus which receives torque from a rotary output element of a prime mover and transmits torque to a rotary input element of an automatic transmission, wherein a hydrokinetic torque converter is arranged to transmit torque between the output and input elements in parallel with a slip clutch and wherein the magnitude of torque being transmitted by the clutch is detectable by a monitoring device in conjunction with a central computer unit, comprising the steps of:

(a) ascertaining the magnitude of torque to be transmitted by the clutch in dependency upon the operating condition of the power train in accordance with the equation $$M_{clutch} = k_e \cdot k_{corr} \cdot M_{pm}, \text{ wherein}$$

$k_e = K_{me}$ is a torque dividing factor which is independent of a characteristic field of the prime mover, $k_{corr}$ is a correction factor that is dependent on a current operating point of the power train, and $M_{pm}$ is the torque being transmitted by the prime mover, (b) ascertaining the magnitude of the force to be applied to the clutch for the transmission of a predetermined torque, and (c) applying the thus ascertained force to the clutch, wherein the slip between the output and input elements adjusts itself automatically as a function of the torque dividing factor $k_e$ and possible deviations of an individual power train from an ideal behavior are corrected by the correction factor $k_{corr}$.

27. A method of operating a torque transmitting apparatus which receives torque from a rotary output element of a prime mover and transmits torque to a rotary input element of an automatic transmission, wherein a hydrokinetic torque converter is arranged to transmit torque between the output and input elements in parallel with a slip clutch and wherein the magnitude of torque being transmitted by the clutch is detectable by a monitoring device in conjunction with a central computer unit, comprising the steps of (a) ascertaining the magnitude of torque $M_{clutch}$ to be transmitted by the clutch in dependency upon the operating condition of the torque transmitting apparatus in accordance with the equation $$M_{clutch} = k_e \cdot k_{corr} \cdot M_{pm}, \text{ wherein } k_e = k_{me}$$

$k_e = k_{me}$ is a torque dividing factor which is dependent only upon the RPM of the output element of the prime mover, $k_{corr}$ is a correction factor that is dependent on a current operating point of the power train, and $M_{pm}$ is the torque being transmitted by the prime mover, (b) ascertaining the magnitude of the force to be applied to the clutch for the transmission of a predetermined torque, and (c) applying the thus ascertained force to the clutch, wherein the slip between the output and input elements adjusts itself automatically as a function of the torque dividing factor $k_e$ and possible deviations of an individual power train from an ideal behavior are corrected by the correction factor $k_{corr}$.

28. A method of operating a torque transmitting apparatus which receives torque from a rotary output element of a prime mover and transmits torque to a rotary input element of an automatic transmission, wherein a hydrokinetic torque converter is arranged to transmit torque between the output and input elements in parallel with a slip clutch and wherein the magnitude of torque being transmitted by the clutch is detectable by a monitoring device in conjunction with a central computer unit, comprising the steps of (a) ascertaining the magnitude of torque $M_{clutch}$ to be transmitted by the clutch in dependency upon the operating condition of the torque transmitting apparatus in accordance with the equation $$M_{clutch} = k_e \cdot k_{corr} \cdot M_{pm}, \text{ wherein } k_e = k_{me}$$

$k_e = k_{me}$ is a torque dividing factor which is dependent only upon the RPM of the output element of the prime mover and the magnitude of torque being transmitted by the output element of the prime mover, $k_{corr}$ is a correction factor that is dependent on a current operating point of the power train, and $M_{pm}$ is the torque being transmitted by the prime mover, (b) ascertaining the magnitude of the force to be applied to the clutch for the transmission of a predetermined torque, and (c) applying the thus ascertained force to the clutch, wherein the slip between the output and input elements adjusts itself automatically as a function of the torque dividing factor $k_e$ and possible deviations of an individual power train from an ideal behavior are corrected by the correction factor $k_{corr}$.

29. A method of operating a torque transmitting apparatus which receives torque from a rotary output element of a prime mover and transmits torque to a rotary input element of an automatic transmission in a power train of a vehicle, wherein a hydrokinetic torque converter is arranged to transmit torque between the output and input elements in parallel with a slip clutch, and wherein the magnitude of torque being transmitted by the clutch is variable by a pressure differential between two bodies of a hydraulic fluid one of which is confined in a first compartment between a housing of the torque converter and the slip clutch and the other of which is confined in a separate second compartment between the housing and the clutch, and wherein the pressure differential is detectable by a monitoring unit in conjunction with a central computer unit and, and wherein the application of force to, and hence the magnitude of torque being transmitted by, the clutch is controllable by the computer unit, comprising the steps of (A) determining the RPM of said output element, (B) ascertaining the magnitude of torque to be transmitted by the clutch in dependency upon the operating condition of the power train in accordance with the equation $M_{clutch} = k_e \cdot k_{corr} \cdot M_{pm}$, wherein $k_e = k_{me}$ is a torque dividing factor which satisfies at least one of the requirements including (a) at least substantial constancy within the entire operating range of the power train, (b) independence from a characteristic field of the prime mover, (c) dependency exclusively upon the RPM of the output element of the prime mover, and (d) dependency upon the RPM of the prime mover and the magnitude of torque being transmitted by the output element, $k_{corr}$ is a correction factor, $M_{clutch}$ is the torque being transmitted by the clutch and $M_{pm}$ is the torque being transmitted by the rotary output element of the prime mover, (C) ascertaining the magnitude of the force to be applied to the clutch for the transmission of a predetermined torque, and (D) applying the thus ascertained force to the clutch, wherein the slip between the output and input elements adjusts itself automatically as a function of the torque dividing factor $k_e$ and possible deviations of an individual power train from an ideal behavior are corrected by the correction factor $k_{corr}$ ascertaining the magnitude of the force to be applied to the clutch for the transmission of a predetermined torque, and applying the thus ascertained force to the clutch with attendant automatic selection of the slip between the output and input elements as a function of the torque dividing factor $k_e$ and compensation for eventual departures from the desired torque transmission, as a function of the correction factor $k_{corr}$, due to the characteristics of the selected power train.

30. The method of claim 29, wherein the prime mover is a combustion engine the operating condition of which is dependent upon the RPM of the output element and the position of a throttle control lever of the vehicle.

31. The method of claim 29, wherein the prime mover is a combustion engine the operating condition of which is dependent upon the RPM of the output element and the subatmospheric pressure in a suction pipe of the engine.

32. The method of claim 29, wherein the prime mover is a combustion engine the operating condition of which is dependent upon the RPM of the output element and the duration of fuel injection into the engine.

33. The method of claim 29, wherein in response to a change of the torque being transmitted by the power train a new torque to be transmitted by the clutch is implemented through the following measures: (A) advance determination of a parameter X which determines the torque being transmitted by the clutch at an instant $t_{n+1}$ after the elapse of a monitoring interval and in accordance with a function that excludes undesirable phenomena including at least a blocking of the clutch, (B) determination of a gradient $\Delta X$ which is required to arrive at a desired value of the parameter X after elapse of an interval $\Delta t$, (C) applying the thus determined gradient $\Delta X$ with a hydraulic system including a proportional regulation wherein a parameter includes a pressure differential $\Delta P$ established in advance between bodies of a hydraulic fluid at opposite sides of a pressure plate of the clutch in a housing of the torque converter in accordance with the equation $$\Delta P_{n+1} = (1-\beta) \cdot \Delta P_{desired} + \beta \cdot P_n, \text{ wherein } \beta = f(T_v, t), \text{ and}$$

(D) repeating the steps (A), (B) and (C) until the parameter X at least closely approximates the desired parameter.

34. The method of claim 29, wherein further in response to changes of the torque being transmitted by the power train a new torque is to be transmitted by the clutch is implemented through the following measures:

(A) determining a gradient $\Delta X$ of a parameter X which determines the torque being transmitted by the clutch in accordance with a function that excludes undesirable phenomena including at least a short-lasting blocking of the clutch, (B) applying the gradient $\Delta X$ with a hydraulic system, wherein a gradient $\Delta\Delta P$ of a pressure differential $\Delta P$ between two bodies of a hydraulic fluid at opposite sides of a pressure plate of the clutch in a housing of the torque converter is arrived at in accordance with the equation $\Delta\Delta P = C_1 \cdot (\Delta P_{desird} - \Delta P_n)$, wherein $C_1$ is a proportionality factor, and (C) repeating the steps (A) and (B) until the parameter X at least approximates a desired value.

35. The method of claim 29, wherein when a reduction of torque being transmitted by the apparatus can be predicted as a result of at least one of a plurality of occurrences including shifting of the transmission into a different drive ratio and attachment of at least one aggregate to an output element of the transmission and said predicted reduction of torque can cause short-lasting blockage of the clutch, the method further comprising the step of reducing the magnitude of torque being transmitted by the clutch by reducing the factor $k_e$ by a predetermined value, and thereupon gradually increasing each reduced factor as a function of time to a level where the amount of the torque being transmitted by the clutch is compatible with adequate insulation of the transmission from vibrations and economical fuel consumption by the prime mover.

36. The method of claim 29, wherein when a reduction of torque being transmitted by the apparatus can be predicted as a result of at least one of a plurality of occurrences including shifting of the transmission into a different drive ratio and attachment of at least one aggregate to an output element of the transmission and said predicted reduction of torque can cause short-lasting blockage of the clutch, the method further comprises the step of reducing the magnitude of torque being transmitted by the clutch through at least one of the following measures: (A) reducing the factor $k_e$ by a predetermined value, and (B) reducing the factor $k_{corr}$ by a predetermined value and thereupon increasing each reduced factor as a function of time to a level where the amount of the torque being transmitted by the clutch is compatible with adequate insulation of the transmission from vibrations and economical fuel consumption by the prime mover.

37. The method of claim 29, wherein the factor $K_{corr}$ is indicative of a power train of a specific vehicle, and wherein the steps for selecting the factor $k_{corr}$ to compensate for deviations of the characteristics of said power train of the specific vehicle from desired characteristics include:
   (a) monitoring the slip of the clutch in a predetermined substantially stationary range of operation of the apparatus with a time delay which is sufficient to prevent the transmission of fluctuations of transmitted torque,
   (c) comparing the monitored slip with a reference value which is selected to ensure optimal insulation of the transmission from vibrations and economical fuel consumption by the prime mover, and
   (d) altering the slip of the clutch when the monitored slip departs from the reference value.

38. The method of claim 29, further comprising the steps of (a) detecting an impending acceleration of the prime mover based on a throttle valve position, and (b) if an impending acceleration is detected, reducing at least one of the factors $k_e$ and $k_{corr}$ so that the slip of the clutch increases and the torque boost offered by the torque converter is available as an additional torque reserve.

39. The method of claim 29, wherein the transmission has a plurality of drive ratios and the torque-transmitting apparatus has a combined slip0 resulting from the slip of the clutch and from a less than perfect torque-transmitting efficiency of the torque converter, and wherein at each of said drive ratios said combined slip is determined primarily by the slip of the clutch, so that the efficiency of the torque converter becomes a less important factor for transmission of torque from the rotary output element to the rotary input element so that the torque converter can be designed for a wide torque conversion range.

* * * * *